United States Patent [19]
Tani et al.

[11] Patent Number: 5,304,812
[45] Date of Patent: Apr. 19, 1994

[54] OPTOELECTRONIC DEVICE, INFORMATION APPARATUS AND DATA TRANSMISSION SYSTEM USING OPTOELECTRONIC DEVICE FOR SIMPLIFYING WIRINGS AND REDUCING SIZE, AND METHOD OF CONTROLLING THE OPTOELECTRONIC DEVICE

[75] Inventors: Zenpei Tani, Tondabayashi; Kiyoshi Ebina, Kashihara; Yukihisa Oda, Kitakatsuragi; Nobumasa Ono, Hashimoto; Masahiro Morita, Gose; Mitsuo Kobachi, Ayama; Kazuhito Nagura, Gose; Hajime Kashida, Nara; Hirohumi Sindo, Naga; Mitsuru Hosoki, Kitakatsuragi; Kiyoshi Kumata, Tsuzuki; Atsushi Murayama, Nabari; Seiichiro Kihara, Kitakatsuragi, all of Japan

[73] Assignee: Sharp Kabushiki Kaisha, Osaka, Japan

[21] Appl. No.: 792,527

[22] Filed: Nov. 18, 1991

[30] Foreign Application Priority Data

| Nov. 21, 1990 | [JP] | Japan | 2-319792 |
| Nov. 21, 1990 | [JP] | Japan | 2-319793 |
| Nov. 21, 1990 | [JP] | Japan | 2-319794 |
| Nov. 29, 1990 | [JP] | Japan | 2-333757 |
| Nov. 30, 1990 | [JP] | Japan | 2-338576 |
| Feb. 22, 1991 | [JP] | Japan | 3-28298 |
| Feb. 26, 1991 | [JP] | Japan | 3-30712 |
| Jun. 26, 1991 | [JP] | Japan | 3-154299 |

[51] Int. Cl.$^5$ .................... G06F 7/00; H04Q 9/00
[52] U.S. Cl. .................... 250/551; 340/825.34
[58] Field of Search .................... 250/551; 357/19; 359/152–154; 340/825.30, 825.31, 825.35, 825.72, 825.34

[56] References Cited

U.S. PATENT DOCUMENTS

| 3,997,873 | 12/1976 | Thornton | 340/825.31 |
| 4,002,837 | 1/1977 | Ebner et al. | 340/825.38 |
| 4,635,053 | 1/1987 | Banks et al. | 340/825.31 |
| 4,754,255 | 6/1988 | Sanders et al. | 340/825.31 |
| 4,758,835 | 7/1988 | Rothmann et al. | 340/825.31 |
| 4,825,210 | 4/1989 | Bachhuber et al. | 340/825.31 |
| 4,928,098 | 5/1990 | Dannhaeuser | 340/825.34 |
| 4,988,992 | 1/1991 | Heitschel et al. | 340/825.31 |
| 5,103,221 | 4/1992 | Memmola | 340/825.31 |

OTHER PUBLICATIONS

"Optoelectronics", Sharp Corporation, Jun. 1991.

*Primary Examiner*—David C. Nelms
*Assistant Examiner*—S. B. Allen
*Attorney, Agent, or Firm*—Nixon & Vanderhye

[57] ABSTRACT

An optoelectronic device for sensing an object without any contact, the optoelectronic device being adapted to be connected to a control device which is capable of sending an identification code to the optoelectronic device, the optoelectronic device includes an optoelectronic element (110, 111) for receiving an input signal and for converting the received signal into an electrical signal, an address memory (121) for storing a self identification code, a determining unit (126) connected to the address memory (121) for determining a coincidence between the self identification code stored in the address memory (121) and the identification code sent from the control device, and an activating unit (127) connected to the determining unit (126) for driving the optoelectronic element (110, 111) at a time when the self identification code coincides with the identification code.

71 Claims, 56 Drawing Sheets

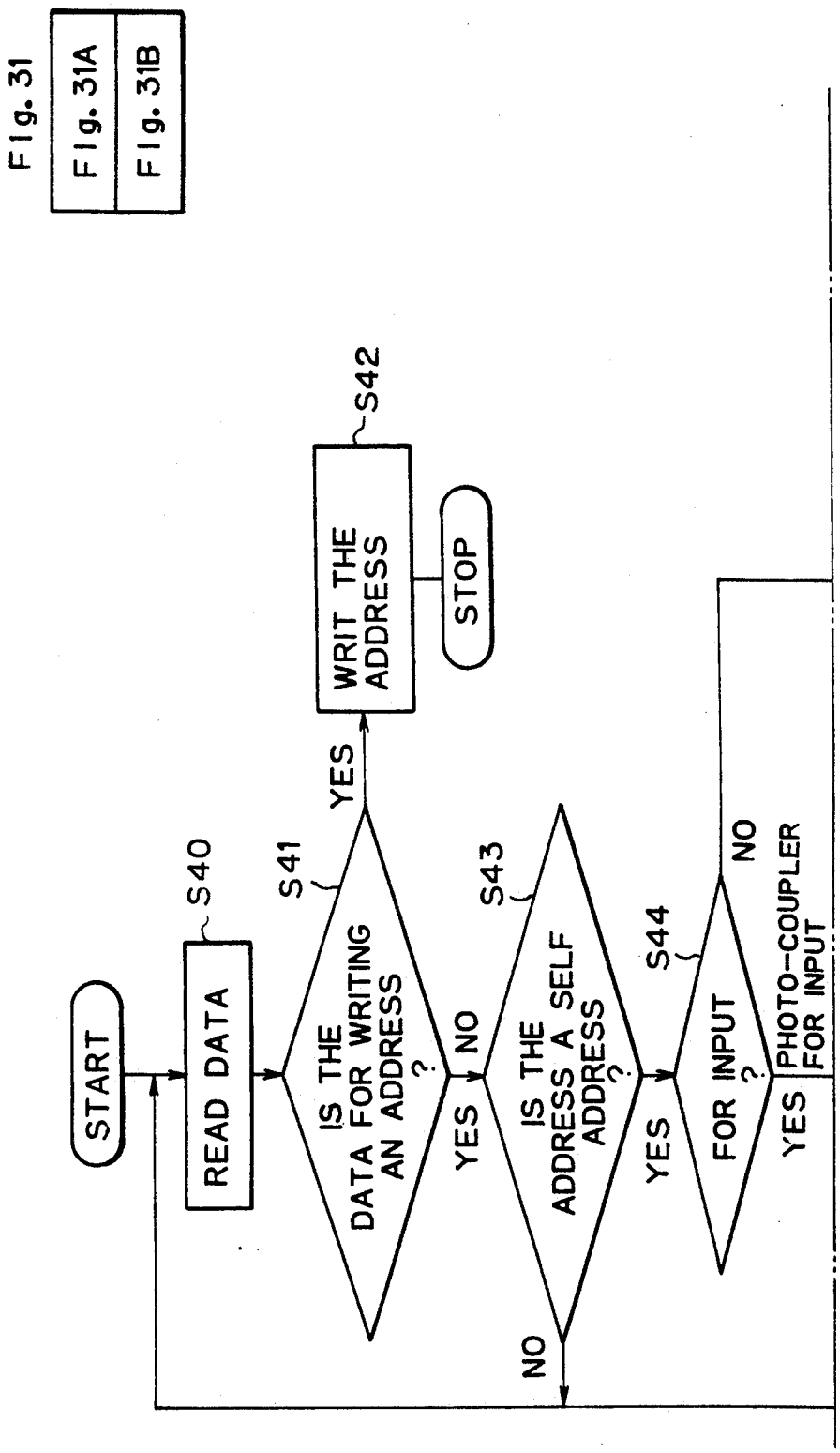

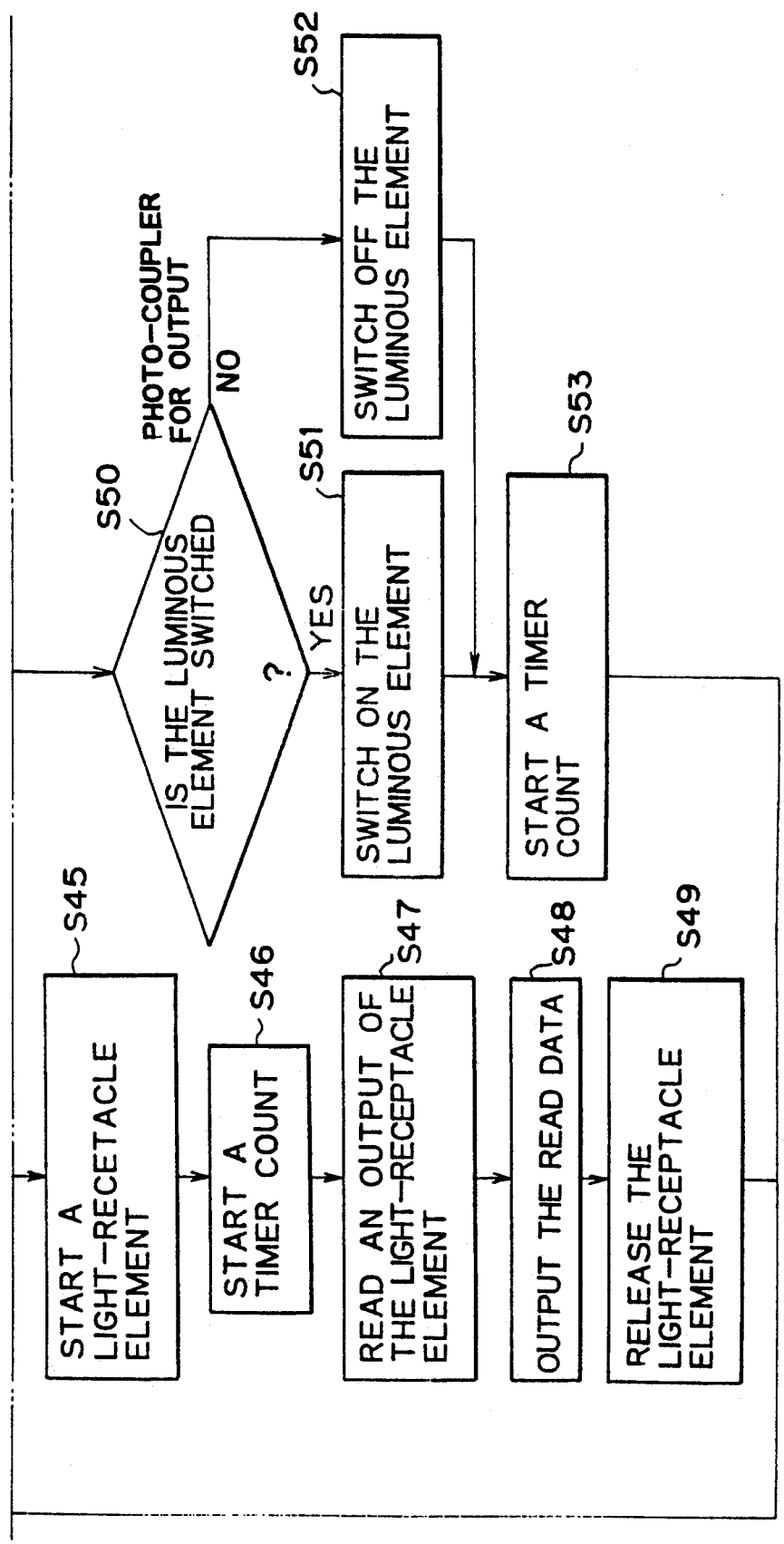

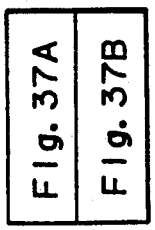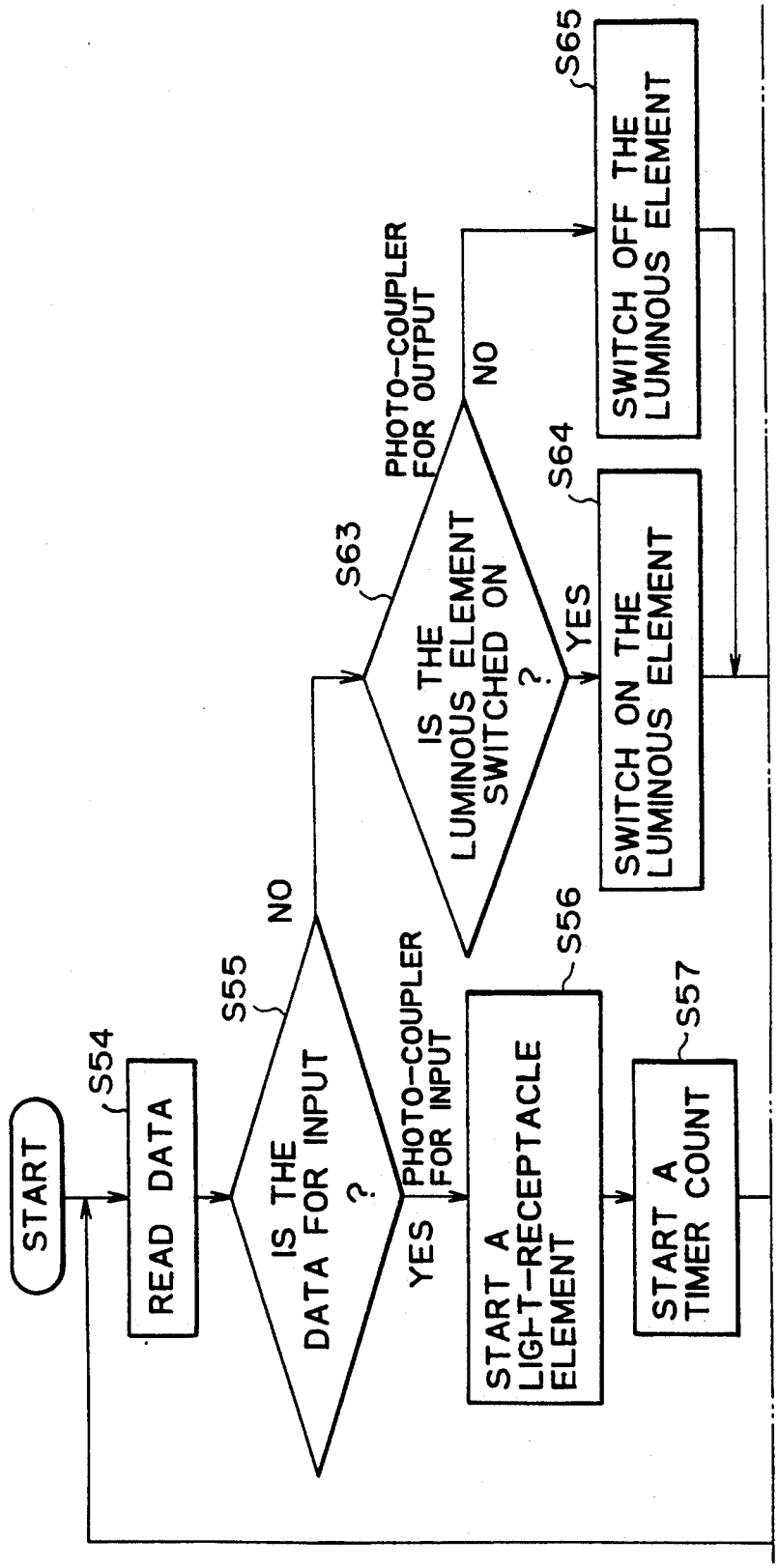

730: SIGNAL GENERATING CIRCUIT

OPTOELECTRONIC DEVICE, INFORMATION APPARATUS AND DATA TRANSMISSION SYSTEM USING OPTOELECTRONIC DEVICE FOR SIMPLIFYING WIRINGS AND REDUCING SIZE, AND METHOD OF CONTROLLING THE OPTOELECTRONIC DEVICE

BACKGROUND OF THE INVENTION

The present invention relates to an optoelectronic device and an information apparatus using the optoelectronic device. Furthermore, the present invention relates to a data transmission system for controlling the information apparatus which includes a plurality of sensors and to transmit outputs of the sensors.

The above-mentioned optoelectronic device includes for example, a light-receptacle device, a luminous device, a solid-state relay, a photo-interrupter, and a photo-coupler for sensing an object without physical contact, a photo-coupler for inputting or outputting a signal. The above-mentioned information apparatus includes, for example a printer, a facsimile, a copying machine, and a programmable controller. The above-mentioned data transmission system represents a system which uses an apparatus such as a copying machine, a video tape recorder, an audio equipment, a domestic electric product, a car-equipped electric product, an electric music instrument, or an industrial apparatus.

A photo-interrupter which is arranged to have a luminous element 11, a light-receptacle element 12, an amplifier 13 and a transistor 14 is shown in FIG. 1. In operation the luminous element 11 is made luminous by flowing current therethrough. The photo-interrupter determines whether or not the light-receptacle element 12 receives a larger amount of light than a threshold light amount and outputs a high signal or a low signal depending on a result of the determination.

A copying machine which uses a large number of photo-interrupters mounted thereon for increasing its functions is shown in FIG. 2. For supplying a sensing signal from the photo-interrupters, the known copying machine is required to provide a plurality of signal lines 17 inside of a control unit 15 between the control unit 15 and the plurality of photo-interrupters. As a consequence, the inside wiring arrangement is very intricate, thereby inhibiting a reduction of the apparatus size.

A light-receptacle device is shown in FIG. 3. The light-receptacle device is arranged to have a photo-diode 18, an amplifying circuit 19 and a waveform shaping circuit 20. The light-receptacle device supplies a high signal or a low signal based on a result of the determination whether or not the light is applied to the photo-diode 18.

An information apparatus may use a larger number of light-receptacle devices in accordance with an increased number of the sensors provided in the apparatus. As shown in FIG. 4, the information apparatus is required to provide the corresponding number of transmission lines 22 to that of the light-receptacle devices for transmitting data between a plurality of the light-receptacle devices and one control unit (CPU) 21. It results in making the internal wiring arrangement more intricate, thereby the apparatus becomes bulkier.

This arrangement requires more power consumption, because it is necessary to provide the same number of the transmission lines connected between the CPU 21 and the light-receptacle devices as the number of the light-receptacle devices as stated above and the power for a light sensor circuit has to be turned on.

A photo-coupler shown in FIG. 5 may be used for an information apparatus, for example, a programmable controller. Several signal lines from input photo-couplers (input 1 to N) and output photo-couplers (output 1 to N) are connected in parallel with an external control device (microcomputer) C.

With an increase of a number of the photo-couplers being used, the overall length of patterns led inside of the substrate and lead wires installed inside of the device becomes considerably long, it results in occupying a considerable area and enlarging the size of the apparatus, overall.

A luminous device, which is shown in FIG. 6 is arranged to have a light-emitting diode 23 and an oscillation circuit 24 for driving the light-emitting diode 23. The luminous device operates to emit a pulsed ray of light constantly.

Recent information apparatus use a larger number of luminous elements with an increase of the sensors used in the information apparatus and having an arrangement as shown in FIG. 6. It is necessary to provide the corresponding number of transmission lines as that of the luminous devices in order to transmit data between those luminous devices and one central processing unit (CPU) 25 as shown in FIG. 7. As a consequence, wirings inside of the apparatus will be more intricate, thereby the apparatus becomes bulkier. Further, this arrangement requires more power consumption as mentioned above, because it is necessary to provide the corresponding number of transmission lines as that of the luminous devices and the power source for keeping the oscillation circuit 24 constantly.

A photo-triac used in a solid-state relay S as shown in FIG. 8. The solid-state relay S is arranged to have a luminous element (light-emitting diode) 26, a light-receptacle element 27, a photo-triac 28 and a main triac for power 29. The luminous element 26 serves to emit light to the light-receptacle element 27. The photo-triac 28 serves to conduct alternating ac in response to the light received in the light-receptacle element 27. The main triac for power 29 serves to switch on and off the external unit in a case that the photo-triac 28 becomes conductive. The alternating current is controlled on and off depending on the on-state and off-state of the luminous element 26.

In recent days, a copying machine utilizes a large number of solid-state relays in order to keep its function higher.

In a case that a plurality of solid-state relays are connected to a control unit 30 inside of the copying machine, as shown in FIG. 9, it is necessary to provide a plurality of signal lines 31 (lead wires) between those solid-state relays S and the control unit 30 for various purposes, resulting in making an arrangement of the internal wiring more intricate, thereby the copying machine becomes bulkier.

Another photo-interrupter is shown in FIG. 10. This photo-interrupter includes a luminous element 32, a light-receptacle element 33, an operational amplifier 34 and a transistor 35.

When the luminous element 32 is made luminous by flowing current therethrough, the light-receptacle element 33 serves to generate current depending on the quantity of the received light. Then, the operational amplifier 34 serves to amplify the generated current and to determine whether or not the amplified current is equal to or larger than a threshold quantity of light. The transistor 35 is arranged to supply a high or a low signal depending on a result of the above-determination.

In recent days, a copying machine utilizes a large number of the above-mentioned photo-interrupters in order to keep its function higher. For a certain type of copying machine, several hundreds photo-interrupters may be used.

As shown in FIG. 11, it is necessary to connect a plurality of signal lines 37 in parallel between the control unit 36 and those photo-interrupters for supplying sensing states of the photo-interrupters 38A to 38L to the control unit 36. As a result, the internal wiring arrangement will be more intricate, thereby the copying machine becomes bulkier.

A data transmission system is shown in FIG. 12. This data transmission system is arranged to have photo-interrupters 39, each of which is connected to a control unit (microcomputer) 40, a luminous element (light-emitting diode) 41, a current-limiting resistor 42, a light-receptacle element (photo-transistor) 43.

Output resistors 44 are connected to the photo-transistors 43, and output wires 45 are led from the output resistors 44.

Those output wires 45 are connected to the microcomputer 40. Since an object partially screens the light applied from the light-emitting diode 41 to the photo-transistor 43, the photo-interrupters 39 serve to change current flowing through the output resistors 44, thereby changing the voltages on the output wires 45.

With recent enhancement of functions of the apparatus, the photo-interrupter used in the data transmission system are increased in number. It results in increasing the internal wires in number and making the internal wiring arrangement more intricate.

SUMMARY OF THE INVENTION

It is an object of the present invention to provide an photoelectronic device for sensing an object without any contact.

The above-mentioned object can be achieved by an optoelectronic device for sensing an object without any contact, the optoelectronic device being adapted to be connected to a control device which is capable of sending an identification code to the optoelectronic device, the optoelectronic device comprises an optoelectronic element for receiving an input signal and for converting the received signal into an electrical, a unit for storing a self identification code, a unit connected to the storing unit for determining a coincidence between the self identification code stored in the storing unit and the identification code sent from the control device, and a unit connected to the determining unit for driving the optoelectronic element at a time when the self identification code coincides with the identification code in accordance with a determined result of said determining unit.

Preferably, the optoelectronic element is a luminous element for receiving an input signal and for converting the received input signal into a light.

More preferably, the optoelectronic element is a light receptacle element for receiving a light output from the object and for converting the received light into an electrical signal so as to sense an object in accordance with the received light.

Further preferably, the optoelectronic element includes a luminous element for receiving an input signal and for converting the received input signal into a light, and a light receptacle element cooperating with the luminous element for receiving the light output from the luminous element and for converting the received light into an electrical signal so as to sense an object in accordance with the received light.

Furthermore preferably, the determining unit is capable of sensing, recognizing an identification code sent from the control device, and checking a coincidence between the self identification code stored in the storing unit and the identification code sent from the control device.

Preferably, the optoelectronic device includes an internal control element for controlling the optoelectronic element.

More preferably, the internal control element comprises a storage unit for storing a self identification code in advance and having terminals for a clock line and a signal line, a comparing-determining unit connected to the storage unit for comparing and determining whether or not a identification code sent in synchronized with a clock signal of a clock line through a signal line from an external control device, is coincided with a self identification code stored in the storage unit, an output control circuit connected to the optoelectronic element for supplying a power supply to the optoelectronic element at a time when the comparing-determining unit determines a coincidence of the identification codes, a signal generating unit connected to the output control circuit for generating a signal of receiving the identification codes, and a timing control unit connected to the signal generating unit for controlling a clock timing.

The generating unit is preferably adapted to output a result of sensing state input from the optoelectronic element to the external control device through a signal line following to the signal of receiving the identification codes at a time when the comparing-determining determines a coincidence of the identification codes.

The timing control unit is adapted to check a synchronization between a clock signal and a code of the signal line for a signal sent from the external control device in accordance with a code of signal line which is equal to and more than twice of initial of a clock signal.

The optoelectronic device is preferably a photo-interrupter and the driving unit is further capable of outputting a sensing result of the determining unit to the control device at a time when the self identification code coincides with the identification code in accordance with a determined result of the determining unit.

The optoelectronic device is preferably a photo-interrupter and further comprises a first storage unit for storing a self identification code, a second storage unit for storing a current sensing state of the object, and a unit connected to both of the first and second storage unit for outputting the self identification code and a changed sensing state at a time when the current sensing state is changed.

The optoelectronic device is preferably a photo-interrupter and further comprises driving unit for driving the optoelectronic element in response to an input signal from the control device or in response to a start signal from another photo-interrupter which is located at a previous stage, a unit connected to the optoelectronic element for outputting a sensing state of the object to the control device, and a starting unit connected to the driving unit for outputting a start signal to another photo-interrupter located at a next stage.

The optoelectronic device is a light-receptacle device, and the optoelectronic element forms a light-receptacle chip, preferably.

The light-receptacle device further comprises a light sensing circuit for processing outputs from the light-receptacle chip, preferably.

Preferably, the light sensing circuit comprises a unit for storing a self identification code, a unit connected to the storing unit for determining a coincidence between the self identification code stored in the storing unit and the identification code sent from the control device, and a unit for switching on the light sensing circuit and for outputting a signal to the control device at a time when the self identification code coincides with the identification code in accordance with a determined result of the determining unit.

More preferably, the light sensing circuit comprises a start signal input circuit for receiving a control signal sent from the control device as a start signal or an end signal sent from a light sensing circuit located at the previous stage and for switching on the light sensing circuit, a data output circuit for outputting a sensing data of a light signal incident to the light-receptacle chip, and an end signal output circuit for outputting an end signal to a light-receptacle device located at the next stage and for switching off the light sensing circuit after the sensing data is sent to the control device.

Further preferably, the optoelectronic device is a photo-coupler and comprises a unit for driving the luminous element and the light-receptacle element in accordance with a signal sent from the control device and a start signal sent from a photo-coupler located at the previous stage, and a unit connected to the driving unit for outputting a start signal to a photo-coupler located at the next stage after the driving unit drives the luminous element and the light-receptacle element.

The optoelectronic device is preferably a luminous device, and the optoelectronic element forms a luminous chip and further include a signal processing circuit for driving the luminous chip in response to an input signal.

The signal processing circuit comprises a unit for driving the luminous chip, a unit connected to the driving unit for storing a self identification code, a unit connected to the storing unit for determining a coincidence between the self identification code stored in the storing unit and the identification code sent from the control device, and a unit connected to the determining unit for switching on the driving unit and for outputting a signal to the control device at a time when the determining unit determines that the self identification code coincides with the identification code, preferably.

The optoelectronic device is a solid-state relay, and further includes a driving element connected to the optoelectronic element and is adapted to be driven in accordance with an output of the optoelectronic element, preferably.

The solid-state relay comprises a unit for storing a self identification code, a unit connected to the storing unit for determining a coincidence between the self identification code stored in the storing unit and the identification code sent from the control device, and an operating unit for switching on or off the optoelectronic element at a time when the self identification code coincides with the identification code in accordance with a determined result of the determining unit, preferably.

The solid-state relay comprises a unit for switching on or off the optoelectronic element in accordance with an input signal sent from the control device, and a unit connected to the switching unit for outputting a start signal to a solid-state relay located at a next stage after the optoelectronic element is switched on or off by the switching unit, preferably.

The switching unit is preferably capable of switching on or off the optoelectronic element in accordance with a start signal sent from a solid-state relay located at a previous stage.

In operation, the determining unit serves to read a data signal sent from the external control device and determine whether an identification code sent from the external control device coincides with the identification codes stored in the storing unit. If it does not, the determining unit keeps the luminous element and the light-receptacle element in a waiting state. On the other hand, if it does, the luminous element and the light-receptacle element are switched on. As a result, whether or not the object exists is sensed on the basis of the quantity of light received in the light-receptacle element. The sensed result is sent to the external control device through the operating unit. Then, the luminous element and the light-receptacle element are switched off and returned to the waiting state.

When the identification code is sent from the external control device to the storing unit, the code will be stored in the storing unit. Then, the initial sensing state of the photo-interrupter is stored in the sensing state storing unit. The initial state information and the corresponding identification codes are output to the external control device through the effect of the outputting unit. Then, the determining unit serves to activate the luminous element and the light-receptacle element so that whether or not an object to be sensed exists is allowed to be constantly determined.

When the sensing state of the optoelectronic device is reversed, the output unit serves to the information about the reversed sensing state and the corresponding identification code to the external control device. The external control device serves to rewrite the sensing state so that it may correspond to the identification code.

The optoelectronic device reads a data signal sent from the external control device and activates the driving unit in response to the data signal. The driving unit serves to drive the luminous element and the light-receptacle element for a constant time. The sensing signal is then sent from the light-receptacle element to the data output unit of the control unit from which the data about the presence or absence of the object to be sensed is output to the external control device.

Apart from the data output, the starting unit serves to output a start signal to the optoelectronic device located at the next stage. The next-stage optoelectronic device is operated in response to the start signal.

The determining unit of the light sensing circuit serves to determine whether or not the identification code sent from the external control device coincides with the self identification code stored in the storing unit. If it does, the determining unit serves to switch on the light sensing circuit through the communication unit and then output a signal to the external control device. In addition, the light sensing circuit may be switched off if not necessary.

The start signal input circuit of the light sensing circuit receives a control signal sent from the external control device or an end signal sent from a light-receptacle element located at the previous stage. The start signal input circuit recognizes the received signal as a start signal and activates the light sensing circuit. Then, the data output circuit serves to output the sensing data to the external control device and then the end signal output circuit serves to output an end signal to a light-receptacle element located at the next stage. In addition, the light sensing circuit may be switched off if not necessary.

When an identification code from the external control device is input to the optoelectronic device, the determining unit serve to determine whether or not the input identification code coincides with the self identification code stored in the storing unit. In a case that it does, the driving unit are activated to drive the luminous element and the light-receptacle element.

The driving unit serve to drive the luminous element and the light-receptacle element on the basis of the signal sent from the external control device and a start signal sent from the optoelectronic device located at the previous stage. After completing the driving operation, the start signal output unit serve to supply a start signal to a optoelectronic device located at the next stage.

It is another object of the present invention to provide an information capable of simplifying wirings and reducing a size thereof.

The above-mentioned object can be achieved by an information apparatus which is capable of simplifying wirings therein and capable of reducing a size thereof, the information apparatus comprises a plurality of optoelectronic devices for sensing an object without any contact, the plurality of optoelectronic devices having an optoelectronic element, and a control device connected to the plurality of optoelectronic devices through a signal line for sending an identification code to each of the plurality of optoelectronic devices.

Preferably, the optoelectronic device comprises a unit for storing a self identification code, a unit connected to the storing unit for determining a coincidence between the self identification code stored in the storing unit and the identification code sent from the control device, and a unit connected to the determining unit for driving the optoelectronic element at a time when the self identification code coincides with the identification code in accordance with a determined result of the determining unit.

More preferably, the control device is connected to a signal transmission line for transmitting a data bit train in a bidirectional manner and connected to a clock signal transmission line for transmitting a clock signal synchronized with the data bit train.

Further preferably, the optoelectronic device is a photo-interrupter and comprises a first storage unit for storing an identification data bit train, a unit connected to the first storage unit for determining a coincidence between the data bit train sent from the control device through the signal transmission line and the identification data bit train stored in the first storage unit, a unit connected to the determining unit for driving the optoelectronic element at a time when the data bit train coincidences with the identification data bit train in accordance with a determined result of the determining unit, a unit connected to the control device for counting a clock signal sent from the control device through the clock signal transmission line at a time when the data bit train coincides with the identification data bit train in accordance with the determined result of the determining unit, a second storage unit connected to the counting unit for storing the control data bit train so as to control a count of the counting unit, and an output control circuit connected to the second storage unit for outputting a sensing state of the optoelectronic element to the control device at a time when the count value of the counting unit reaches a count value stored in the first storage unit according to the content of the control data bit train stored in the second storage unit.

In operation, the determining unit serves to read a control signal sent from the external control device and determine whether or not the identification code sent from the external control device coincides with the self identification code stored in the storing unit. If it does not, the determining unit brings the luminous device into a waiting state.

On the other hand, if it does, the determining unit serves to switch on the driving circuit. Then the driving circuit serves to activate the luminous chip for emitting light. The light information is sent from the luminous chip to the external control device through the signal transmission line.

Then, the driving circuit is switched off and enters into a waiting state. That is, the determining unit serves to determine whether or not the identification code sent from the external control device coincides with the self identification code stored in the storing unit and in a case that it does, activate the driving circuit for supplying a signal to the external control device. It results in being able to transmit a data signal through one transmission line even in a case that the data is transmitted between the external control device and a plurality of luminous devices, thereby greatly reducing the number of lead wires, facilitating wiring inside of and reducing the size of the information apparatus.

In addition, the driving circuit may be switched off in a case that not necessary. It results in reducing power consumption.

In a case that a plurality of solid-state relays are used, those solid-state relays are connected to the external control device of the information apparatus through a single signal line.

In use, the external control device serves to transmit a data signal composed of an on or off switching signal and an identification code to those solid-state relays. The solid-state relays respectively read the identification code from the data signal sent through the single data line and determine whether or not the read identification code coincides with the self identification code stored in the storing unit.

If it does not, the corresponding solid-state relays are entered into the waiting state.

On the other hand, if the coincidence is determined, the corresponding solid-state relay serves to read an on or off switching signal accompanied with the identification code and activate the operating unit to switch on or off the luminous element.

The use of one signal line makes it possible to function the respective solid-state relays, resulting in surprisingly reducing the signal lines in number.

The plurality of solid-state relays are connected in series to the signal line led to the external control device.

In use, the solid-state relays read a data signal sent from the external control device. In response to the data signal, the driving unit serves to switch on the solid-state relays.

Then, the starting unit outputs a start signal for switching on the solid-state relay located at the next stage, for bringing about a short-circuiting state on the line led to the external control device.

In response to the start signal, the solid-state relay located at the next stage operates in the same manner as above.

The series connection of the solid-state relays makes it possible to function the respective solid-state relays, resulting in surprisingly reducing the signal lines in number.

The data bit train sent from the external control device is read in the optoelectronic device. The determining unit serves to determine whether or not the read data bit train coincides with the identification data bit train stored in the first storage unit.

If it is does not, the optoelectronic device enters into the waiting state until the next data bit train is input. If, on the other hand, the coincidence is determined, the luminous element and the light-receptacle element are switched on.

The counting unit starts to count a clock signal immediately when it is sent through the clock signal transmission line. If the count of the clock signal reaches a count value determined on the control data bit stored in the second storage unit, the sensing state of the light-receptacle element is output to the external control circuit through a signal transmission line for a period of one pulse of the clock signal only in a case that the content of the received data bit is determined to coincide with the identification data bit.

Then, the luminous element and the light-receptacle element are both switched off and the counting unit is reset to zero so that the optoelectronic device is entered into a waiting state.

In a case that a number of optoelectronic devices are connected on the clock signal transmission line and the signal transmission line and the data of some of the optoelectronic device coincides with the content of the identification data bit train stored in the first storage unit but is different from the content of the control data bit train stored in the second storage unit, the external control circuit serves to output the same data bit train as the identification data bit train through the signal transmission line. Those optoelectronic devices are operated at the same time, so that the sensing state of the light-receptacle element of each optoelectronic device is allowed to be received through the signal transmission line as a continuous data bit synchronized with a clock signal in the external control circuit.

The foregoing arrangement allows the plurality of optoelectronic devices to transmit their sensing data to the control unit of the information apparatus through the two lines, so that the states of the optoelectronic devices are allowed to be sensed through the effect of just one data bit train. It results in being able to reduce the number of signal lines and realize high-speed communication.

Preferably, the plurality of optoelectronic devices connected to the control device by using a clock line and a signal line in common.

It is still another object of the present invention to provide a data transmission system using a plurality of optoelectronic devices and capable of simplifying wirings and reducing the size of the system.

The above-mentioned object can be achieved by a data transmission system which is capable of simplifying wirings therein and capable of reducing a size thereof, the data transmission system comprises a plurality of optoelectronic devices for sensing an object without any contact, the plurality of optoelectronic devices having an optoelectronic element, and a control device connected to the plurality of optoelectronic device through a signal line for sending an identification code to each of the plurality of optoelectronic devices.

Preferably, the optoelectronic device comprises a unit for storing a self identification code, a unit connected to the storing unit for determining a coincidence between the self identification code stored in the storing unit and the identification code sent from the control device, and a unit connected to the determining unit for driving the optoelectronic element at a time when the self identification code coincides with the identification code in accordance with a determined result of the determining unit.

The data transmission system includes a unit for sensing specifying signals from signals overlapped on a power line, preferably.

More preferably, the optoelectronic device comprises a unit connected to the sensing unit for determining a coincidence between the sensed specifying signal and a self specifying signal stored therein, and a unit connected to the determining unit for transmitting an output signal to the control device at a time when the coincidence is determined.

Further preferably, the specifying signal is a frequency signal and outputs of the optoelectronic devices are connected to one data line led to the control device.

The specifying signal is preferably a pulse train signal and outputs of the optoelectronic devices are connected to one data line led to the control device.

In the operation of the data transmission system related to the above aspect of the invention, when the address signal is input to the specifying signal generating unit, the specifying signal generating unit serves to respectively issue predetermined signals to the sensors on a power line in an overlapped manner. The signal processing circuit of the sensors serves to sense a specifying signal from the signals overlapped on the power line through the signal determining unit and determine whether or not the sensed signal is a stored self-specifying signal.

If it is determined that the sensed signal coincides with the self-specifying signal, the output switching unit is activated so that an output signal is transmitted to the control unit through a data line.

Each of the sensors is arranged to allow the signal determining unit of the signal processing circuit to determine whether or not the signal overlapped in a power line is a self-specifying signal and determine whether or not an output signal is output on the basis of the determined result. It is, therefore, possible to transmit an output of each of the sensor through a single data line in a case that the specifying signal generating unit issues the corresponding signal to the determining unit to each of the sensors.

It is still another object of the present invention to provide a method of controlling a coupling device which is capable of checking a connection of the coupling device at a time when a power is turned on during a production process or in an operation process of an information apparatus using the coupling device.

The above-mentioned object can be achieved by a method of controlling an optoelectronic device comprises steps of preventing an external control device to generate a clock signal except at a time when an identification code is transmitted, setting the clock signal in a high state except at a time when the identification code is transmitted, inputting a low output before the identification code, and inputting the clock signal and the identification code into an optoelectronic device.

Further objects and advantages of the present invention will be apparent from the following description of the preferred embodiments of the invention as illustrated in the accompanying drawings.

BRIEF DESCRIPTION OF THE DRAWINGS

FIG. 31 composing of FIGS. 31A and 31B is a flowchart showing operation of the photo-coupler shown in FIG. 29;

DESCRIPTION OF THE PREFERRED EMBODIMENTS

Referring to the accompanying drawings, the preferred embodiments of the present invention will be described in the following parts.

A photo-interrupter according to a first embodiment of the present invention will be described.

Figure 13:
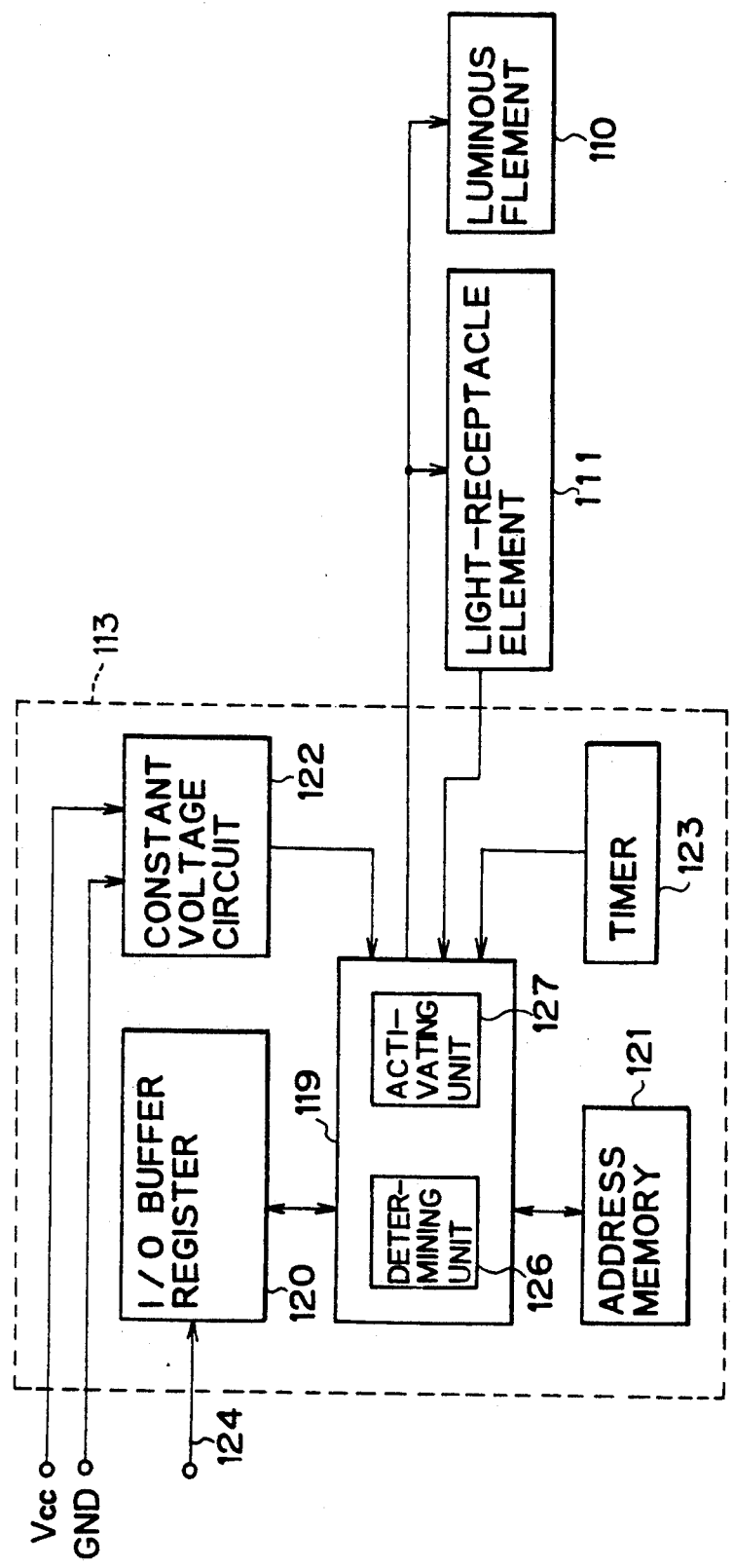
FIG. 13 is a block diagram showing a photo-interrupter according to a first embodiment of the present invention.
Figure 15:
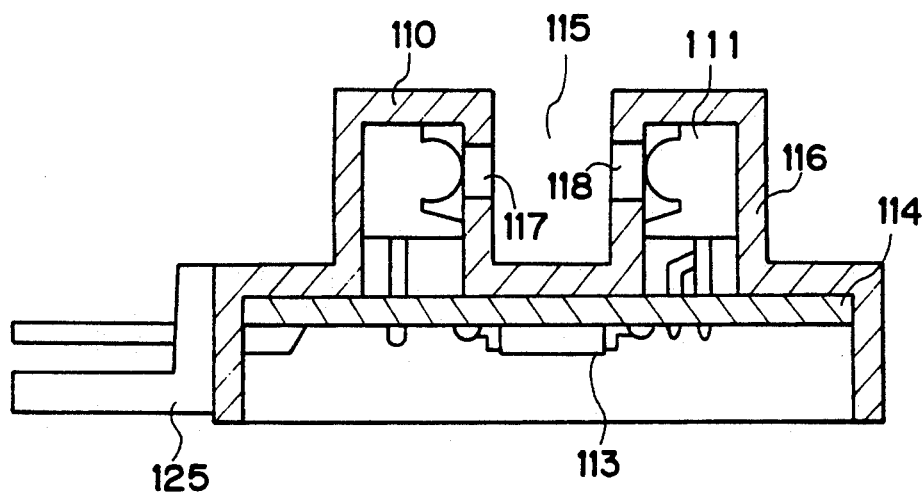
FIG. 15 is a sectional view showing the photo-interrupter shown in FIG. 13.

As shown in FIGS. 13 and 15, the transmission photo-interrupter of this embodiment is arranged to have a luminous element 110, a light-receptacle element 111 and a control element (Integrated Circuit, IC) 113 for controlling the operation of the luminous element 110 and the light-receptacle element 111.

The luminous element 110 and the light-receptacle element 111 are mounted on a printed board 114 (shown in FIG. 15) in such a manner that those elements 110 and 111 are located in opposition between a passage 115 through which an object to be sensed is passed. The control element 113 is soldered on the printed board 114. The luminous element 110, the light-receptacle element 111 and the printed board 114 are accommodated in a case 116 (shown in FIG. 15). The case 116 has a light-projecting window 117 and a light-entering window 118 on the light-receiving and the luminous surfaces of the passage 115, respectively.

The control element 113 serves to control an input-/output (I/O) of a signal to and from the external control device (not shown) and is arranged to have a control logic 119 for controlling the operation of the luminous element 110 and the light-receptacle element 11, and I/O buffer register 120 for temporarily registering data between the external control device and the control logic 119, an address memory 121 for storing an identification code (address), a constant voltage circuit 122, and a timer 123 for driving the luminous element 110 and the light-receptacle element 111 for a set period of time. The control element 113 is formed on another chip rather than the light-receptacle element 111.

124 denotes a data bus line and 125 denotes a connector.

The control logic 119 is arranged to have a determining unit 126 for recognizing the address sent from the external control device and for determining whether or not the address coincides with a self address stored in the address memory 121 and an activating unit 127 for supplying a driving signal to the luminous element 110 and the light-receptacle element 111 and a sensed result to the external control device when the determining unit 126 determines the received address coincides with the self address.

Figure 14:
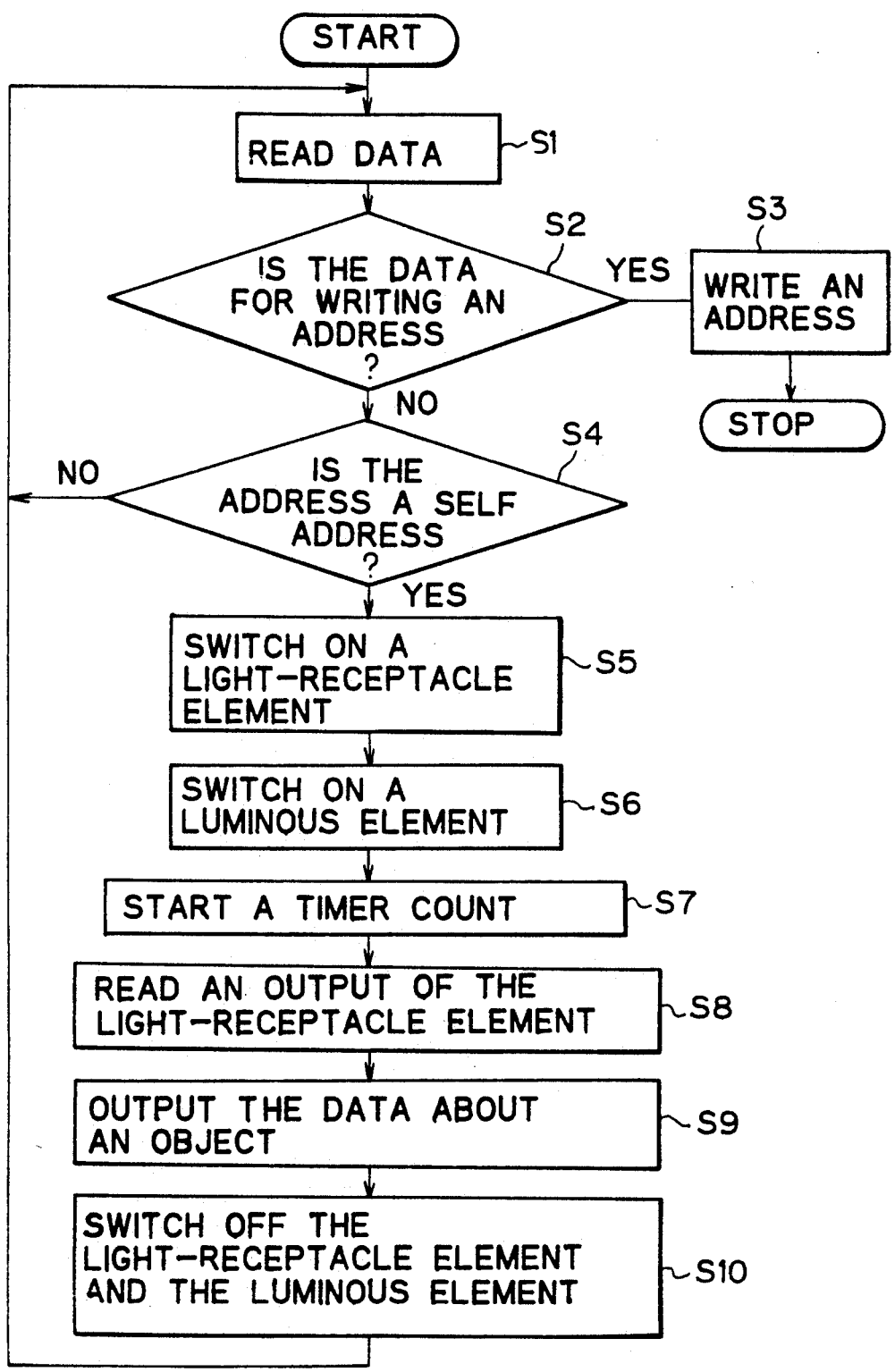
FIG. 14 is a flowchart showing operation of the photo-interrupter shown in FIG. 13.

Next, the operation of the photo-interrupter will be described as referring to the flowchart shown in FIG. 14.

At first, the photo-interrupter reads a data signal sent from the external control device 112 (S1). If the data signal is an address writing signal, the address is stored in the address memory 121 (S2).

The address is written in the address memory 121 by using an exclusive memory writer before mounting the photo-interrupter to the information apparatus having the external control device or written by the external control device located inside of the information apparatus after mounting the photo-interrupter to the information apparatus (S3). For writing an address, it is possible to write the address in the RAM or in the control element 113 with any one of a charge injecting system, a joint destructing system and a fuse melting system.

When the data signal containing an address signal is sent from the external control device, the determining unit 126 of the control logic 119 serves to determine whether or not the address sent from the external control device coincides with a self address stored in the address memory 121 (S4).

In a case that it does not, the photo-interrupter enters into a waiting state. In a case that it does, the activating unit 127 serves to activate the light-receptacle element 111 and the luminous element 110 (S5, S6). That is, by flowing current through the luminous element 110, whether or not the object is presented is sensed depending on the quantity of the received light (S7). A sensing signal is sent from the luminous element 111 to the control logic 119 (S8). The activating unit 127 of the control logic 119 serves to supply a data signal indicating the sensing state to the external control device through the I/O buffer register 120 (S9).

After passing a certain time, by cutting or reducing the current flowing through the luminous element 110, the photo-interrupter enters into a waiting state (S10).

The photo-interrupter is arranged to have the storage unit 121 for storing an address, a determining unit 126 for recognizing an address sent from the external control device and determining whether or not the address coincides with a self address stored in the storage unit, and the activating for activating the luminous element 110 and the light-receptacle element 111 and supplying the sensed result to the external control device.

Figure 16:
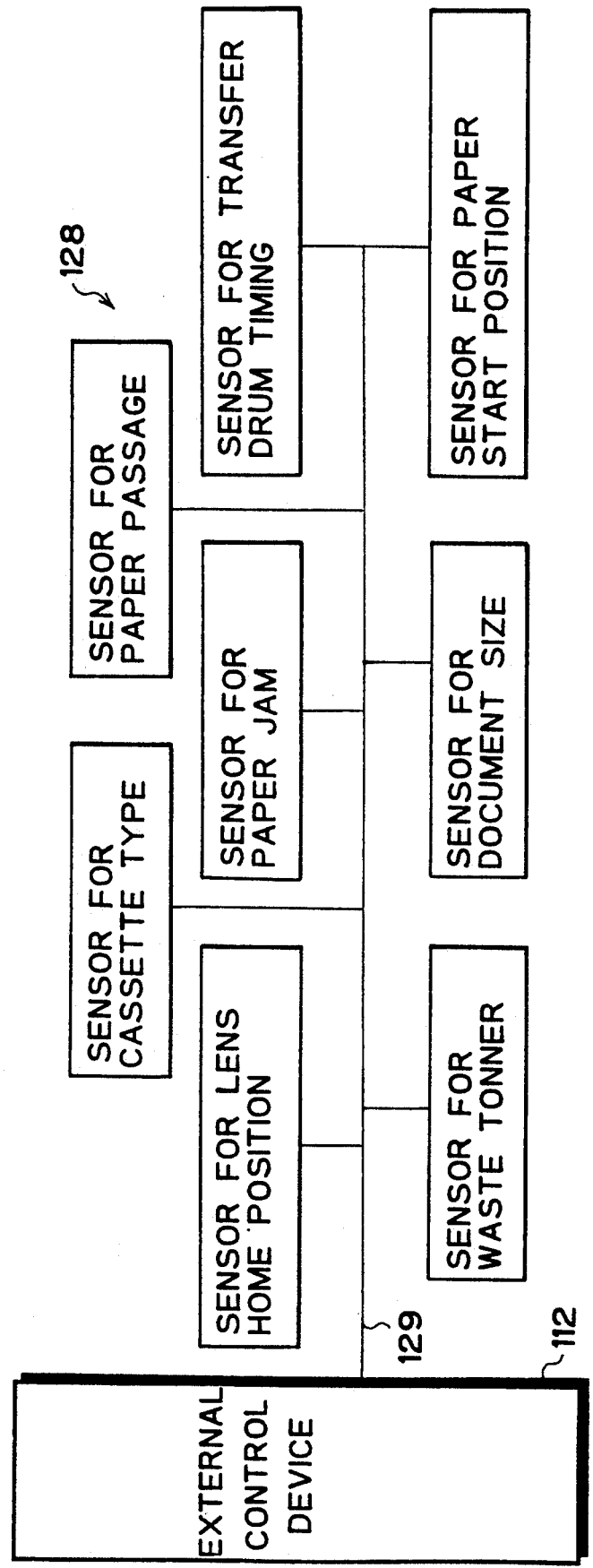
FIG. 16 is a diagram showing system configuration showing an information apparatus having the photo-interrupters shown in FIG. 13.

As shown in FIG. 16, the external control device 112 included in the information apparatus, for example, a copying machine is connected to a sensor 128 composed of a lot of photo-interrupters through a single signal line 129. The control signal or data signal is allowed to transmit through only a single signal line 129.

It results in greatly reducing the number of lead wires and facilitating wiring inside of the information apparatus, thereby reducing the information apparatus in size.

In a case that it is unnecessary to sense an object, the photo-interrupter keeps the waiting state where the power consumption is low, resulting in a reduction of the power consumption.

Figure 17:
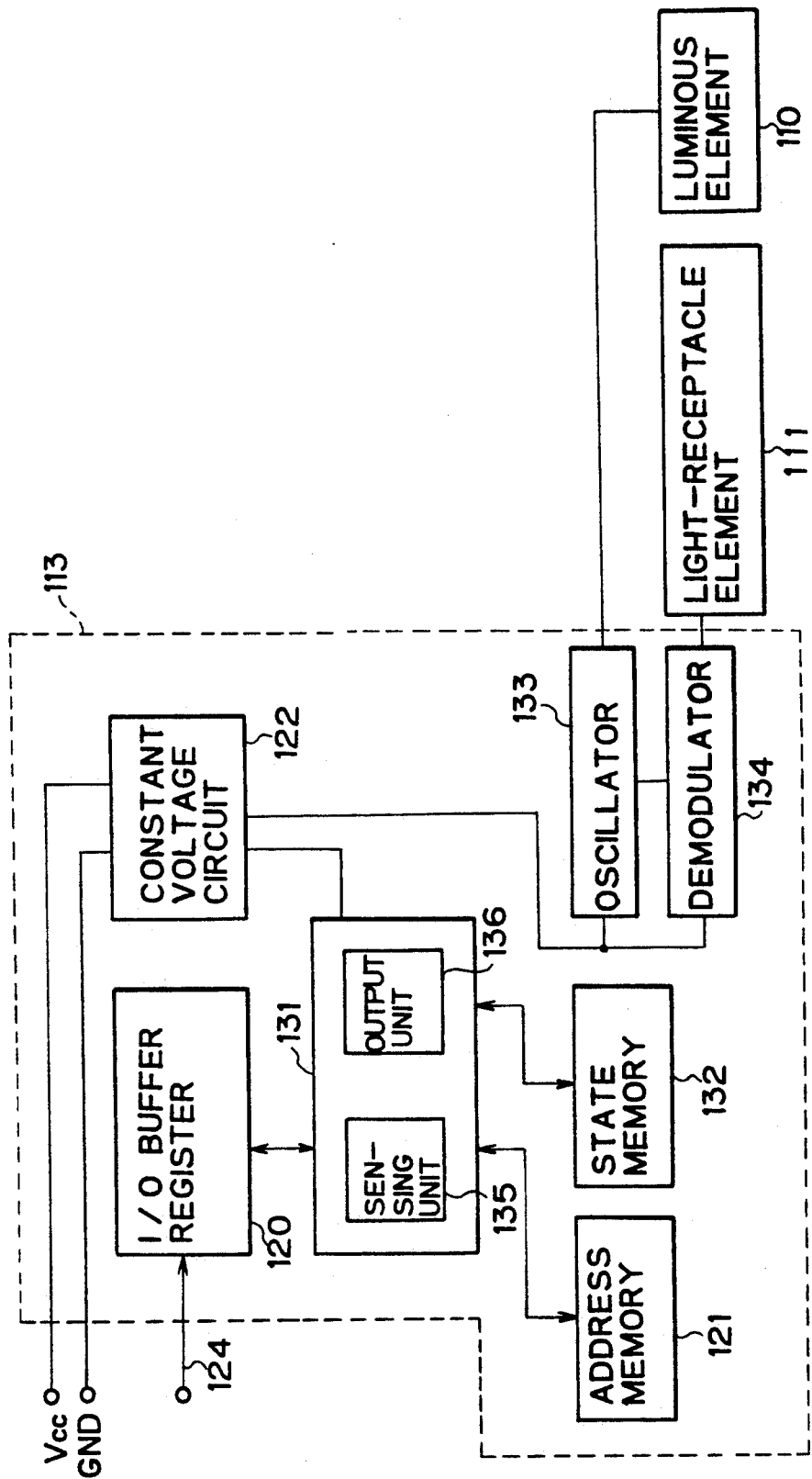
FIG. 17 is a block diagram showing a photo-interrupter according to a second embodiment of the present invention.

FIG. 17 is a block diagram showing a photo-interrupter according to a second embodiment of the present invention. The same components as those of the first embodiment are indicated by the same reference numbers.

As shown in FIG. 17, the photo-interrupter has a control element 113 which is arranged to have a control logic 131 for controlling I/O of a signal to and from the external control device (not shown) and for activating and controlling a luminous element 110 and a light-receptacle element 111, an I/O buffer register 120 for temporarily registering data between the external control device and the control logic 131, a sensing state storing unit (state memory) 132 for storing the sensing state of the current object, a constant voltage circuit 122, an oscillator 133 for driving the luminous element 110 with pulses, the luminous element 110 employing a light modulating system for lowering power consumption and improving tolerant characteristics against disturbed light, and a demodulating circuit 134 for taking a synchronized signal for sensing. For simplifying the arrangement, an asynchronous system may be used.

The control logic 131 includes a sensing unit 135 for supplying a driving signal to the luminous element 110 and the light-receptacle element 111 and an output unit 136 for supplying a self identification code and the changed sensing result to the external control device in a case that the sensing state is changed.

The other arrangement of the second embodiment is the same as that of the first embodiment.

Figure 18:
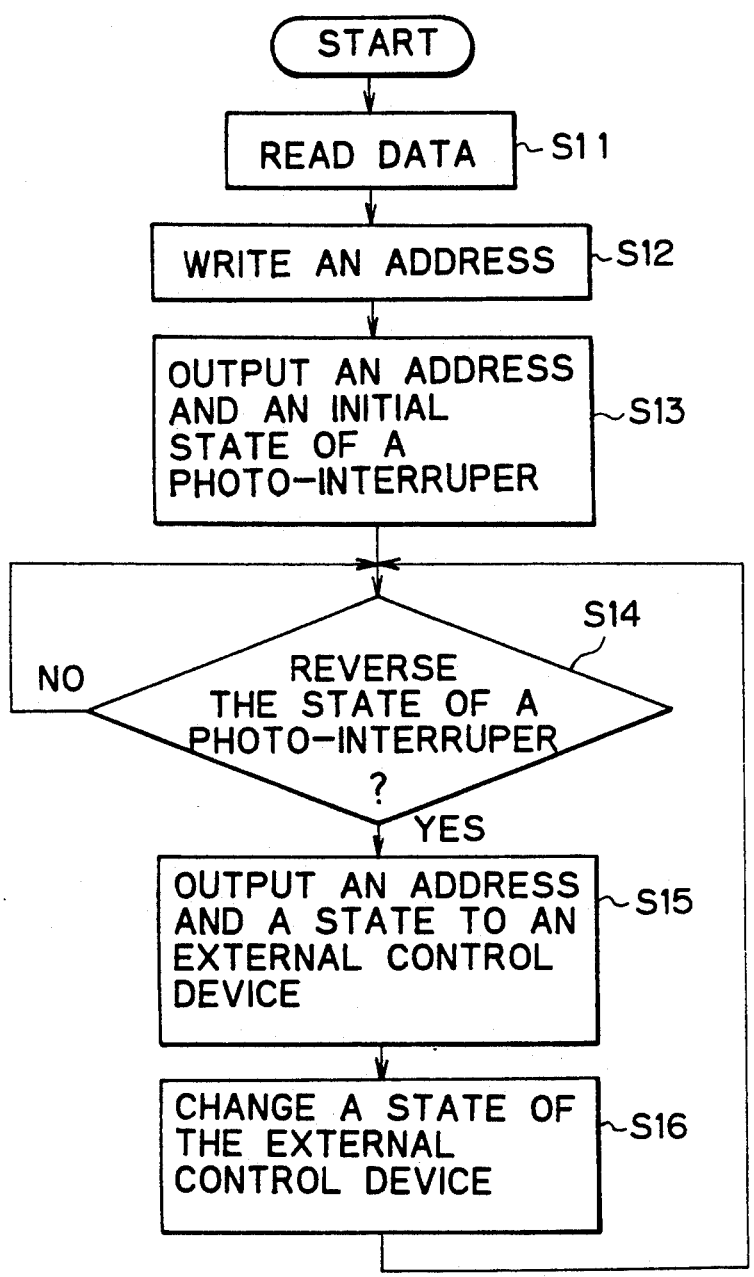
FIG. 18 is a flowchart showing operation of the photo-interrupter shown in FIG. 17.

Next, the operation of the photo-interrupter will be described as referring to the flowchart shown in FIG. 18.

The photo-interrupter reads a data signal sent from the external control device (S11). In a case that the data signal is a writing signal for an address, the address is stored in the address memory 121 (S12).

The address is written in the address memory 121 by using an exclusive memory writer before mounting the photo-interrupter to the information apparatus having the external control device or written by the external control unit located inside of the information apparatus after mounting the photo-interrupter to the information apparatus. For writing an address, it is possible to write the address in the RAM or in the control element 113 with any one of a charge injecting system, a joint destructing system and a fuse melting system. After writing an address, the luminous element 110 is driven with the pulses produced by the oscillator 133. The sensing unit 135 serves to determine whether or not an object is presented depending on the quantity of the light received from the light-receptacle element 111 obtained in the demodulating circuit 134. The initial sensing state of the photo-interrupter is stored in the state memory 132. The output unit 136 serves to supply the initial state information and the self address information to the external control device 112 (S13).

When the sensing state of the photo-interrupter is changed from the state in the absence of an object to the state in the presence of an object and the output of the photo-interrupter is reversed. In this case, the state memory 132 located inside of the control element 113 is reversed so that the changed sensing state is stored in the state memory 132 (S14). At a time, the output unit 136 serves to supply information about a reversed sensing state and a self address to the external control device, in which the sensing state is rewritten so as to correspond to this address (S15, S16).

The photo-interrupter iteratively performs the above-described operation. On the other hand, in a case that the sensing state of the photo-interrupter is not changed at the step S14, the photo-interrupter constantly keeps determining whether or not an object is presented.

As shown in FIG. 16, a lot of photo-interrupters each for carrying out the above-described operation are allowed to be connected to one external control device 112 through a single signal line 129. It results in being able to greatly reduce the lead wires, thereby facilitating wiring inside and reducing the size of the information apparatus.

The synchronous light modulating system for driving the luminous element 110 with pulses or the asynchronous light modulating system for driving the luminous element 110 is employed. It results in being able to provide a low power-consumption photo-interrupter which is excellent in tolerant characteristics against the disturbed light inside of the information apparatus, that is, it is capable of preventing erroneous operation resulting from the distributed light inside of the information apparatus.

Figure 19:
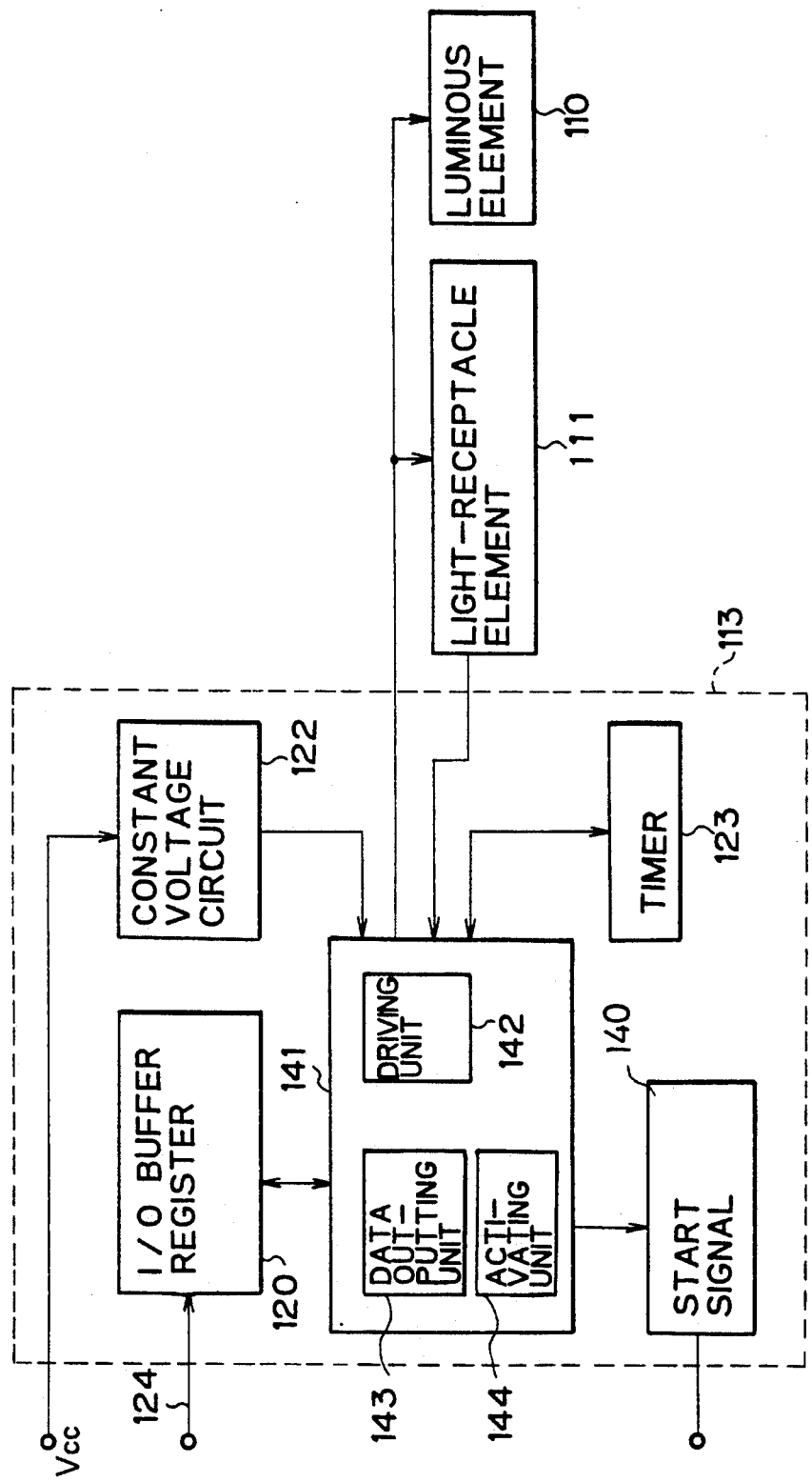
FIG. 19 is a block diagram showing a photo-interrupter according to a third embodiment of the present invention.

FIG. 19 is a block diagram showing a photo-interrupter according to a third embodiment of the present invention. The same components as those of the first and the second embodiments are indicated by the same reference numbers.

The photo-interrupter according to the present embodiment has a control element 113, which is arranged to have a control logic 131 for controlling I/O of a signal to and from the external control device (not shown), for activating and controlling a luminous element 110 and a light-receptacle element 111 and supplying a start signal to another photo-interrupter located at the next stage, an I/O buffer register 120 for temporarily registering data between the external control device and the control logic 131, a constant voltage circuit 122, and a timer for driving the luminous element 110 and the light-receptacle element 111 for a certain period of time.

The control logic 141 includes a driving unit 142 for driving the luminous element 110 and the light-receptacle element 111 in response to an input signal sent from the external control device and a start signal sent from the photo-interrupter located at the previous stage, a data outputting unit 143 for outputting the sensing state of an object to the external control device, and an activating unit 144 for outputting a start signal to another photo-interrupter located at the next stage.

The other arrangement of this embodiment is the same as that of the first embodiment.

Figure 20:
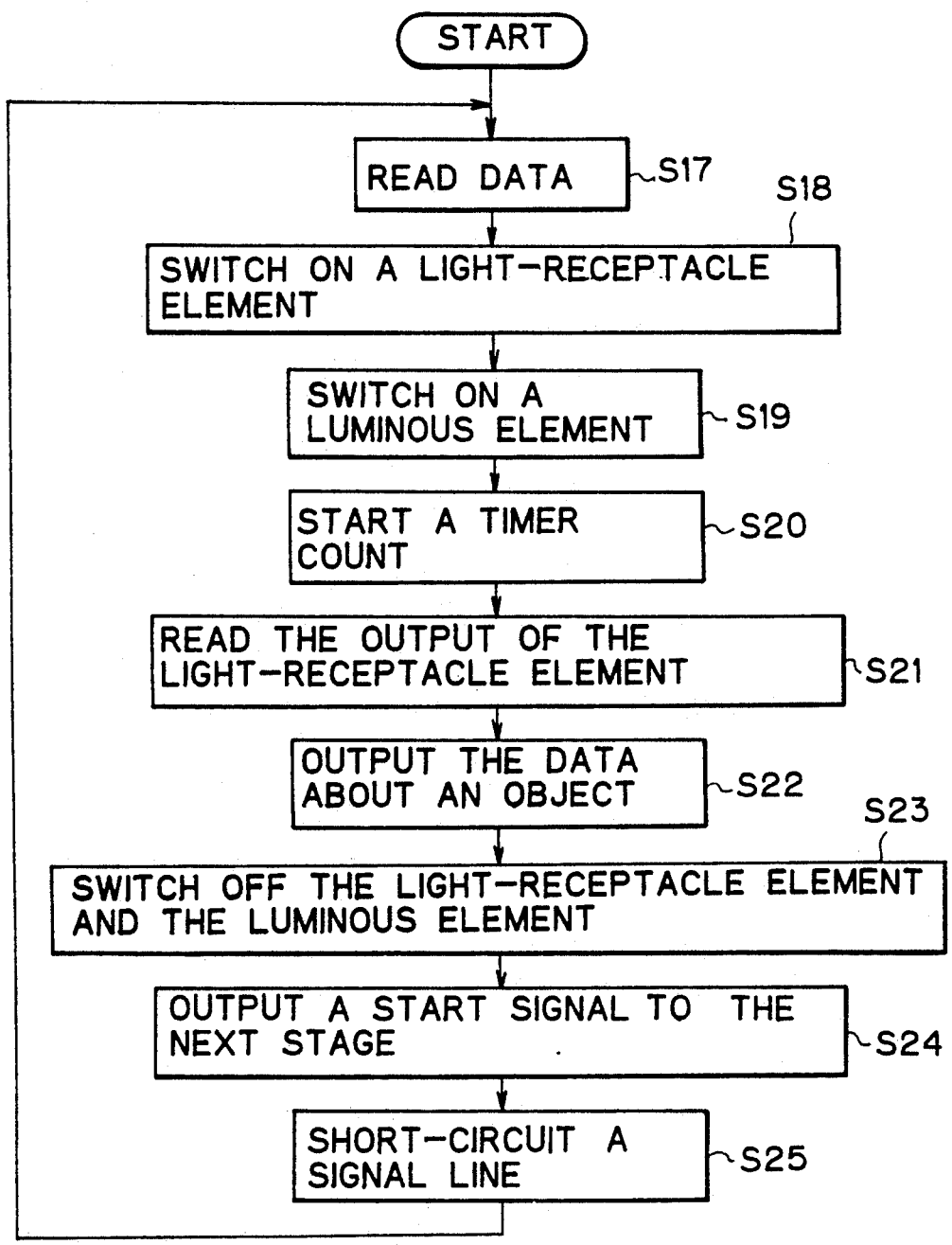
FIG. 20 is a flowchart showing operation of the photo-interrupter shown in FIG. 19.

Next, the operation of the third embodiment will be described as referring to the flowchart shown in FIG. 20.

At first, the photo-interrupter reads a data signal sent from the external control device (S17). With this data signal, the driving unit 142 is operated so as to drive the light-receptacle element 111 (S18) and to drive the luminous element 110 (S19) for a certain period of time (S20). The sensing signal is sent from the light-receptacle element 111 to the data outputting unit 143 of the control logic 141 (S21). The data about whether or not an object exists is output to the external control device (S22).

After outputting the data, the timer 123 deactivates the luminous element 110 and the light-receptacle element 111 (S23). Then, the starting unit 144 outputs a start signal to another photo-interrupter located at the next stage (S24), after the step S24, the data signal about an object sent from the photo-interrupter located at the next stage is directly passed to the external control device 112 through the I/O register 120 without temporarily sending to the control logic 141, that is, the signal line is in a short-circuiting state (S25).

The photo-interrupter at the next stage performs the same operation as mentioned above. After outputting the data and the start signal, a data output terminal 124 and a start signal 124' are short-circuited inside of the photo-interrupter. It results in allowing the output signal of the photo-interrupter at the next stage to be input to the external control device.

As described above, the photo-interrupter is arranged to have the starting unit 144 for outputting a start signal to the photo-interrupter located at the next stage.

Figure 21:
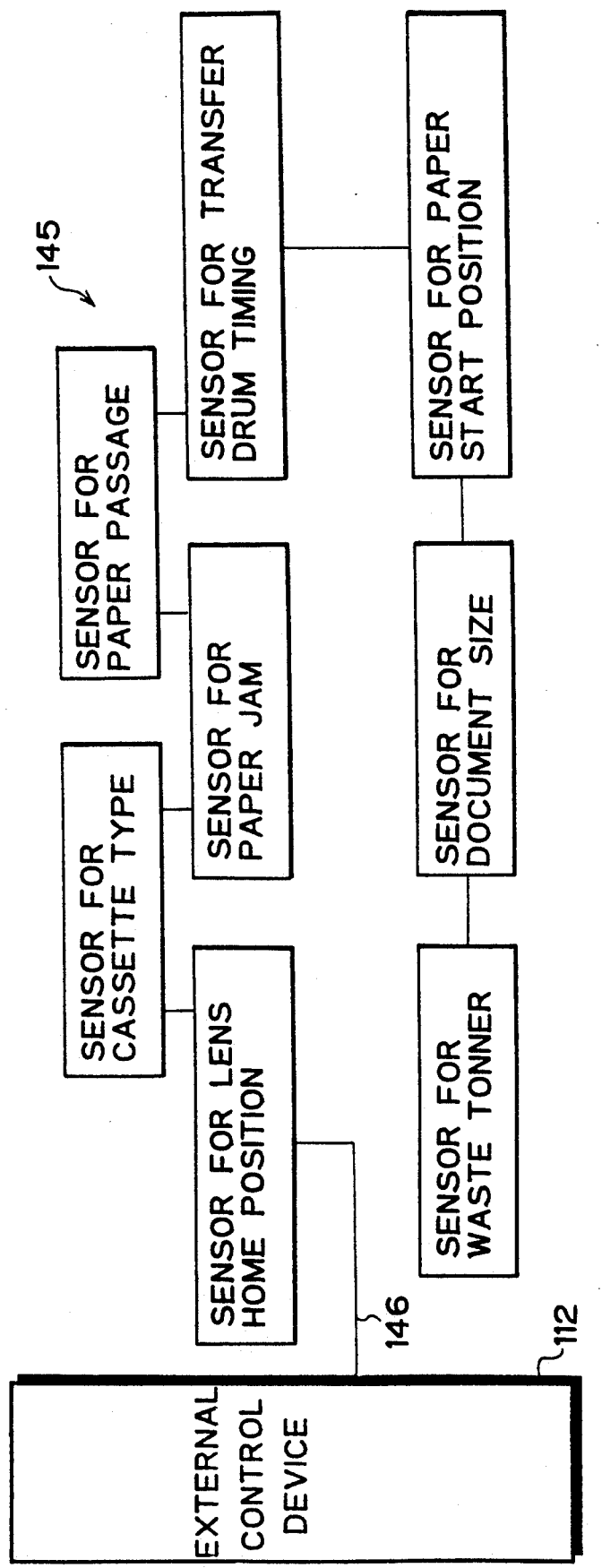
FIG. 21 is a diagram showing system configuration of an information apparatus having the photo-interrupters shown in FIG. 19.

As shown in FIG. 21, the external control device 112 located inside of the information apparatus such as a copying machine enables a plurality of sensors 145 each using the photo-interrupter, which are connected in series through a signal line 146.

It results in enabling to greatly reduce lead wires, thereby facilitating wiring inside and reducing the size of the information apparatus.

Only if an operation signal is output to the photo-interrupter located at the first stage, the second or later photo-interrupters are sequentially operated. It makes possible to simplify the control software for the photo-interrupters.

In addition, the foregoing embodiments employ transmission type photo-interrupters. A reflection type photo-interrupter may be used. The control element 113 and the light-receptacle element 111 have been mounted on respective chips. They may be mounted on one chip.

Figure 22:
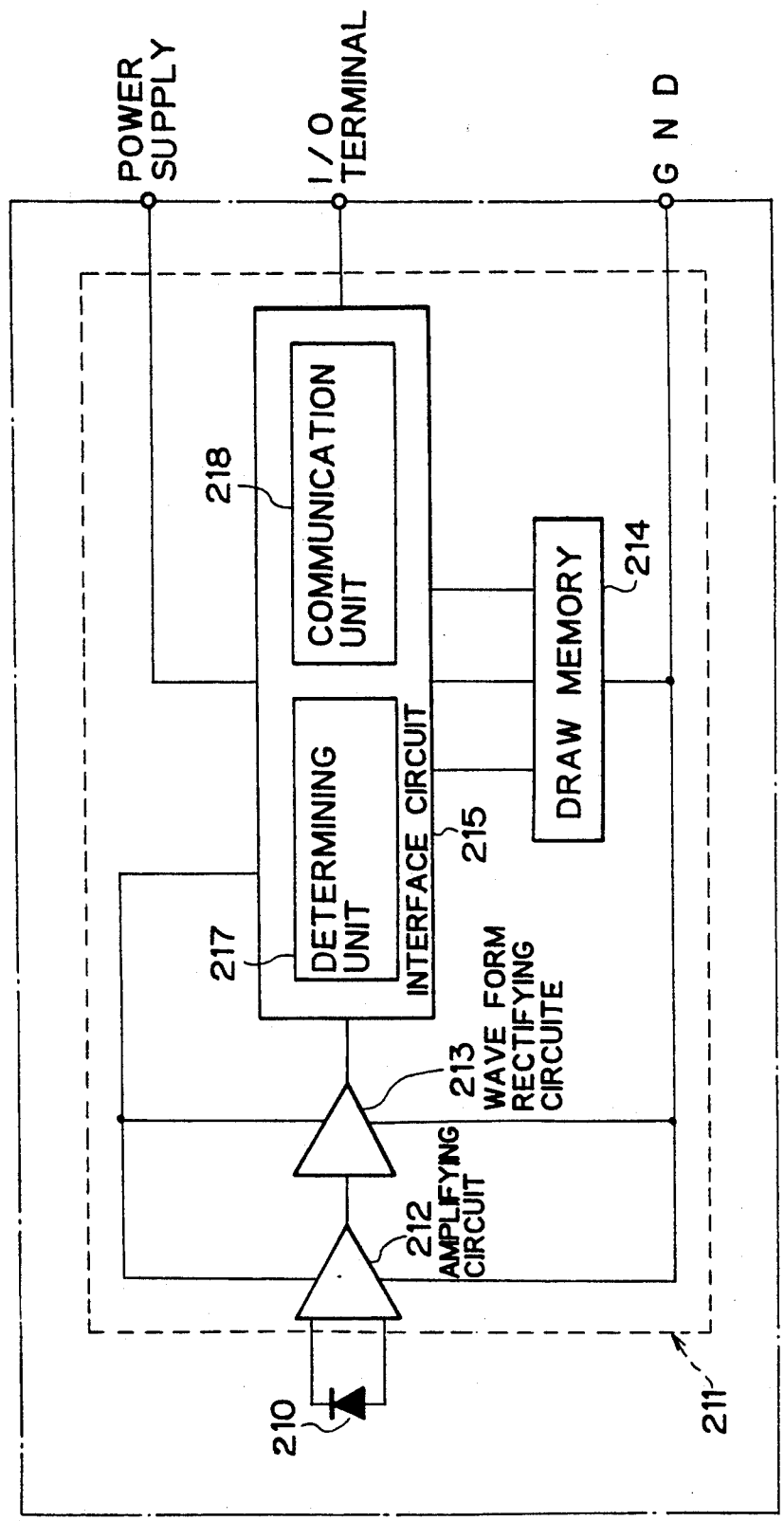
FIG. 22 is a circuit diagram showing a light-receptacle device according to a fourth embodiment of the present invention.

FIG. 22 is a circuit diagram showing a light-receptacle device according to a fourth embodiment of the present invention.

As shown in FIG. 22, the light-receptacle device is arranged to have a light-receptacle chip (photo-diode) 210 and a light sensing circuit (signal processing IC) 211 for processing a signal sent from the photo-diode 210.

The light sensing circuit 211 is arranged to have an amplifying circuit 212 for amplifying an output of the photo-diode 210, a waveform rectifying circuit 213 for rectifying a waveform of the amplified output of the photo-diode 210, a DRAW (direct read after write) memory 214 for storing an identification code (ID number), and an interface circuit 215 for communicating with an external control device (CPU).

The interface circuit 215 includes a determining unit 217 for recognizing an ID number sent from the external control device and determining whether or not a self ID number stored in the DRAW memory 214 coincides with the received ID number and a communication unit 218 for switching on the light sensing circuit 211 and supplying an output to the external control device in a case that both of the ID numbers coincide with each other.

The photo-diode 210, the amplifying circuit 212, the waveform rectifying circuit 213, the DRAW memory 214 and the interface circuit 215 are all mounted on a single chip.

Figure 23:
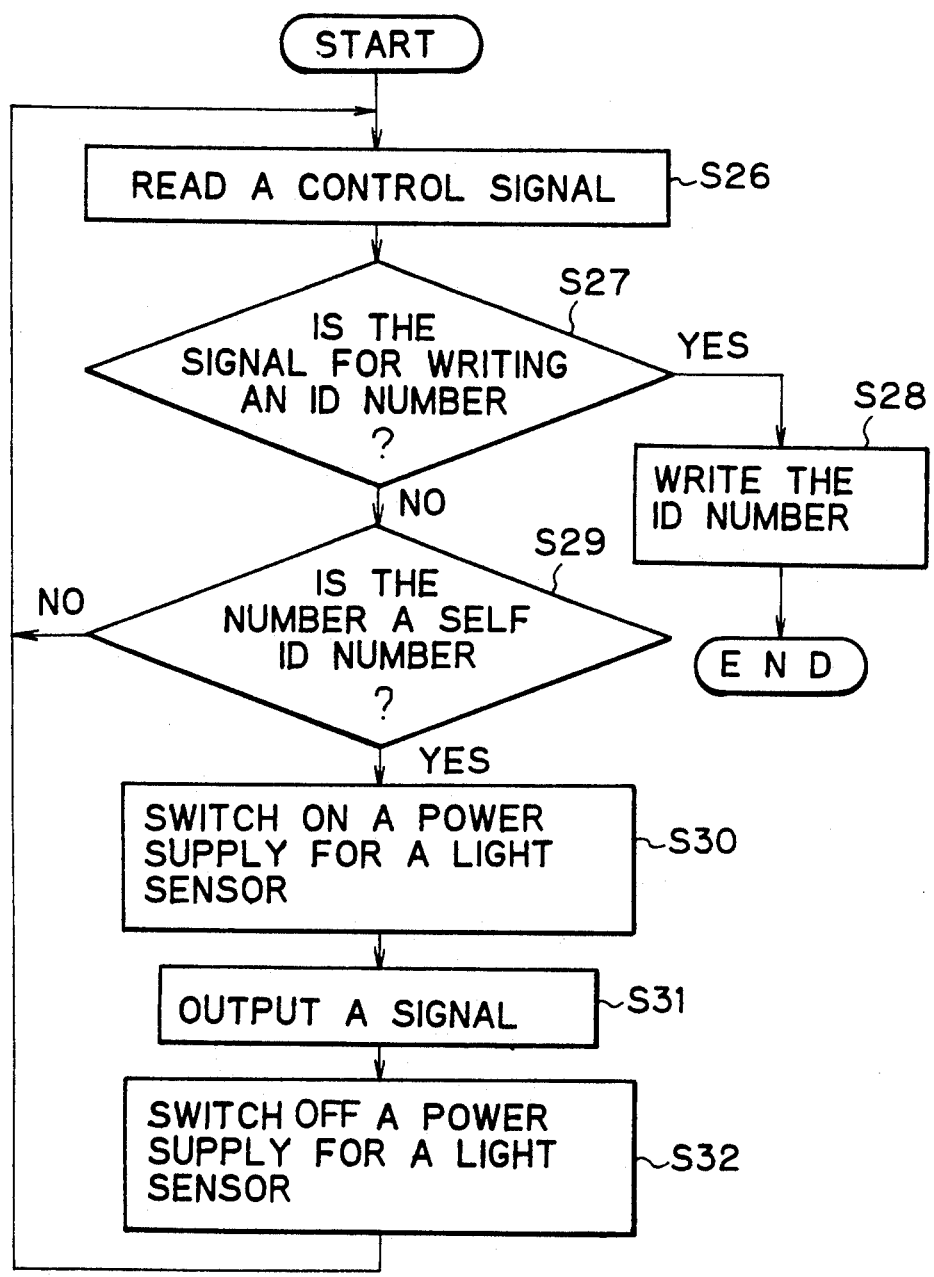
FIG. 23 is a flowchart showing operation of the light-receptacle device shown in FIG. 22.

Next, the operation of the light-receptacle device according to this embodiment will be described as referring to FIG. 23.

The light-receptacle device reads a control signal sent from the external control device (S26), and the determining unit 217 of the interface circuit 215 determines whether or not the read control signal is for writing an ID number (S27). If the read control signal is for writing the ID number, write the read ID number in the DRAW memory 214 (S28). On the other hand, if the read control signal is not for writing the ID number, then the determining unit 217 of the interface circuit 215 determines whether or not the read ID number coincides with the self ID number stored in the DRAW memory 214 (S29).

In a case that the ID numbers coincide with each other, the light-receptacle device enters into the waiting state.

On the other hand, in a case that the ID numbers coincide with each other, the amplifying circuit 212 and the waveform shaping circuit 213 of the light sensing circuit 211 are both switched on. With those circuits being switched on, the light sensing circuit 211 serves to sense a light signal incident from the photo-diode 210 (S30). The sensing signal is passed through the amplifying circuit 212 and the waveform rectifying circuit 213 and is output from the communication unit 218 of the interface circuit 215 to the external control device (S31).

Then, the amplifying circuit 212 and the waveform rectifying circuit 213 are both switched off and the light-receptacle device returns to the waiting state (S32).

The ID number is written in the DRAW memory by using an exclusive writer before mounting the light-receptacle device to the information apparatus. The DRAW memory 214 may employ a ROM, an electric injecting system, a junction breakdown system or a fuse melting system.

As described above, the light sensing circuit 211 is arranged to include the storage unit 214 for storing the ID number, the determining unit 217 for recognizing the ID number sent from the external control device and determining whether or not the ID number coincides with the self ID number stored in the storage unit 214, and the communication unit 218 for switching on the light sensing circuit 211 and outputting a signal to the external control device in a case that it is determined the ID number coincides with the self ID number stored in the storage unit 214.

Figure 24:
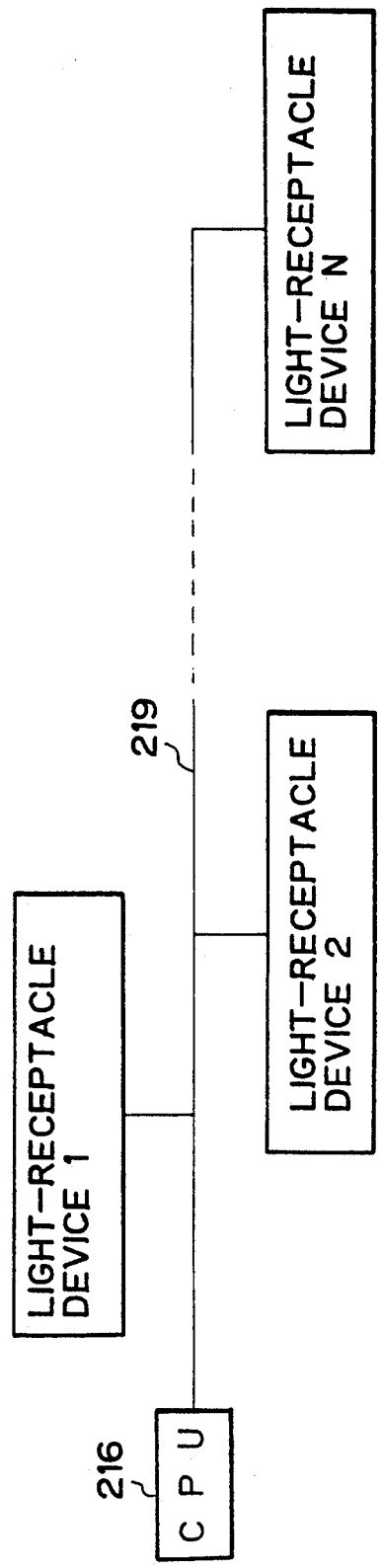
FIG. 24 is a diagram showing system configuration of an information apparatus having the light-receptacle devices shown in FIG. 22.

As shown in FIG. 24, consider that a plurality of light-receptacle elements are provided and data is transferred between the external control device and the total numbers N of light-receptacle elements. The control signal and the data signal are allowed to be transmitted through one transmission line 219.

It results in enabling to greatly reduce lead wires, thereby facilitating wiring inside and reducing the size of the information apparatus.

Further, the light sensing circuit 211 may be switched off if not necessary. It makes contribution to lowering an power consumption.

Figure 25:
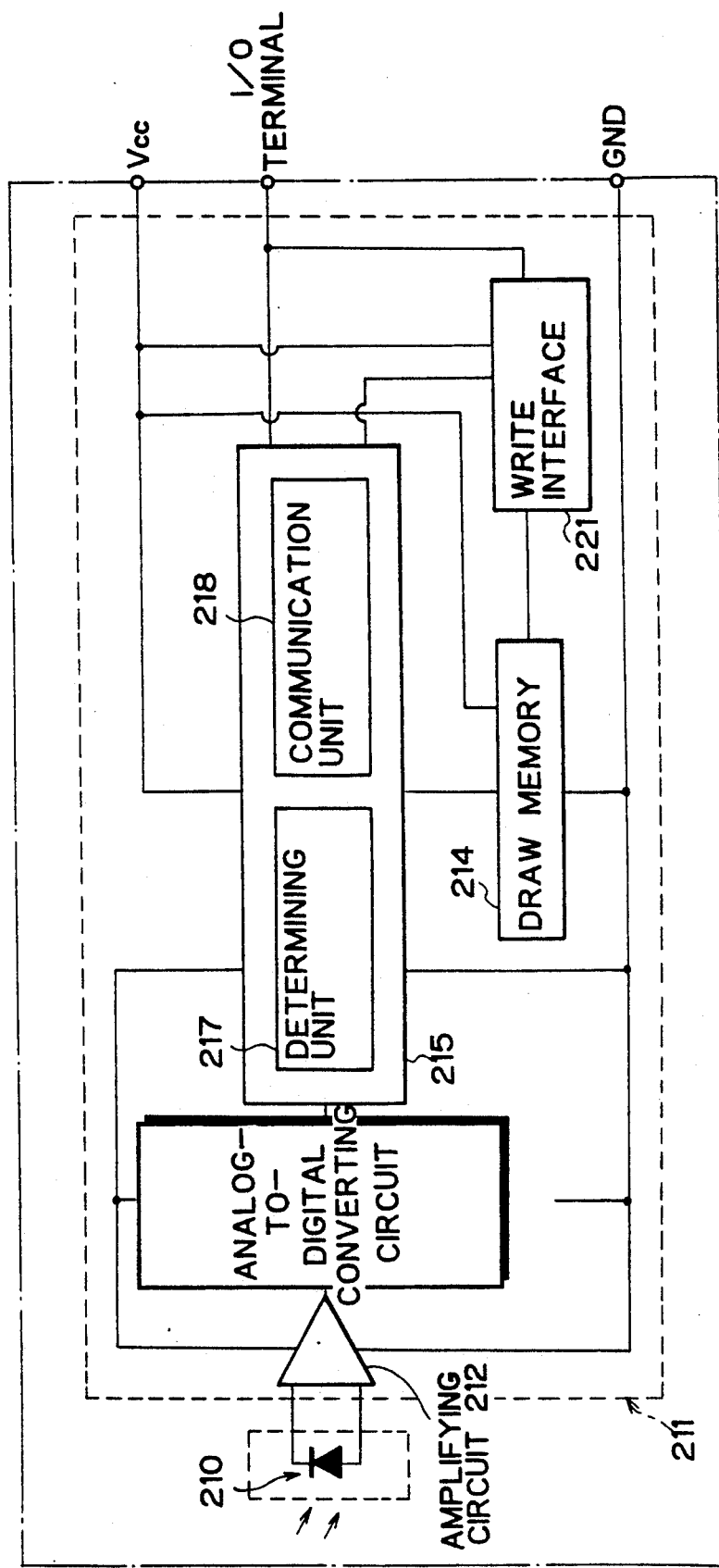
FIG. 25 is a block diagram showing a light-receptacle device according to a fifth embodiment of the present invention.

FIG. 25 is a block diagram showing a light-receptacle device according to a fifth embodiment of the present invention.

As shown in FIG. 25, the light sensing circuit 211 is arranged to have an amplifying circuit 212, an analog-to-digital converting circuit 220, an address memory 214 for storing an address number, a communication interface circuit 215 having a determining unit 217 and a communication unit 218, and a write interface 221 for writing an address. The other arrangement of this embodiment is the same as that of the fourth embodiment.

Figure 26:
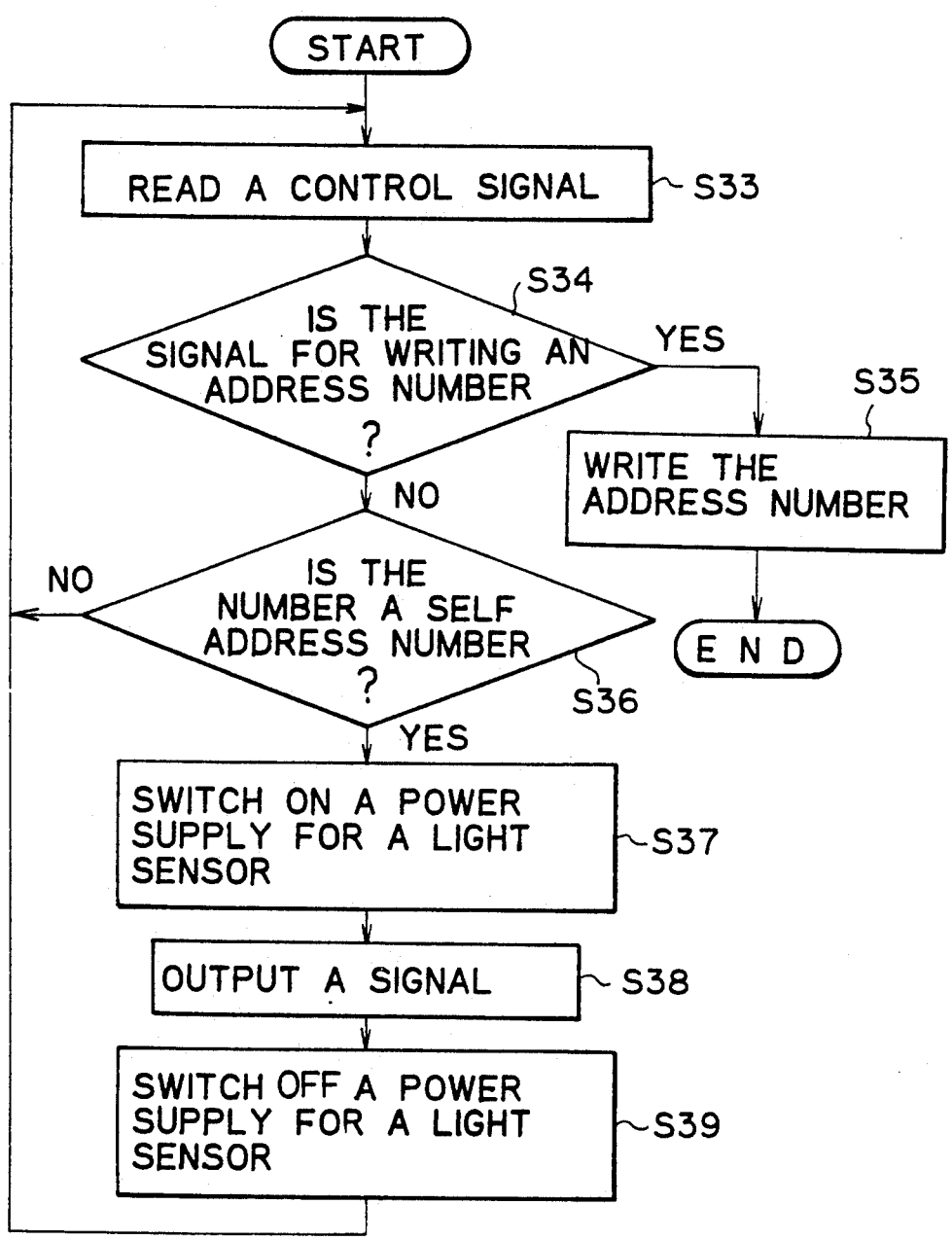
FIG. 26 is a flowchart showing operation of the light-receptacle device shown in FIG. 25.

Next, the operation of the light-receptacle device will be described as referring to the flowchart shown in FIG. 26.

Before incorporating the light-receptacle device to the information apparatus, an address number is written in the address memory 214 through the address write interface 221 (S33, S34).

The address memory 214 may employ a charge injecting system, a junction breakdown system or a fuse melting system ROM. Alternatively, after incorporating the light-receptacle device to the apparatus, the control device of the information apparatus may write an address number in the address memory 214. In this case, the address memory 214 may use a RAM in addition to the ROM. Further, the combination of the write interface 221 and the communication interface circuit 215 is made possible. In this case, both of the interfaces use one terminal.

With any one of the above systems, an address is written in the address memory 214 (S35). The control signal, sent from the external control device included in the information apparatus, is picked up on a bus line. Then, the determining unit 217 of the interface circuit 215 determines whether or not the address number coincides with the self address number stored in the address memory 214 (S36). In a case that the numbers do not coincide with each other, the light-receptacle device enters into a waiting state.

On the other hand, in a case that the numbers coincide with each other, the amplifying circuit 212 and the analog-to-digital converting circuit 220 of the light sensing circuit 211 are switched on for sensing a light signal incident to the photo-diode 210 (S37). Then, the sensing signal is passed through the amplifying circuit 212 and the analog-to-digital converting circuit 220 and is output onto the bus line through the communication unit 218 of the interface circuit 220, finally to the external control device (S38).

After outputting the sensing signal, the amplifying circuit 212 and the analog-to-digital converting circuit 220 are both switched off. Then, the light-receptacle element returns to the waiting state (S39).

The light-receptacle element of this embodiment operates in the above-described manner for providing the same advantages as the fourth embodiment.

Figure 27:
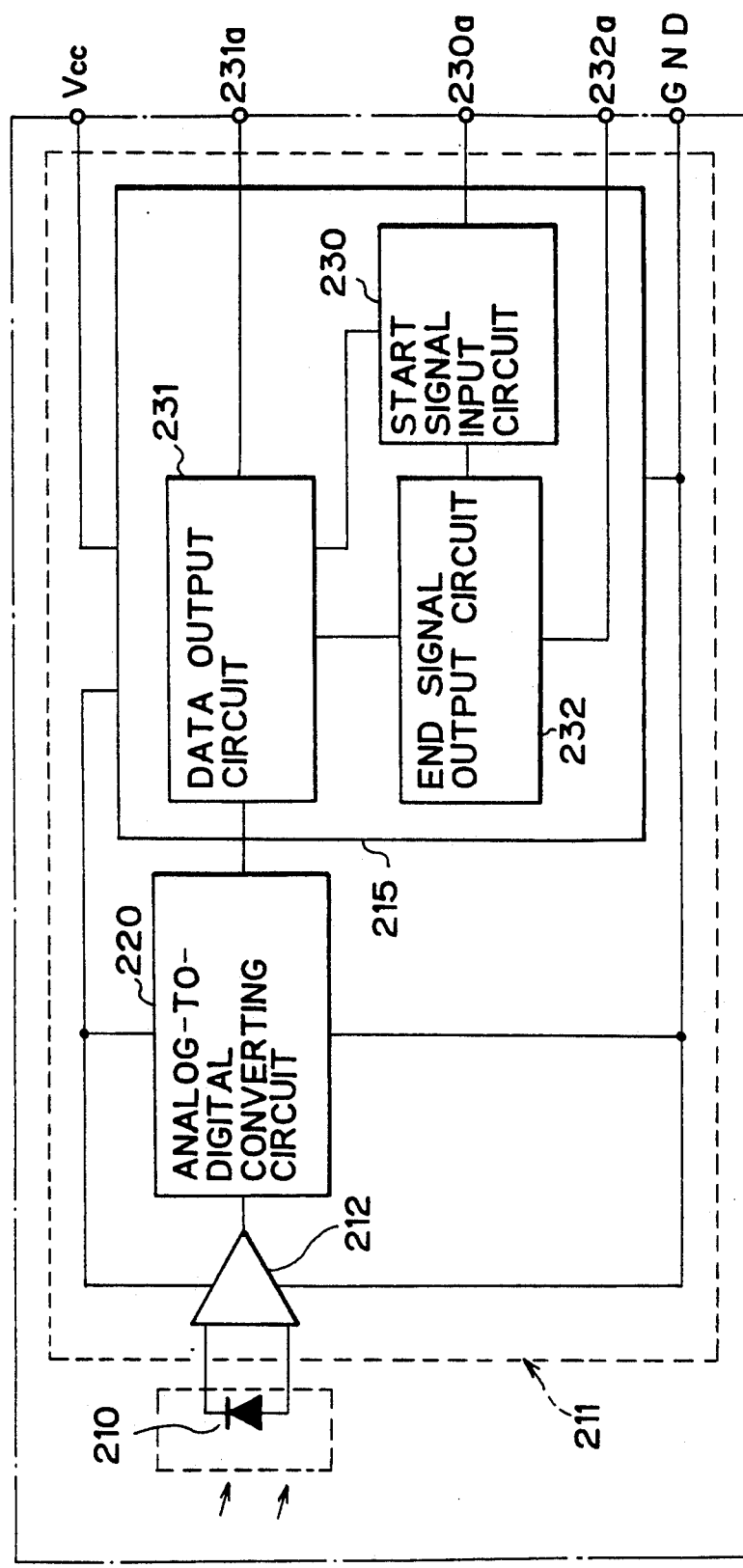
FIG. 27 is a block diagram showing a light-receptacle device according to a sixth embodiment of the present invention.

FIG. 27 is a block diagram showing a light-receptacle device according to a sixth embodiment of the present invention.

As shown in FIG. 27, the light sensing circuit 211 of this embodiment is arranged to have an amplifying circuit 212, an analog-to-digital converting circuit 220, and a communication interface circuit 215.

The communication interface circuit 215 includes a start signal input circuit 230 for receiving a control signal from the external control device or an end signal from the light-receptacle device located at the previous stage, recognizing the signal as a start signal and switching on the light sensing circuit 211, a data output circuit 231 for outputting from the light sensing circuit 211 to the external control device the data about the sensing result of the light signal incident to the photo-diode 230, and an end signal output circuit 232 for sending the sensing data from the data output circuit 231, outputting an end signal to the light-receptacle element located at the next stage, and switching off the light sensing circuit 211.

As shown in FIG. 27, 230a denotes an input terminal of the start signal input circuit, 231a denotes an output terminal of a data output circuit 231, and 232a denotes an output terminal of the end signal output circuit 232.

In the foregoing arrangement, when the start signal is input from the external control device, the start signal input circuit 230 serves to switch on the amplifying circuit 212 and the analog-to-digital converting circuit 220 included in the light sensing circuit 211. The light sensing circuit 211 senses a light signal incident to the photo-diode 210 and supplies a data signal corresponding to the incident light to the amplifying circuit 212, the analog-to-digital converting circuit 220 and the data output circuit 231, finally to the external control device on the bus line.

The end signal output circuit 232 supplies an end signal to the start signal input circuit 230 included in the light-receptacle device located at the next stage. At a time, the end signal output circuit 232 switches off the amplifying circuit 212 and the analog-to-digital converting circuit 230, resulting in returning the light-receptacle element to a waiting state.

The start signal input circuit 230 of the light-receptacle element located at the next stage receives as a start signal the end signal supplied from the light-receptacle device located at the previous stage and performs the same operation as that included in the previous-stage light-receptacle element.

Figure 28:
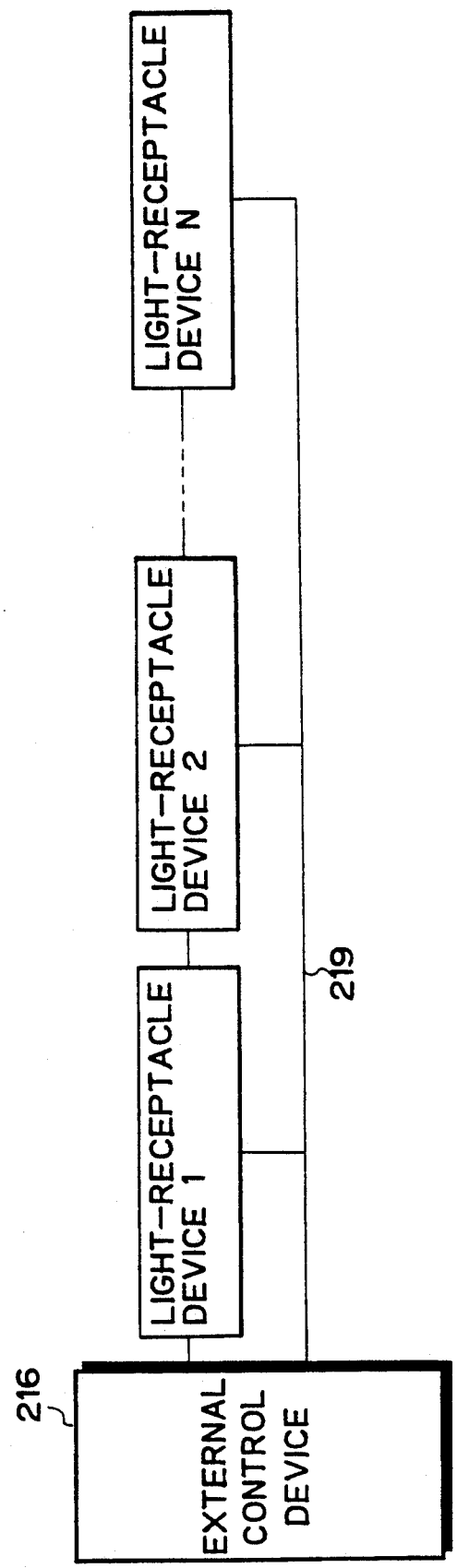
FIG. 28 is a diagram showing system configuration of an information apparatus having the light-receptacle devices shown in FIG. 27.

As shown in FIG. 28, in a case that a plurality of light-receptacle devices having the foregoing arrangement and operation are ranged and data is transferred between the total numbers N of light-receptacle devices and the external control device 216, the start signal input terminal 230a of the first light-receptacle device is connected to the external control device 216, the end signal output terminal 232a of the first light-receptacle device is connected to the start signal output terminal 230a of the second light-receptacle element, . . . , the start signal input terminal 230a of the N−1 light-receptacle device is connected to the end signal input terminal 232a of the N light-receptacle device. The data output terminals 231a of the light-receptacle devices are connected to one common signal line 219.

That is, for sequentially inputting the data from each light-receptacle device to the external control device 216, only two lines are provided between the light-receptacle devices and the external control device 216 and the start signal is sent from the external control device 216 to the first light-receptacle device.

The other arrangement and advantage of this embodiment is the same as those of the fourth embodiment.

In addition, though in the above embodiment the photo-diode and the signal processing circuit (light sensing circuit) are mounted on one chip, they may be mounted on respective chips. Further, in place of the photo-diode, a photo-transistor may be used.

Figure 29:
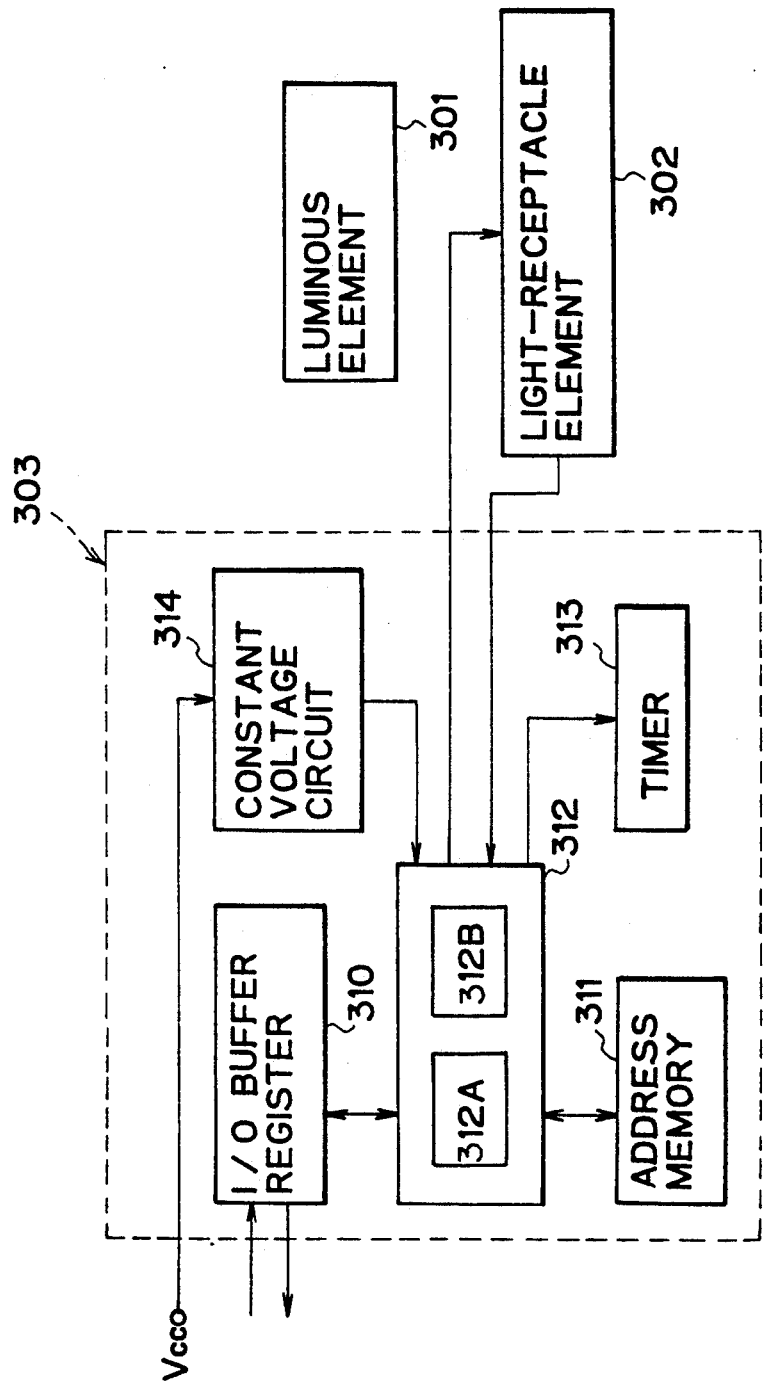
FIG. 29 is a block diagram showing a photo-coupler for input according to a seventh embodiment of the present invention.

FIG. 29 is a block diagram showing a photo-coupler for input according to a seventh embodiment of the present invention.

The photo-coupler according to the present embodiment is used for a programmable controller of an information apparatus such as a printer, a facsimile or a copying machine, for example. The photo-coupler is, in large, divided into a photo-coupler for inputting data to an external control device (not shown) and a photo-coupler for outputting data to an external component to be controlled.

Figure 32:
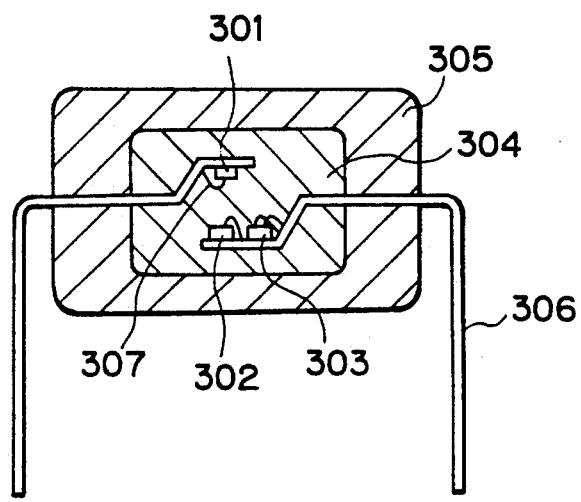
FIG. 32 is a sectional view showing structure of the photo-coupler for input shown in FIG. 29.

As shown in FIG. 32, the photo-coupler for input provides a luminous element 301, a light-receptacle element 302 and a control element (IC) 303 for controlling the light-receptacle element 302. Those components are molded in a dual manner by using a transparent resin 304 and a light-screening resin 305. 306 is a lead frame and 307 is a bonding wire.

As shown in FIG. 29, the control element 303 is mounted on another chip rather than the light-receptacle element 302. The control element 303 is arranged to have an I/O buffer register 310 for storing data for writing an address and data for controlling operation of a photo-coupler, the data being input from a data bus, an address memory 311 for storing an identification code (address), a control logic 312 for controlling the operation of the light-receptacle element 312, a timer 313 for driving the light-receptacle element 302 for a constant time, and a constant voltage circuit 314.

The control logic 312 is arranged to have a determining unit 312A for determining whether or not the address input from the external control device coincides with a self address stored in the address memory 311 and a driving unit 312B for driving the light-receptacle element 302 in a case that both of the addresses coincide with each other.

The control logic 312 also has a function of determining whether or not the data for controlling the photo-coupler is to be input.

Figure 33:
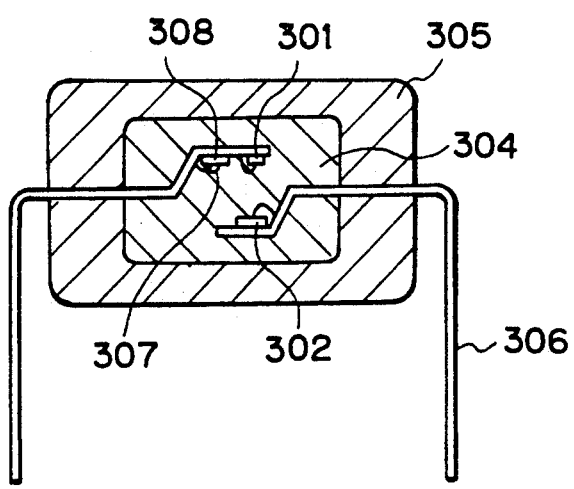
FIG. 33 is a sectional view showing structure of the photo-coupler for output shown in FIG. 30.

The photo-coupler for output is, as shown in FIG. 33, arranged to have a luminous element 301, a light-receptacle element 302 and a control element 308 for controlling operation of the luminous element 301 and the light-receptacle element 302.

Figure 30:
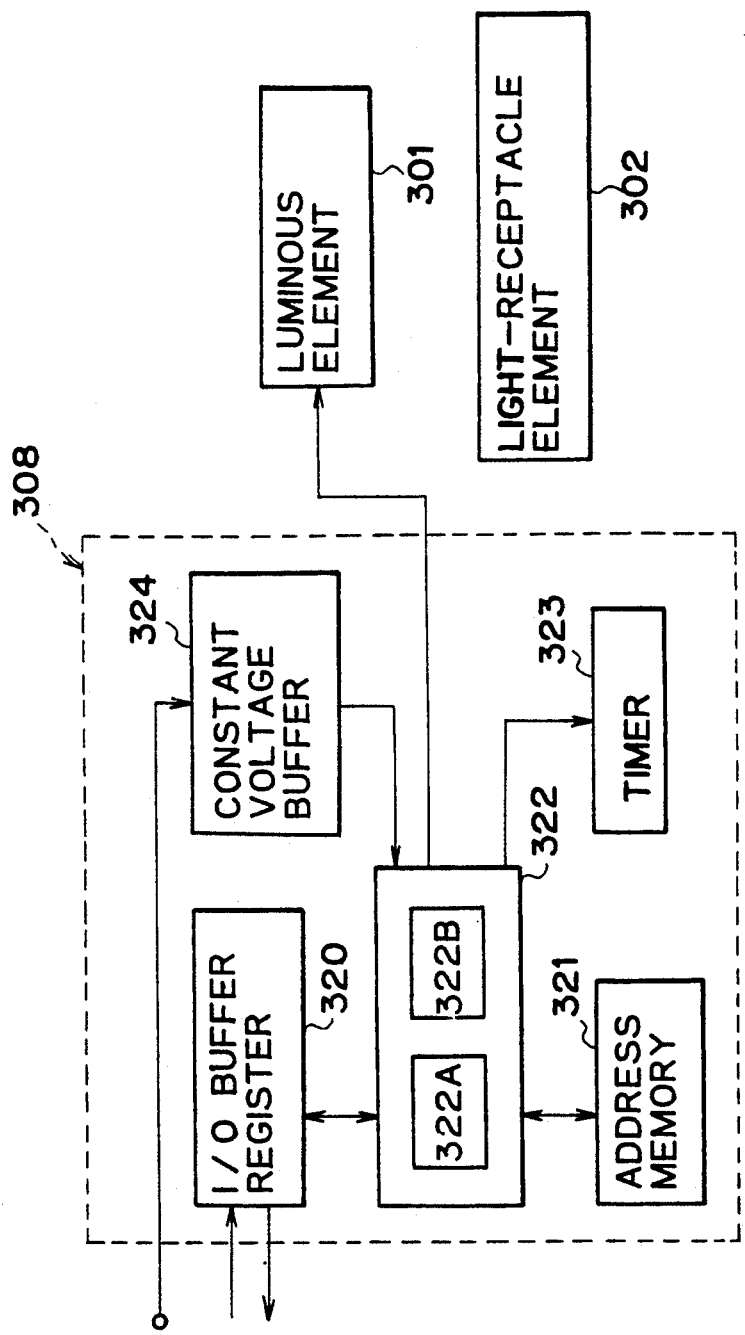
FIG. 30 is a block diagram showing a photo-coupler for output according to the seventh embodiment of the present invention.

As shown in FIG. 30, the control element 308 is mounted on another chip rather than the luminous element 301. The control element 308 is arranged to have an I/O buffer register 320 for storing data for writing an address and data for controlling operation of the photo-coupler, both of the data being input from a data bus, an address memory 321 for storing an address, a control logic 322 for controlling the luminous element 301, a time 323 for driving the luminous element 301 for a constant time, and a constant voltage circuit 324.

The control logic 322 is arranged to have a determining unit 322A for determining whether or not the address input from the external control device coincides with a self address stored in the address memory 321 and a driving unit 322B for driving the luminous element 301 in a case that both of the addresses coincide with each other.

The control logic 322 also has a function of determining whether or not the data for controlling operation of the photo-coupler is to be output and of determining whether or not the luminous element 301 is switched on in a case that it is determined that the data is to be input.

The data processing operation of each photo-coupler will be described as referring to FIGS. 29, and FIG. 31 composed of FIGS. 31A and 31B.

The data for writing an address and the data for controlling the photo-coupler are sent from the external control device to a data bus (S40. Both of the data are stored in the I/O buffer registers 310 and 320 of each photo-coupler.

In a case that the data is for writing an address, the control logic 312, 322 serve to write addresses into the address memories 311 and 321 (S41, S42).

For writing an address, it is possible to employ a RAM, a charge injecting system, a junction breakdown system or a fuse melting system. The charge injecting system is for injecting charges to the ICs (control elements) 303 and 308. The address is written to the control logic by using an exclusive memory writer before mounting the photo-coupler to the programmable controller of the information apparatus. Alternatively, after mounting the photo-coupler, the address is written by the external control device included in the information apparatus.

After writing the address, in a case that an address signal is input from the external control device included in the information apparatus, the determining units 312A and 322A of the control logic 312 and 322 serve to determine whether or not the input address signal coincides with a self address (S43).

In a case that it does not, the photo-coupler carries out nothing and waits for a next coming address signal.

On the other hand, in a case that it does, the control logic 312 and 322 determine whether or not the data for controlling the photo-coupler is to be input (S44).

In case of the control logic 312 of the photo-coupler for input determines that the data is for input, the driving unit 312B of the control logic 312 serves to start the light-receptacle element 302 (S45). Then, after the timer 313 counts for a certain time (S46), the output state of the light-receptacle element is read (S47) and is output to the bus line (S48). The driving unit 312B then cuts the current flowing through the light-receptacle element 302, resulting in returning the photo-coupler to the waiting state (S49).

In case of the control logic 322 of the photo-coupler for output determines that the data is for output (S44), the determining unit 322A of the control logic 322 determines whether or not the luminous element 301 is to be switched on (S50).

In a case that the luminous element 301 is determined to be switched on, the driving unit 322B of the control logic 322 serves to switch on the luminous element 301 (S51). Then, after the timer 323 keeps the luminous element 301 on for a constant time, the luminous element 301 is entered into the waiting state (S53).

On the other hand, in a case that the luminous element 301 is determined to be switched off, the timer 323 keeps the luminous element 301 off for a constant time (S52), then, the luminous element 301 is entered into the waiting state (S53).

That is, when an address is input from the external control device, the photo-coupler for input determines whether or not the input address coincides with the self address. In a case that it does, the photo-coupler reads the state of the light-receptacle element.

The photo-coupler for output determines whether or not the address input from the external control device coincides with the self address. The predetermined operation done in a case that both of the addresses coincide with each other makes it possible to keep current flowing through the luminous element until the next coming address becomes equal to the self address.

As mentioned above, the photo-coupler according to the present embodiment is arranged to have a storage unit 311, 321 for storing an address in itself, determining unit 312A, 322A for determining whether or not the address input from the external control device coincides with the address stored in the storage units 311, 321, and the driving unit 312B, 322B for driving the luminous element 301 or the light-receptacle element 302 in a case that the determining units 312A, 322A determines that the input address coincides with the self address.

Figure 34:
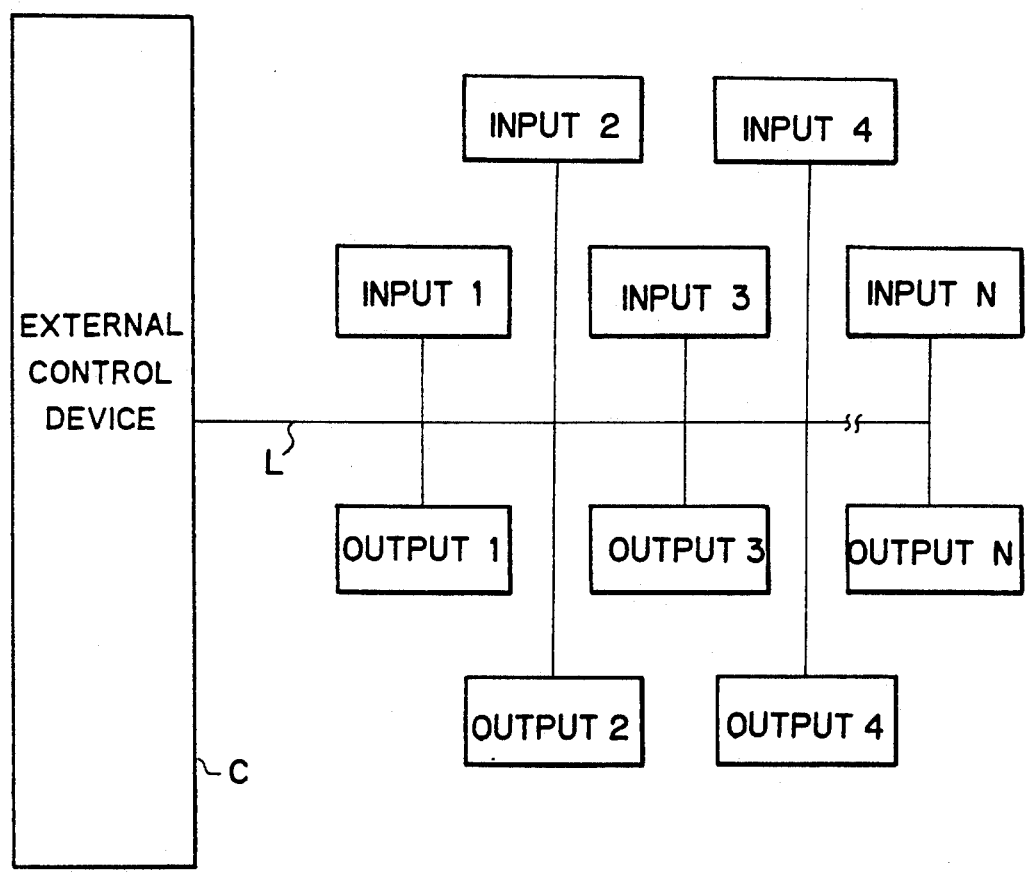
FIG. 34 is a diagram showing system configuration of an information apparatus having photo-interrupters for input and output shown in FIGS. 29 and 30.

As shown in FIG. 34, a plurality of photo-couplers for input (inputs 1 to N) and photo-couplers for output (output 1 to N) are ranged in the programmable controller of the information apparatus. The input from the external control device C to the photo-coupler and the output from the photo-coupler to the external control device C are allowed to be executed through only a single signal line L.

It results in enabling to reduce the lead wires on the substrate pattern and inside of the information apparatus, thereby reducing the size of the information apparatus.

The photo-coupler for input serves to flow the current for reading the state of the light-receptacle element only when the equal address is input. Since the current does not flow, it results in reducing the power consumption.

Figure 35:
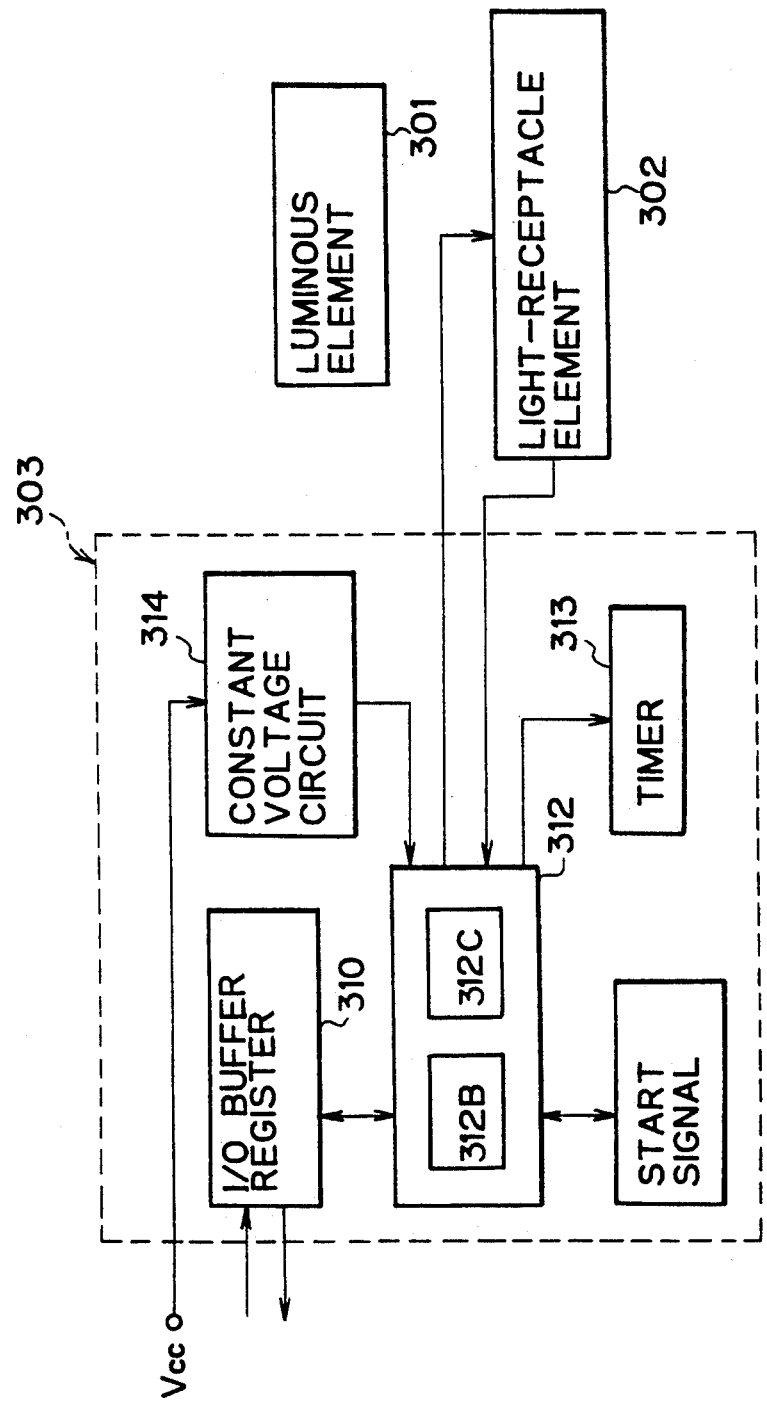
FIG. 35 is a block diagram showing a photo-coupler for input according to an eighth embodiment of the present invention.

FIG. 35 is a block diagram showing a photo-coupler for input according to an eighth embodiment of the present invention.

The same components of this embodiment as those of the seventh embodiment are indicated by the same reference numbers.

The present embodiment is arranged to transfer a signal from the external control device to the photo-coupler to the following photo-couplers or vice versa.

The control element 303 for controlling the light-receptacle element 302 included in the photo-coupler for input is arranged to have an I/O buffer register 310, a control logic 312, a timer 313 and a constant voltage circuit 314 as shown in FIG. 35.

The control logic 312 includes a driving unit 312B for driving a light-receptacle element 302 on the basis of a signal sent from the external control device and a start signal sent from the photo-coupler located at the previous stage and a start signal output unit 312C for supplying a start signal to the photo-coupler located at the next stage after the driving unit 312B drives the light-receptacle element 302.

The control logic 312 has three functions. A first function is to determine whether or not the data for controlling the photo-coupler is for input. A second function is to read the output of the light-receptacle element 302 driven by the driving unit 312B and the timer 313. The third function is to supply the read data to the external control device through a data bus, to supply a start signal from the start signal output unit 312C to the photo-coupler located at the next stage, and to pass a signal sent from the external control device to the photo-coupler located at the next stage directly without passing through the control logic 312 (hereafter, referred to as a short-circuiting signal line).

Figure 36:
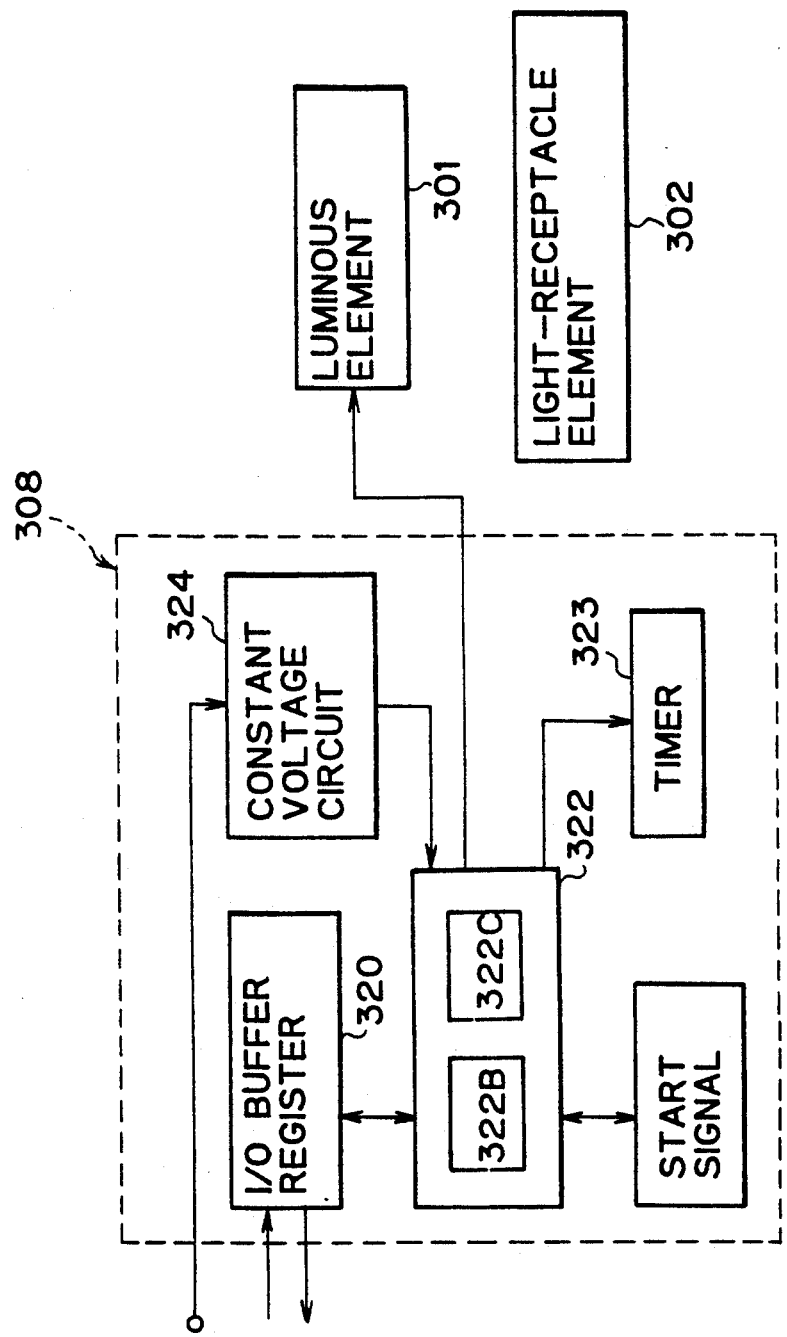
FIG. 36 is a block diagram showing a photo-coupler for output according to the eighth embodiment of the present invention.

The control element 308 is arranged to control a luminous element 301, and I/O buffer register 320, a control logic 322, a timer 323, and a constant voltage circuit 32 as shown in FIG. 36.

The control logic 322 includes a driving unit for driving the luminous element 301 on the basis of a signal sent from the external control device and a start signal sent from the photo-coupler located at the previous stage and a start signal output unit 322C for supplying a start signal to the photo-coupler located at the next stage after the luminous element 301 is driven by the driving unit 322B.

The control logic 322 has three functions. A first function is to determine whether or not the data for controlling the photo-coupler is for output. A second function is to determine whether or not the luminous element 301 is switched on in a case that it is for output. A third function is to supply a start signal from the start signal output unit 322C to the photo-coupler located at the next stage and short-circuiting the signal line.

Figure 37B:
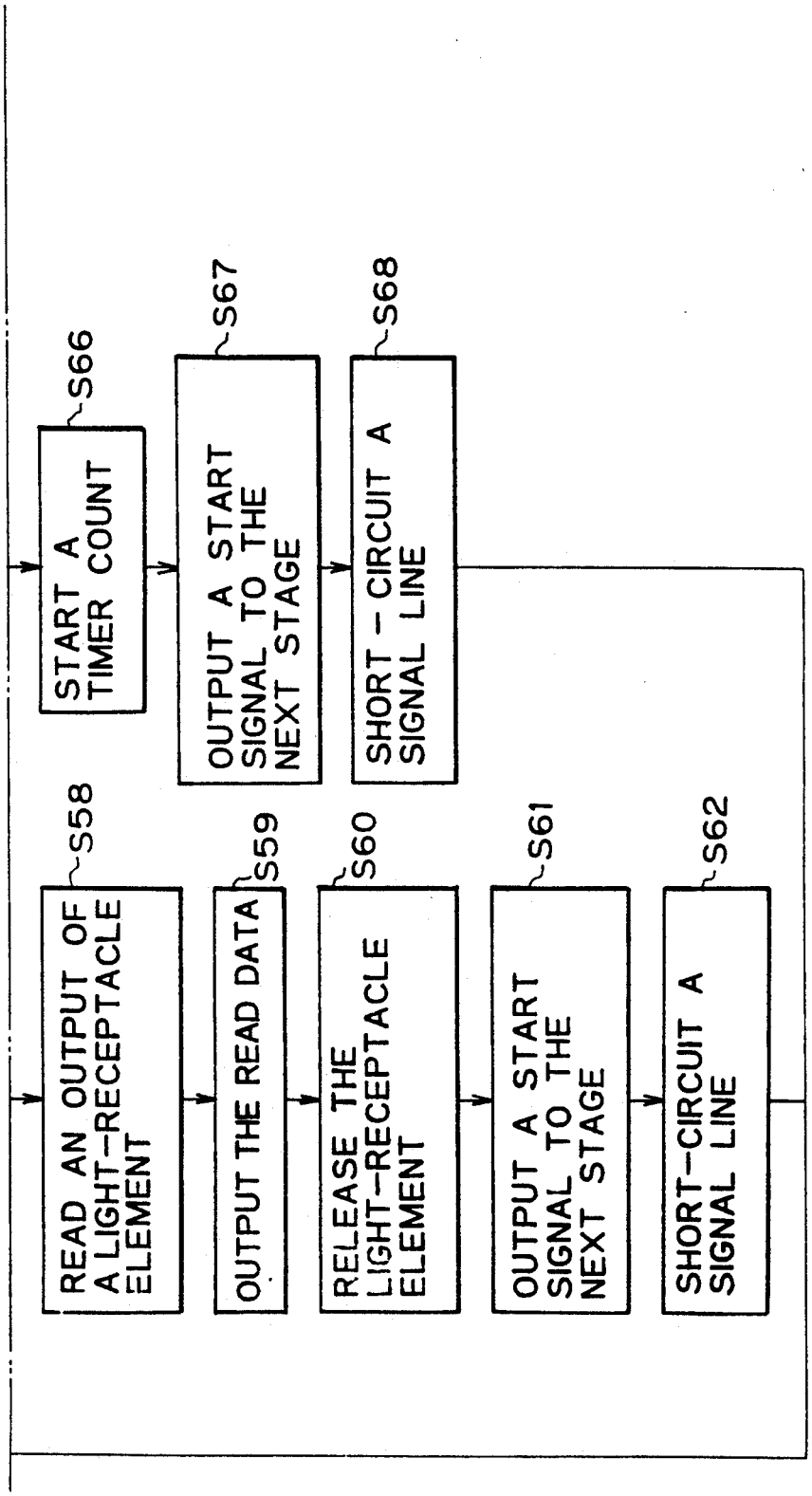
FIG. 37 composed of FIGS. 37A and 37B is a flowchart showing operation of the photo-couplers shown in FIGS. 35 and 36.

Referring to FIGS. 35, 36 and FIG. 37 composed of FIG. 37A and FIG. 37B, the processing operation of each photo-coupler will be described as follows.

The data for controlling the photo-coupler, which is output from the external control device, is input onto the data bus and then is stored in the I/O buffer registers 310, 320 of each photo-coupler (S54).

The control logic 312, 322 serve to determine whether or not the control data is for input (S55).

In a case that the control logic 312 of the photo-coupler for input determines the data is for input, the driving unit 312B of the control logic 312 serves to start the light-receptacle element 302b (S56). After the timer 313 counts for a constant time (S57), the output state of the light-receptacle element 302 is read (S58) and the read data is output on the bus line (S59). Then, the driving unit 312B serves to cut current flowing through the light-receptacle element 302, resulting in returning the light-receptacle element 302 to the waiting state (S60).

As such, the start signal output unit 312C of the control logic 312 serves to supply a start signal to the photo-coupler located at the next stage (S61). Then, the signal line is short-circuited for returning the photo-coupler to the waiting state (S62).

In a case that the control logic 322 of the photo-interrupter for output determines that the control data is for output (S55), it is determined whether or not the luminous element 301 is switched on (S63).

In a case that it is determined that the luminous element 301 is switched on (S64), the driving unit 322B of the control logic 322 serves to switch on the luminous element 301.

On the other hand, in a case that it is determined that the luminous element 301 is switched off (S65), the driving unit 322B of the control logic 322 serves to switch off on the luminous element 301. After the luminous element 301 is kept on by the timer 323 (S66), the start signal output unit 322C of the control logic 322 outputs a start signal to the photo-coupler located at the next stage (S67). Then, the signal line is short-circuited, resulting in returning the luminous element 301 to the waiting state (S68).

Figure 38:
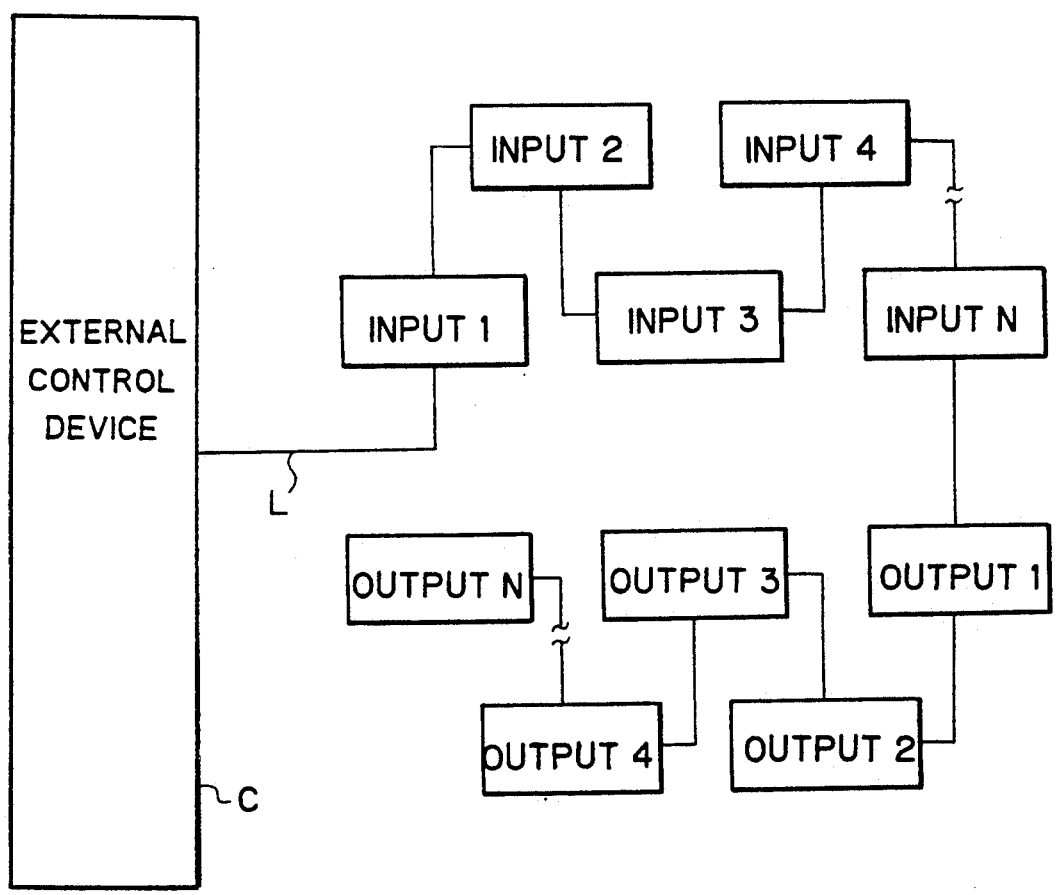
FIG. 38 is a diagram showing system configuration of an information apparatus having the photo-couplers for input and output shown in FIGS. 35 and 36.

As mentioned above, the photo-coupler is arranged to have the driving units 312B, 322B for driving the luminous element 301 and the light-receptacle element 302 on the basis of a signal sent from the external control device and a start signal sent from the photo-coupler located at the previous stage, the start signal output units 312C, 322C for outputting a start signal to the photo-coupler located at the next stage after the driving units 312B, 322B drive the luminous element 301 or 302. The plurality of such photo-couplers for input (input 1 to N) and such photo-couplers for output (output 1 to N) are ranged as shown in FIG. 38. The group of the photo-couplers applied to a programmable controller of the information apparatus will be operated as follows.

When the photo-coupler of the input 1 terminates the output of the input state to the external control device in receipt of an input signal sent from the external control device C, it sends a start signal to the photo-coupler of the input 2. When the photo-coupler of the input 2 terminates the output of the input state to the external control device, it sends a start signal to the photo-coupler of the input 3. This operation is repeated until the photo-coupler of the input N terminates the operation so that the input state of each photo-coupler is input to the external control device C.

Next, when a start signal is sent from the photo-coupler of the input 1N to the photo-coupler of the output 1, the photo-coupler of the output 1 reads the output state corresponding to a predetermined program from the external control device C. The read state is output to the secondary side of the photo-coupler of the output 1. When the output to the secondary side is terminated, a start signal is sent from the photo-coupler of the output 1 to the photo-coupler of the output 2, so that the photo-coupler of the output 2 reads the output state from the external control device C. When terminating the state output to the secondary side of the photo-coupler, a start signal is sent from the photo-coupler of the output 2 to the next photo-coupler of the output 3. This operation is repeated from the photo-couplers of the output 1 to the output N for outputting the state signal from the external control device C to the photo-couplers in sequence.

The arrangement according to this embodiment makes it possible to send the state signal from the external control device C to the photo-couplers in sequence for transferring information in the process of sending the state signal in sequence. Hence, the photo-couplers are allowed to be connected in series on a signal line L.

It results in reducing the number of the lead wires on the board pattern, thereby the size of the information apparatus becomes compact.

By sending a signal to the photo-coupler of the input 1, it is possible to constantly input the information of a sequence program in the photo-couplers for input, and to output the information to the external control device C. Hence, to make sure of the information, the photo-couplers for output are allowed to be driven, resulting in simplifying the program for controlling the photo-coupler of the external control device C.

As described above, the control element 3 or 8 has been mounted on another chip rather than the luminous element or the light-receptacle element. It may be mounted on the same chip.

Having described a dual molding photo-coupler, the present invention is effective for another device.

Further, according to the eighth embodiment, it is possible to change the range of the photo-couplers according to the sequence program such as alternate arrangement of the photo-couplers for input and output.

Figure 39:
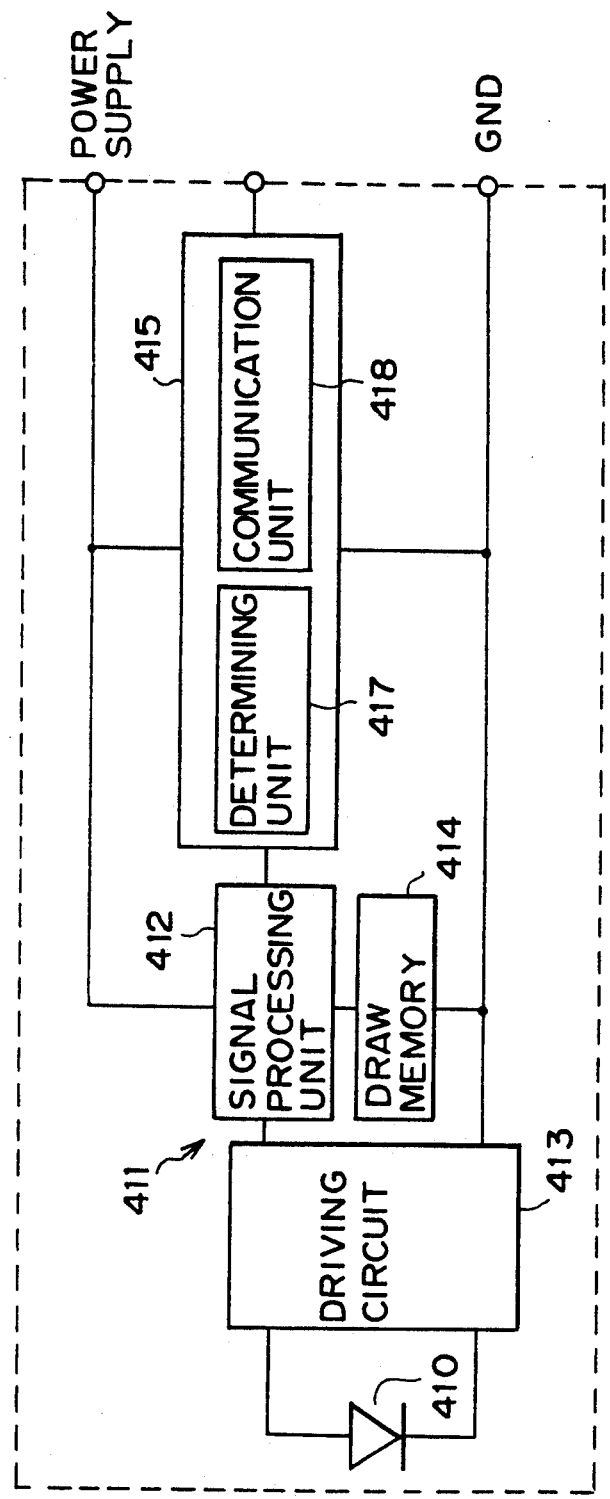
FIG. 39 is a circuit diagram showing a luminous device according to a ninth embodiment of the present invention.
Figure 40:
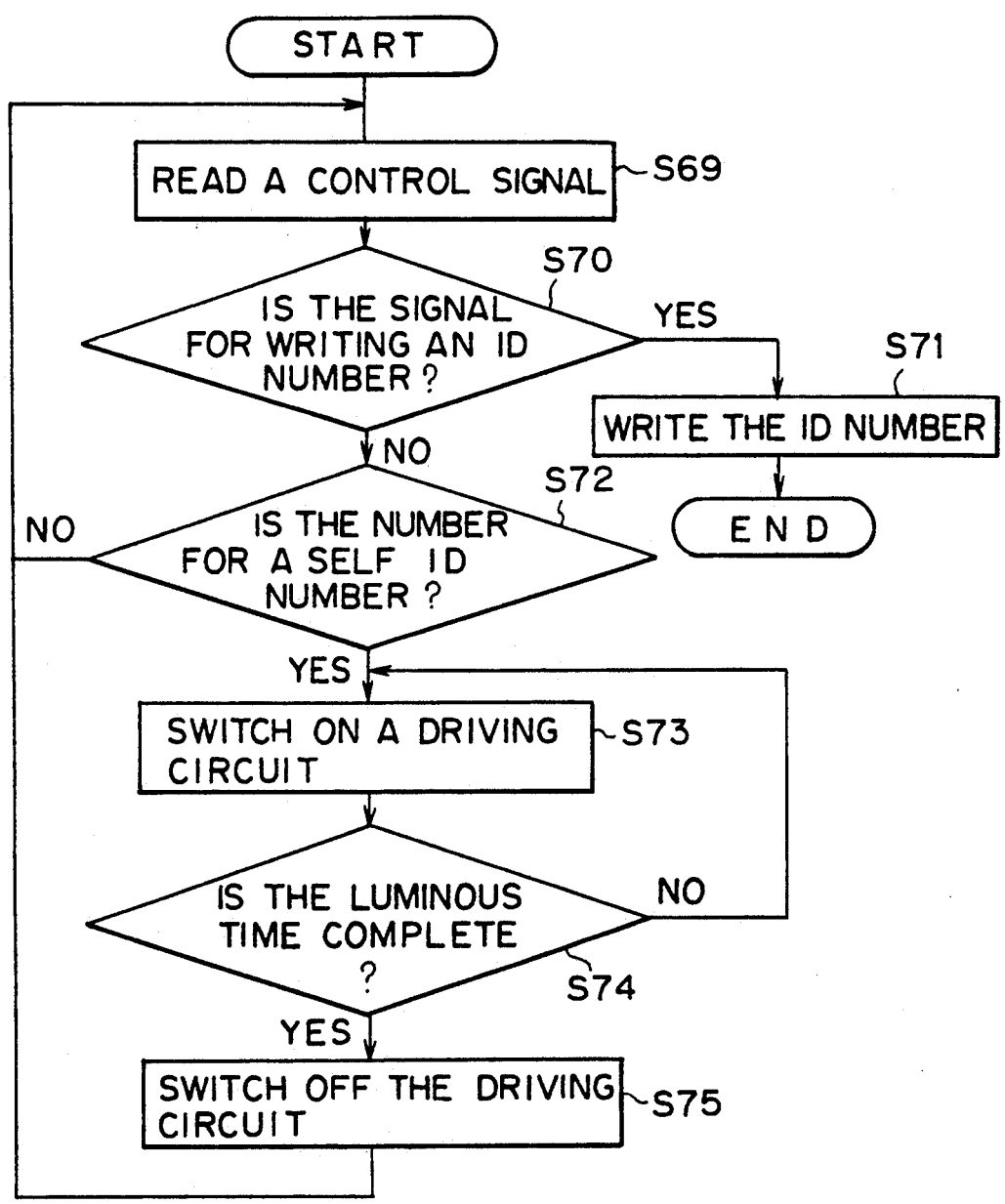
FIG. 40 is a flowchart showing operation of the luminous device shown in FIG. 39.
Figure 41:
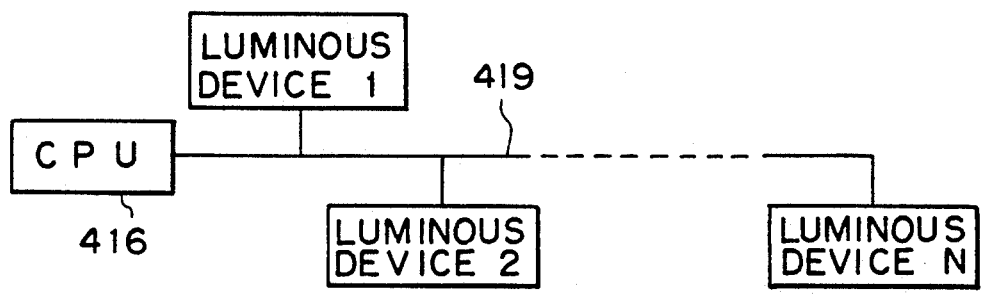
FIG. 41 is a diagram showing system configuration of an information apparatus having the luminous devices shown in FIG. 39.

In turn, the description will be directed to a ninth embodiment of the present invention as referring to FIGS. 39 to 41.

As shown in FIG. 39, the luminous device is arranged to have a luminous chip (light-emitting diode) 410 and a signal processing circuit 411 for processing an input signal and for driving the luminous chip 410. This luminous device serves to constantly emit regularly-pushed light.

The signal processing circuit 411 is arranged to have a signal processing unit 412 for processing an input signal, a driving circuit 413 for driving the light-emitting diode 410 on the basis of the output signal from the signal processing unit 412, a DRAW (direct read after write) memory 414 for storing an identification code (ID number), and a communication interface circuit 415 for communicating with an external central processing unit (CPU).

The communication interface circuit 415 includes a determining unit 417 for recognizing an ID number sent from the external CPU and determining whether or not the ID number coincides with a self ID number stored in the DRAW memory 414 and a communication unit 418 for switching on the driving circuit 413 and outputting a signal to the external CPU in a case that the determining unit 417 determines that the input ID number coincides with the self ID number. The communication interface circuit 415 also has a function of determining whether or not the luminous device emits light for a predetermined time and switching off the driving circuit 413 after the predetermined time passes.

The light-emitting diode 410, the signal processing unit 412, the driving circuit 413, the DRAW memory 414 and the communication interface circuit 415 are mounted on one chip.

The operation of the luminous device will be described as referring to FIG. 40.

The luminous device reads a control signal sent from the external CPU (S69, S70, S71). Then, the determining unit 417 of the interface circuit 415 determines whether or not the ID number sent from the external CPU coincides with a self ID number stored in the DRAW memory 414 (S72).

In a case that they do not coincide with each other, the luminous device is entered into the waiting state.

In a case that they coincide with each other, the determining unit 417 serves to switch on the driving circuit 413 (S73). In response to an output signal from the signal processing unit 412, the driving circuit 413 activates the light-emitting diode 410 to emit a direct or a pulsed ray of light. The light information of the light-emitting diode 410 is output to the external CPU through the communication unit 418 of the interface circuit 415.

After a certain time passes (S74), the driving circuit 413 is switched off and thus is returned to the waiting state (S75).

The ID number is written in the DRAW memory 414 by an exclusive writer before mounting the luminous device to the information apparatus. It results in enabling to make use of common luminous devices, thereby the overall information apparatus could be made less costly. The DRAW memory 414 may employ a ROM, a charge injecting system, or a junction breakdown system.

The signal processing circuit 411 includes the driving circuit 413 for driving the light-emitting diode 410, a storage unit 414 for storing an ID number, a determining unit 417 for recognizing an ID number sent from the external CPU and determining whether or not the ID number coincides with a self ID number stored in the storage unit 414, and a communication unit 418 for switching on the driving circuit 413 for outputting a signal to the external CPU when it is determined that the input ID number coincides with the self ID number.

As shown in FIG. 41, the arrangement makes it possible to transfer a control signal or a data signal through one transmission line 419 in a case that data is transmitted between one external CPU 416 and the plurality of luminous devices.

It results in greatly reducing the number of lead wires, facilitating internal wiring and reducing the size of the information apparatus.

Since the driving circuit 413 is switched off in a case that not necessary, it results in enabling to lower the power consumption.

Having described the light-emitting diode and the signal processing circuit being mounted on one chip, those components may be mounted on two or more chips.

After outputting the light information from the light-emitting diode, the driving circuit may be switched off at any given timing based on the control signal sent from the external CPU.

Figure 42:
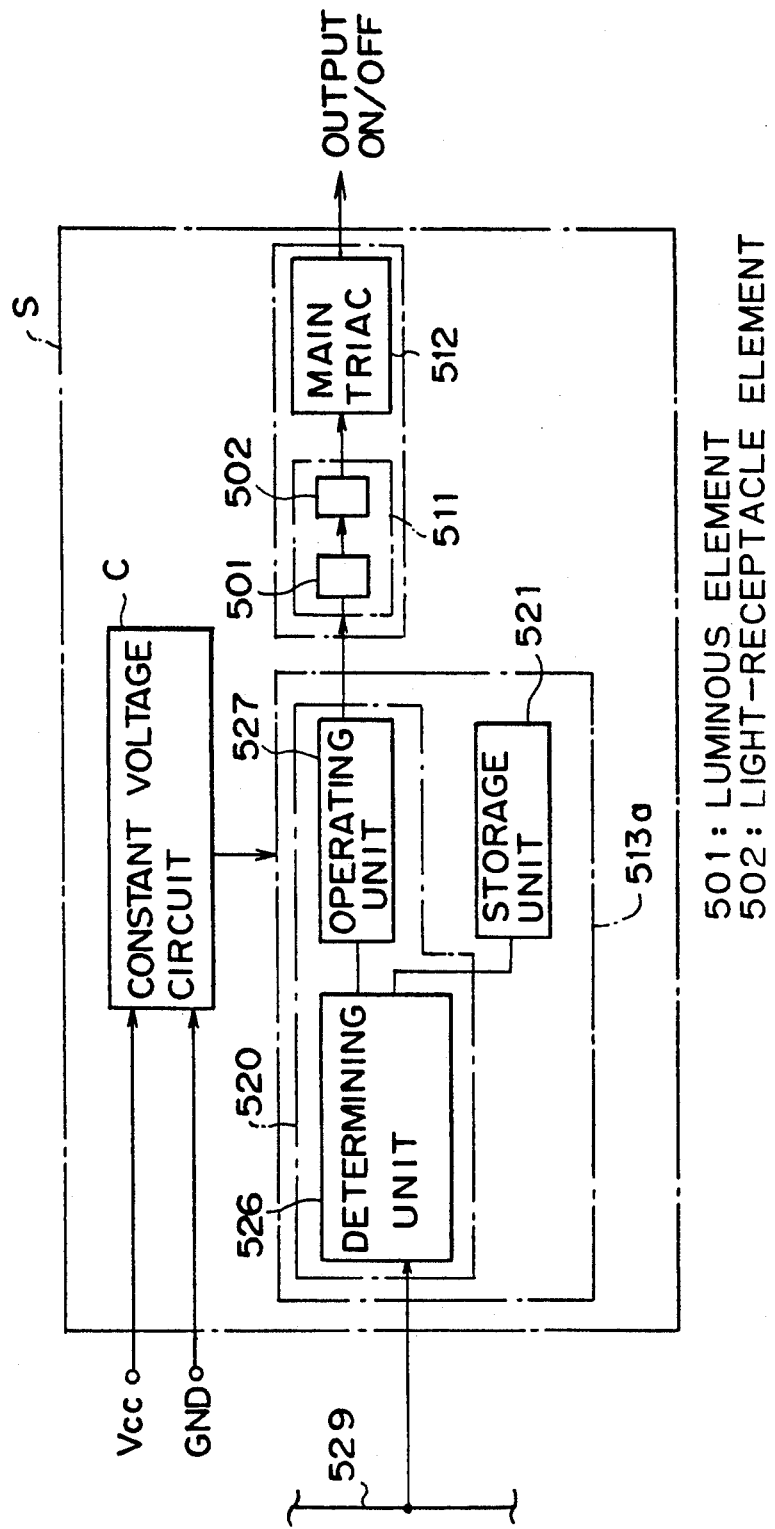
FIG. 42 is a block diagram showing a solid-state relay according to a tenth embodiment of the present invention.
Figure 43:
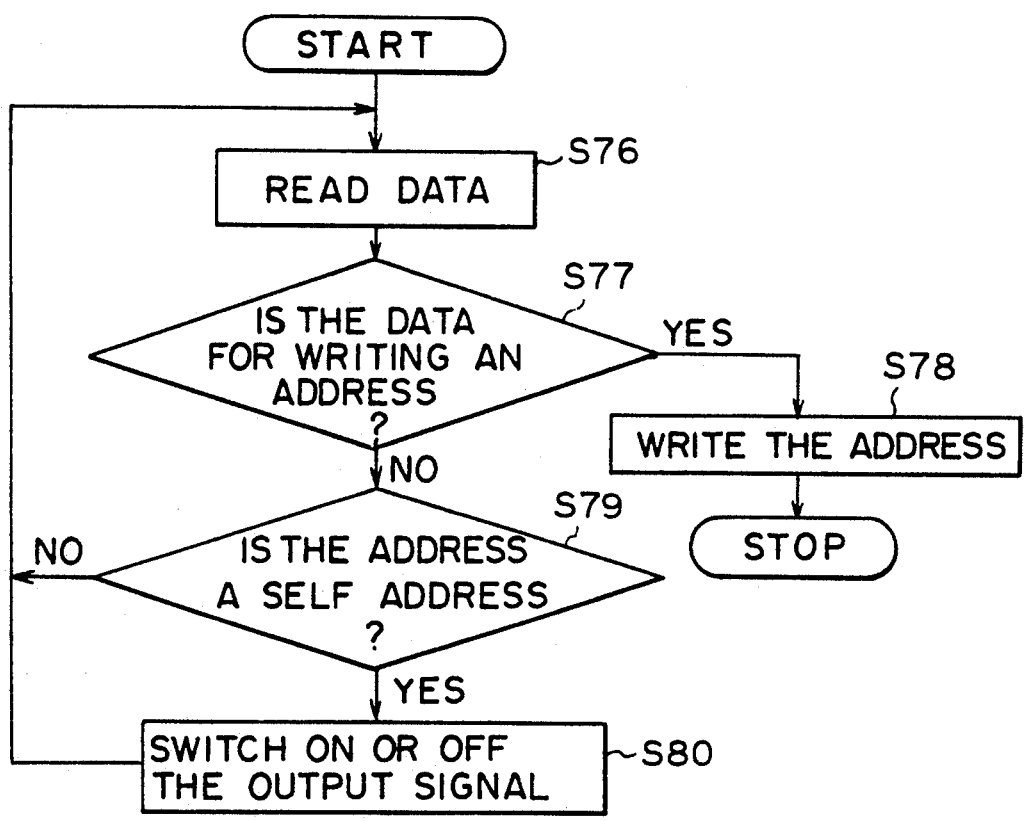
FIG. 43 is a flowchart showing operation of the solid-state relay shown in FIG. 42.
Figure 44:
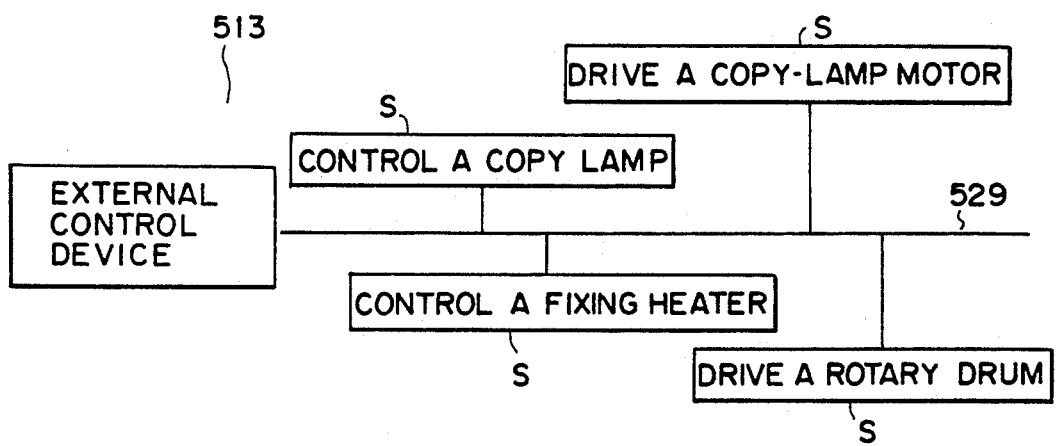
FIG. 44 is a diagram showing system configuration of an information apparatus having the solid-state relays shown in FIG. 42.

In turn, the description will be directed to the tenth embodiment of the present invention as referring to FIGS. 42, 43 and 44.

FIG. 42 is a block diagram showing a solid-state relay according to the tenth embodiment of the present invention.

The solid-state relay S is used for driving the components of a copying machine, for example.

As shown in FIG. 42, the solid-state relay S is arranged to have a photo-triac coupler 511, a driving element 512 driven on the output of the photo-triac coupler 511, a constant voltage circuit C, and a control unit 413a for transferring data between an external control device (microcomputer) and the control unit itself for controlling the photo-triac coupler 511.

The photo-triac coupler 511 provides a luminous element 501 and a light-receptacle element 502 so that the luminous element 501 serves to emit light to the light-receptacle element 502 for conducting ac current through the light-receptacle element 502. The luminous element 501 uses a light-emitting diode and the light-receptacle element 502 uses a photo-triac.

The driving element 512 uses a power triac so that it supplies current to desired circuits of the copying machine according to the output of the light-receptacle element 502. Herein, the desired circuits include driving circuits for a copy lamp, a fixing heater, a motor for the copy lamp, and a rotary drum (see FIG. 44).

The control unit 513a is, as shown in FIG. 42, arranged to have a control logic 520 for controlling the photo-triac coupler 511 based on the input signal sent from the external control device (not shown) and a storage unit (address memory) 521 for storing a self identification code (address).

The control logic 520 is arranged to have a determining unit 526 for recognizing an address sent from the external control device and determining whether or not the address coincides with a self address stored in the storage unit 521 and an operating unit 527 for switching on and off the luminous element 501 of the photo-triac 511 in a case that the sent address is determined to coincide with the self address.

Then, the operation of the solid-state relay S will be described as referring to FIG. 43.

In case of using a plurality of solid-state relays S in the information apparatus, as shown in FIG. 44, the external control device 513 (CPU in the copying machine) is connected to the plurality of solid-state relays S through a single line 529.

The external control device 513 serves to transmit a data signal composed of an identification code and an on-switching signal or an off-switching signal. Each solid-state relay S reads a data signal sent from the external control device 513 through the signal line 529 (S76). In a case that the signal for writing an identification code (address) is sent from the external control device 513 (S77), the address is stored in the storage unit 521 (S78).

For writing the address in the storage unit 521, an exclusive memory writer is used before mounting the solid-state relay S to the copying machine. Alternatively, the external control device 513 directly writes the address in the storage unit 521 after mounting the solid-state relay S to the copying machine. The method for writing an address may employ a RAM, a charge injecting system, a junction breakdown system or a fuse melting system.

In a case that the data composed of an address signal is sent from the external control device 513 to the solid-state relay S, the determining unit 526 determines whether or not the address coincides with a self address stored in the storage unit 521 (S79). In a case that neither of the addresses are equal, the solid-state relay S enters into the waiting state. In a case that both of the addresses coincide with each other, the operating unit 527 serves to switch on and off the luminous element 501 of the photo-triac coupler 511 (S80).

That is, when the signal from the external control device 513 is an on switching signal, the operating unit 527 flows current through the luminous element 501, the luminous element 501 is activated to emit light to the light-receptacle element 502, the light-receptacle element 502 serves to generate current according to the quantity of the received light and supply the current to the driving element 512, and the driving element 512 serves to conduct current to the desired circuits of the copying machine.

In a case that the signal sent from the external control device 513 is an off-switching signal, the driving element 512 serves to break down the conduction of current in the desired circuits of the copying machine.

The solid-state relay S is arranged to have a storage unit 521 for storing a self address, a determining unit 526 for determining whether or not the address sent from the external control device 513 coincides with the self address, and the operating unit 527 for switching on and off the luminous element 501 of the photo-triac coupler 511 in a case that these addresses coincide with each other. The above-described arrangement makes it possible to use one signal line 529 only for properly functioning the N solid-state relays S.

It results in enabling to greatly reduce the number of lead wires, thereby facilitating the internal wiring and reducing the size of the information apparatus.

Figure 45:
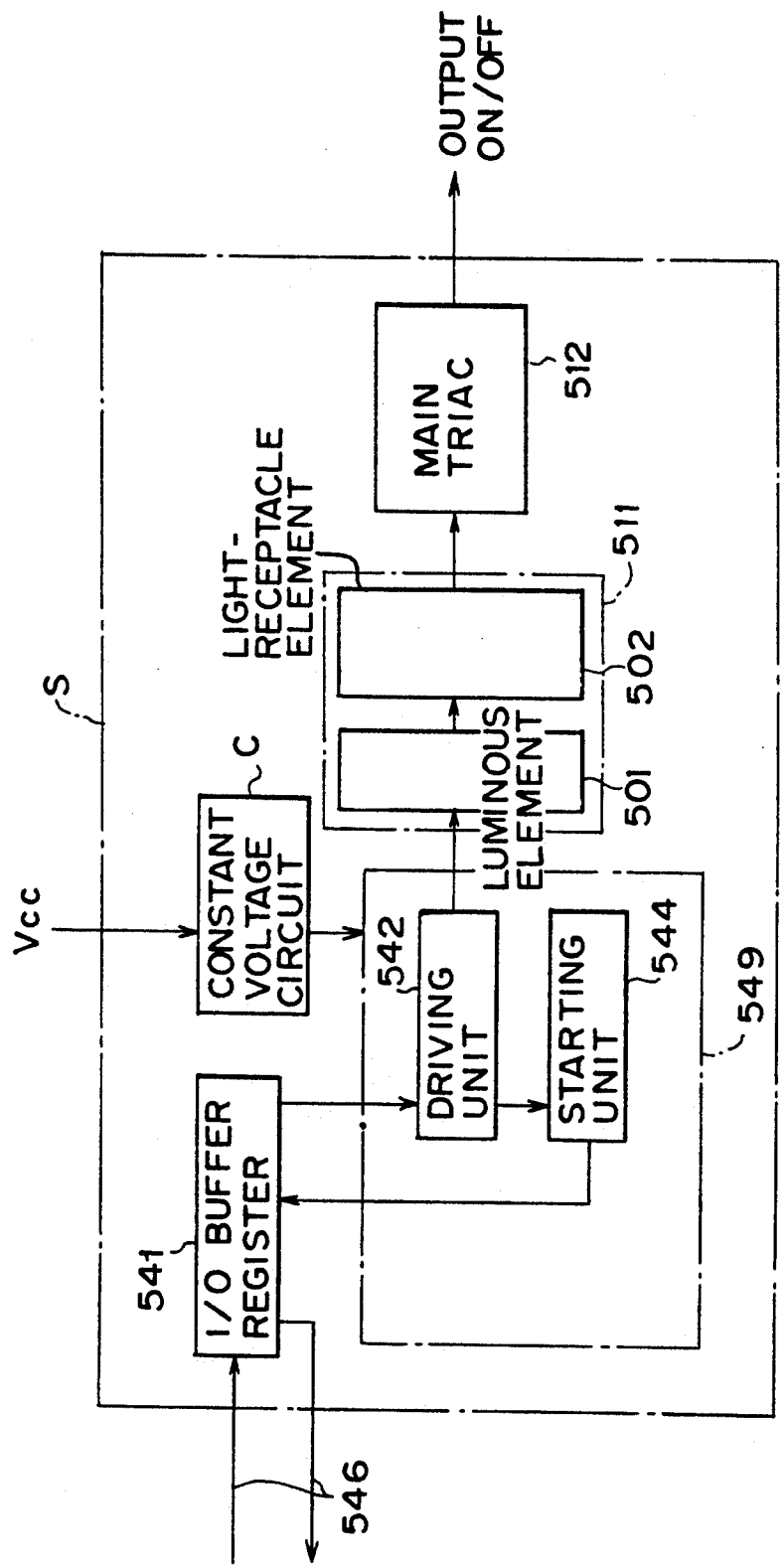
FIG. 45 is a block diagram showing a solid-state relay according to an eleventh embodiment of the present invention.

The description will be directed to the solid-state relay according to an eleventh embodiment of the present invention. FIG. 45 is a block diagram showing a solid-state relay according to the eleventh embodiment of the present invention.

The same components of this embodiment as those of the tenth embodiment are indicated by the same reference numbers.

As shown in FIG. 45, the solid-state relay S according to the eleventh embodiment is arranged to have a photo-triac coupler 511, a driving element 512, a constant voltage circuit C, a control unit 540, and a register unit (I/O buffer register) 541 for temporarily storing data sent from the external control device.

The control unit 540 is arranged to have a driving unit 542 for switching on and off the photo-triac coupler 511 on the basis of an input signal from the external control device 513 and a start signal sent from the solid-state relay S and a starting unit 544 for supplying a start signal to the solid-state relay S located at the next stage after outputting the data. The control unit 540 also has a function short-circuiting the signal line after outputting the start signal.

Figure 46:
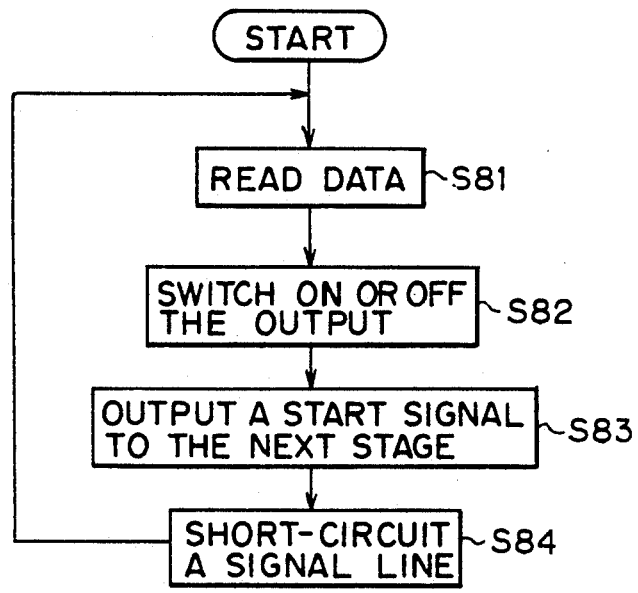
FIG. 46 is a flowchart showing operation of the solid-state relay shown in FIG. 45.

The operation of the solid-state relay S will be described as referring to FIG. 46.

Figure 47:
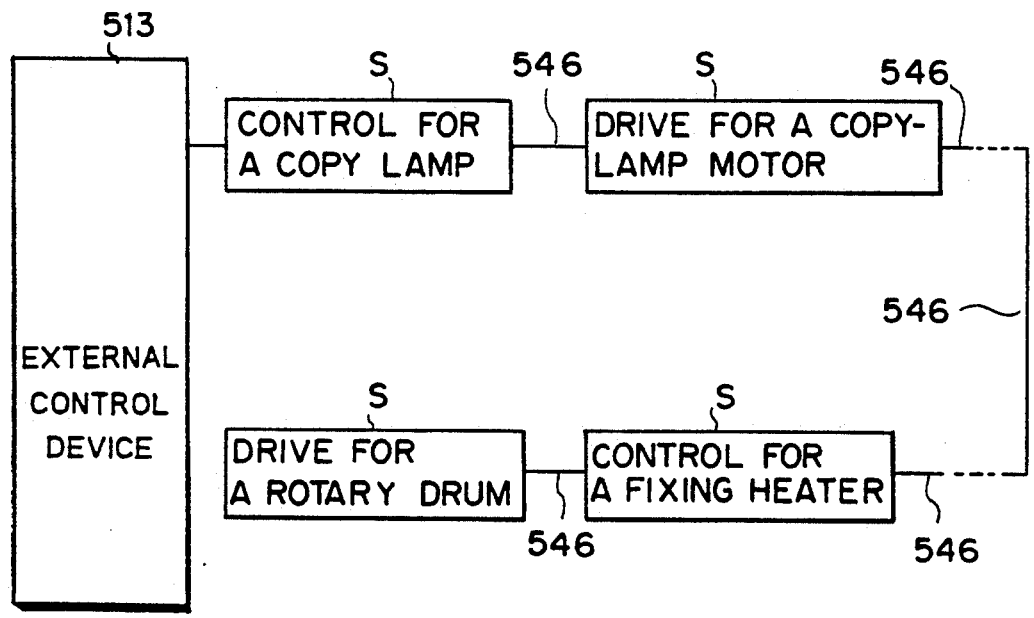
FIG. 47 is a diagram showing system configuration of an information apparatus having the solid-state relays shown in FIG. 45.

As shown in FIG. 47, consider that a plurality of solid-state relays S are used in an information apparatus such as a copying machine. The solid-state relays S are connected in series to the control device 513 included in the copying machine.

The connecting sequence of the solid-state relays S is determined by considering the operating sequence of the solid-state relays S.

In operation, the data signal (on signal) sent from the external control device 513 is read (S81). The driving unit of the control device 540 serves to switch on the photo-triac coupler 511 in response to the data signal (S82). Then, the start unit 544 serves to supply a start signal for switching on the solid-state relay S located at the next stage (S83) and short-circuit the signal line led to the external control device 513 (S84).

The solid-state relay S located at the next stage performs the same operation as the above in response to the start signal.

In a case that an off-signal is output from the external control device 513, the driving unit 542 of the control unit 540 keeps the photo-triac coupler 511 off and then supplies a start signal for switching off the solid-state relay S located at the next stage. Next, the driving unit 542 serves to short-circuit the signal line, resulting in entering the solid-state relay S into the waiting state.

Each of the solid-state relays S is arranged to have the driving unit 542 for switching on and off the photo-triac coupler 511 and the starting unit 544 for supplying a start signal to the solid-state relay S located at the next stage. Hence, the series connection of the solid-state relays S makes it possible to control those components.

As a result, the solid-state relay S of this embodiment can offer the same advantages as the tenth embodiment.

Only if the external control device 513 serves to supply a signal for operating the first solid-state relay S, the solid-state relay located at the second or later stages is allowed to be operated by the starting unit. It results in simplifying the control operation for the solid-state relays S given by the external control device 513.

In a case that an abnormal state takes place in any one of the solid-state relays S, the subsequent solid-state relays S are not activated. Hence, it is easy to check for a defective relay S, resulting in simplifying the maintenance operation.

Figure 48:
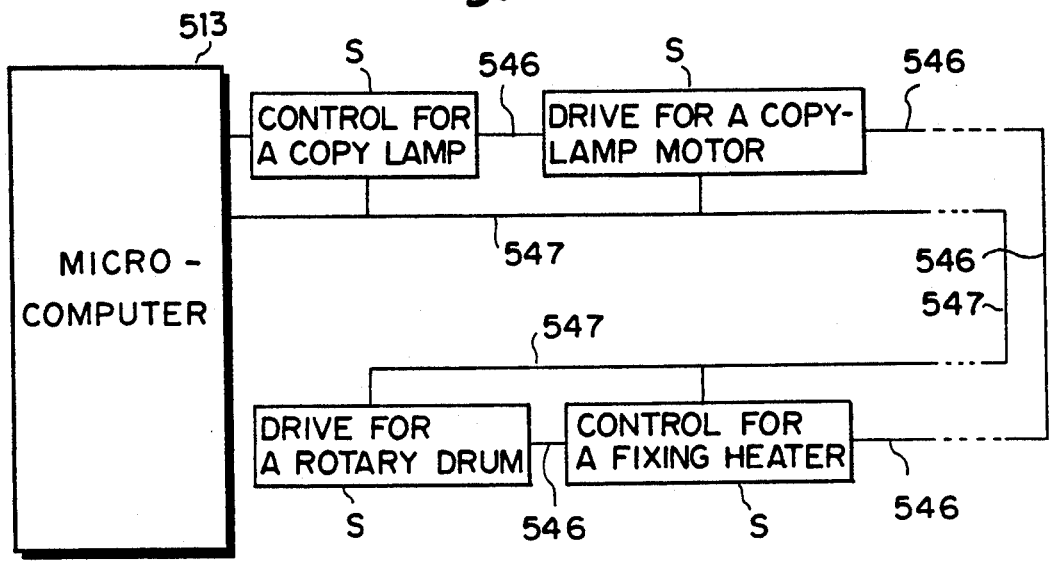
FIG. 48 is a diagram showing system configuration of a transformed information apparatus having the solid-state relays shown in FIG. 47.

FIG. 48 shows a transformation of the eleventh embodiment.

As shown, a data bus line 547 is provided in addition to the signal line 546 for passing an interrupt indication.

Figure 49:
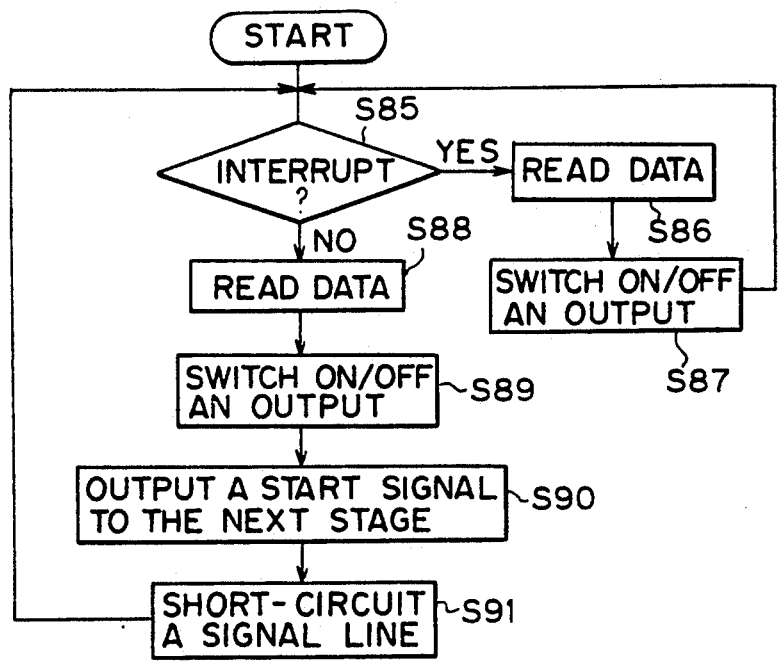
FIG. 49 is a flowchart showing operation of the solid-state relay shown in FIG. 45.

The operation of the solid-state relay S will be described in FIG. 49.

The interrupt operation is effective for stopping part of an information apparatus such as a copying machine in a case that an abnormal state takes place in any part of the information apparatus.

For example, in case of causing a paper jam, the paper may be burnt in a case that it is left intact. By giving an interrupt for switching off the solid-state relay S related to the heater, therefore, it is possible to prevent the paper from being burnt.

In this case, it is desirous to provide the functions of receiving and canceling an interrupt indication like the storage unit 521 and the determining unit 526 in the tenth embodiment.

Unlike the tenth and the eleventh embodiments, the solid-state relays may be applied to another information apparatus except the copying machine described in those embodiments.

First, it is determined whether or not the operation is interrupt (S85). In a case that the operation is interrupt, then, the data signal (on signal) sent from the external control device 513 is read (S86). The driving unit of the control device 540 serves to switch on the photo-triac coupler 511 in response to the data signal (S87).

On the other hand, in a case that the operation is not interrupt, then the data signal (on signal) sent from the external control device 513 is read (S88). The driving unit of the control device 540 serves to switch on the photo-triac coupler 511 in response to the data signal (S89), the start unit 544 serves to supply a start signal for switching on the solid-state relay S located at the next stage (S90) and short-circuit the signal line led to the external control device 513 (S91).

In turn, the description will be directed to the twelfth embodiment of the present invention as referring to FIGS. 50 to 54.

Figure 50:
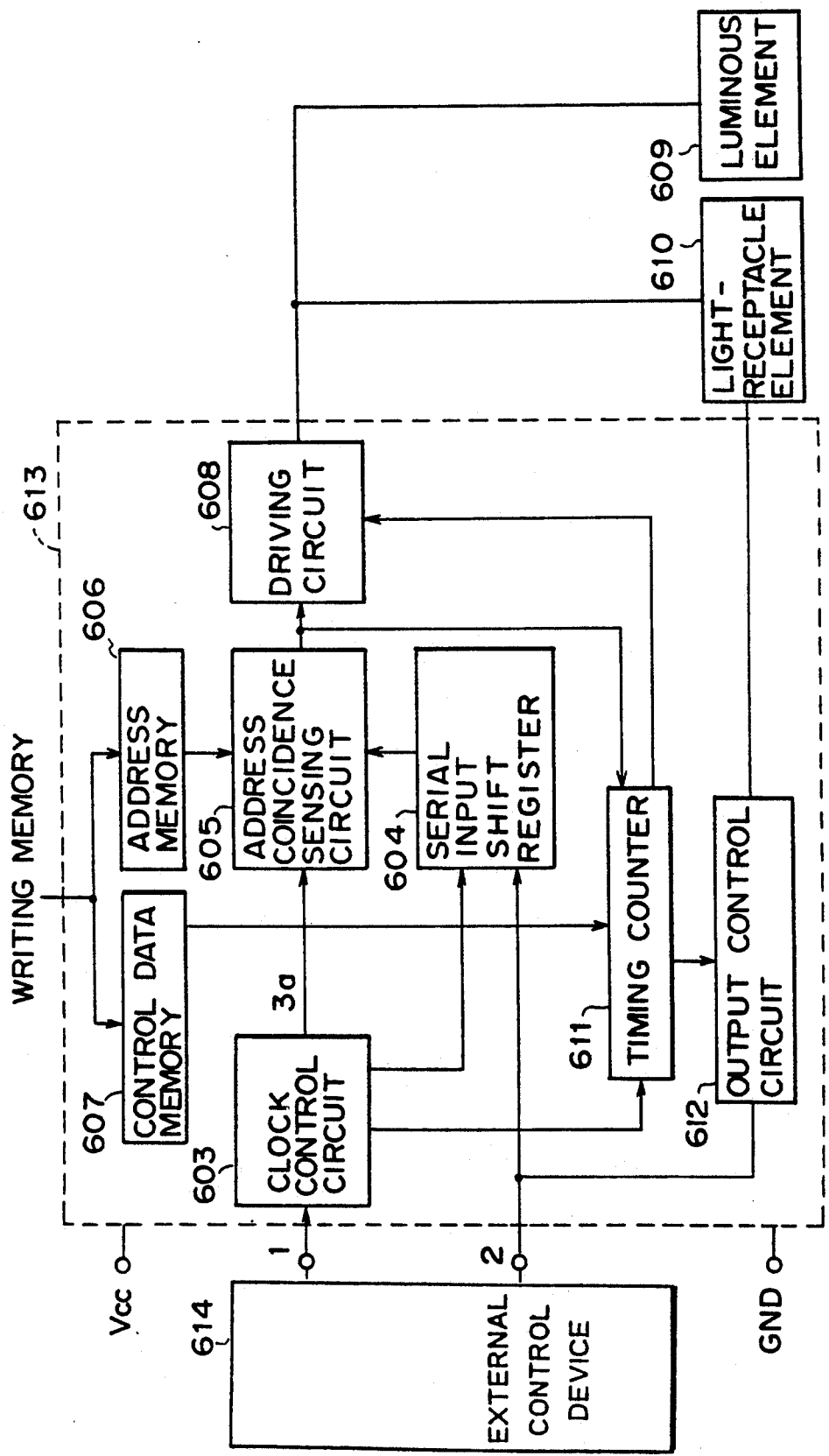
FIG. 50 is a block diagram showing a photo-interrupter according to a twelfth embodiment of the present invention.

FIG. 50 is a block diagram showing a transmission type photo-interrupter according to the twelfth embodiment.

The transmission type photo-interrupter is arranged to sense whether or not an object to be sensed passes on a passage without any contact. As shown in FIG. 50, the transmission type photo-interrupter is arranged to have a luminous element 609, a light-receptacle element 610 and a control element (IC) for controlling the luminous element 609 and the light-receptacle element 610.

Figure 54:
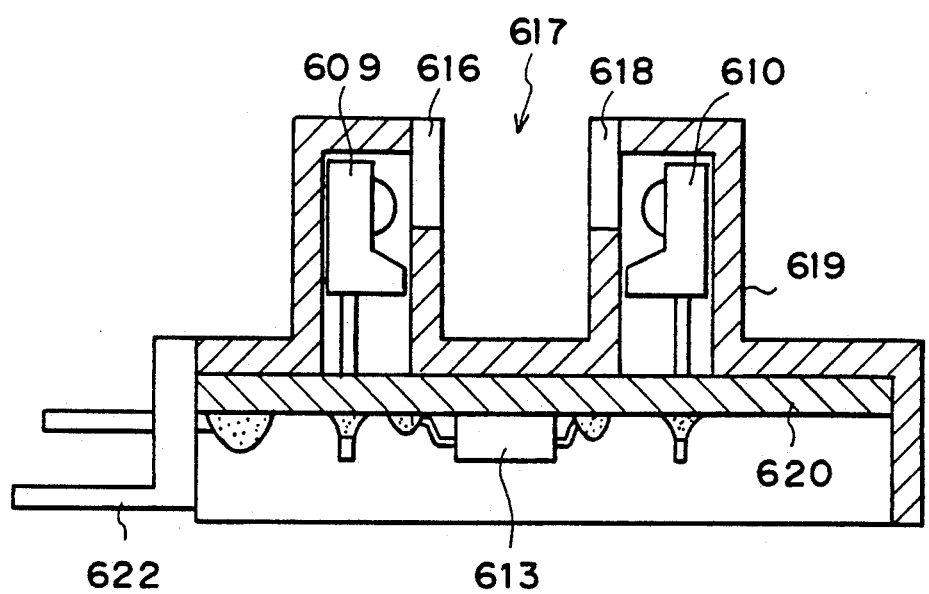
FIG. 54 is a sectional view showing structure of the photo-interrupter shown in FIG. 50.

As shown in FIG. 54, the luminous element 609 is opposed to the light-receptacle element 610 with a passage 617 through which the object is passed. The luminous element 609 and the light-receptacle element 610 are mounted on a printed board 620. The control element 613 is soldered on the rear surface of the printed board 620. The luminous element 609 and the light-receptacle element 610 are accommodated in an outer case 619 in a manner that those elements are mounted on the printed board 620. The light-emitting and light-receptacle surface of the passage 617 includes a light-projecting window 616 and a light-entering window 618 formed thereon. 622 denotes a connector.

The control element 613 is connected to an external control device 614 through two signals of a clock signal transmission line 601 and a signal transmission line (data bus) 602.

The control element 613 is arranged to have a serial-input shift register 604 for reading a data bit train sent from the external control device 614 through the signal transmission line 602, a first storage unit (address memory) 606 for storing an identification data bit train (address), a determining unit (address coincidence sensing circuit) 605 for determining whether or not the content of the address coincides with the data read in the serial shift register 604, a driving circuit 608 for driving the luminous element 609 and the light-receptacle element 610 in a case that it is determined that the address coincides with the read data, a counting unit (timing counter) 611 for counting a clock signal sent from the external control circuit 614, a second storage unit (control data memory) 607 for storing a control data bit train for controlling the timing counter 611, an output control circuit 612 for outputting a signal indicating the sensing state of the light-receptacle element 610 to the external control device 614 through the signal transmission line in response to the signal from the timing counter 611 when the count value of the timing counter 611 reaches the count value contained in the control data bit train stored in the control data memory 607, and a clock control circuit 603 for controlling a clock timing in the control element 613 in response to the clock signal sent from the external control device 614 through the clock signal transmission line 601.

Figure 51:
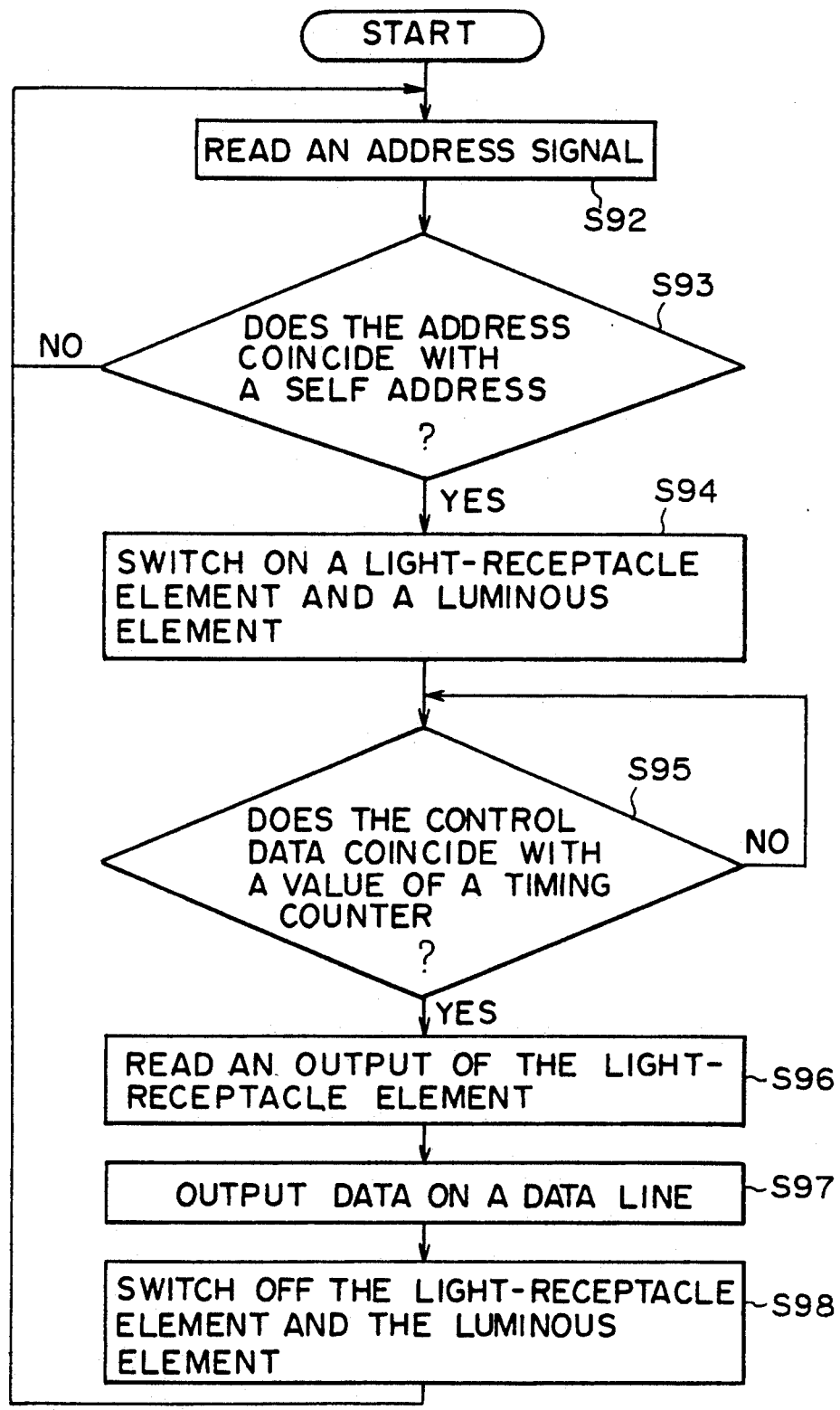
FIG. 51 is a flowchart showing operation of the photo-interrupter shown in FIG. 50.

The operation of the transmission type photo-interrupter will be described as referring to FIG. 51.

The clock signal transmission line 601 connected to the control device 614 keeps a high level and the signal transmission line 2 keeps a low level in a case that the photo-interrupter does not operate.

In a case that it is necessary to obtain the sensing state of the photo-interrupter, the external control device 614 serves to generate a clock signal during a proper period when the photo-interrupter enables to output the sensing state. The external control device 614 serves to output a data bit train on the signal transmission line 602 in synchronous to the clock signal.

The data bit train (address signal) is sent from the signal transmission line 602 to the serial input shift register 604 in synchronous to the clock signal (S92).

The clock control circuit 603 serves to stop a reading timing clock 603a so that the shift register 604 is disallowed to read a larger number of data bits of the address stored in the address memory 606.

Next, it is determined whether or not the address stored in the address memory 606 coincides with the address signal read in the shift register 604 (S93). In a case that it is determined that the stored address does not coincide with the read address signal, the state is held until the clock signal disappears, resulting in returning the photo-interrupter to the waiting state. In a case that both of the addresses coincide with each other, the signal is transmitted to the driving circuit 608 for switching on the luminous element 609 and the light-receptacle element 610 (S94).

At a time, the timing counter 611 is counting the clock signal. It is determined whether or not the count value of the timing counter 611 coincides with the regularly counted value determined on the content of the control data bit train stored in the control data memory 607 (S95), for example, an eleventh count value in a case that the control data bit train is 001, a twelfth count value in a case that it is 010, and a thirteenth control value in a case that it is 011.

In a case that both coincides with each other, the sensing state of the light-receptacle element 610 is output to the signal transmission line 602 by the output control circuit 612 during a one-pulse period of a clock signal (S96). Then, the signal is sent to the driving circuit 608, which serves to switch off the luminous element 609 and the light-receptacle element 610 (S97). When the timing counter 611 counts a last of the count signal sent from the external control device 614, the control element 613 is reset, resulting in returning the transmission type photo-interrupter to the waiting state (S98).

Figure 53:
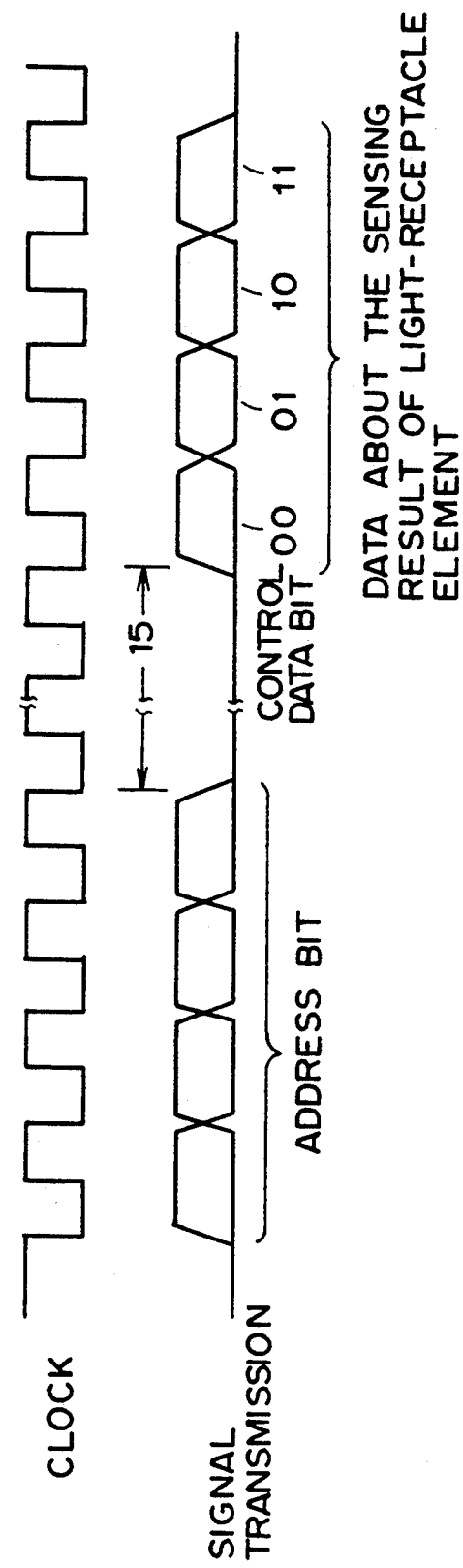
FIG. 53 is a chart showing timing on a signal line of the photo-interrupter shown in FIG. 50.

FIG. 53 shows a system configuration of the copying machine having the plurality of photo-interrupters connected to the external control device of the copying machine. In FIG. 53, it is assumed that the address is composed of four bits and the control data bit is composed of two bits. The connecting number of the photo-interrupters is up to 24×22=64. FIG. 53 is a chart showing the timing of the output of the photo-interrupter.

Figure 52:
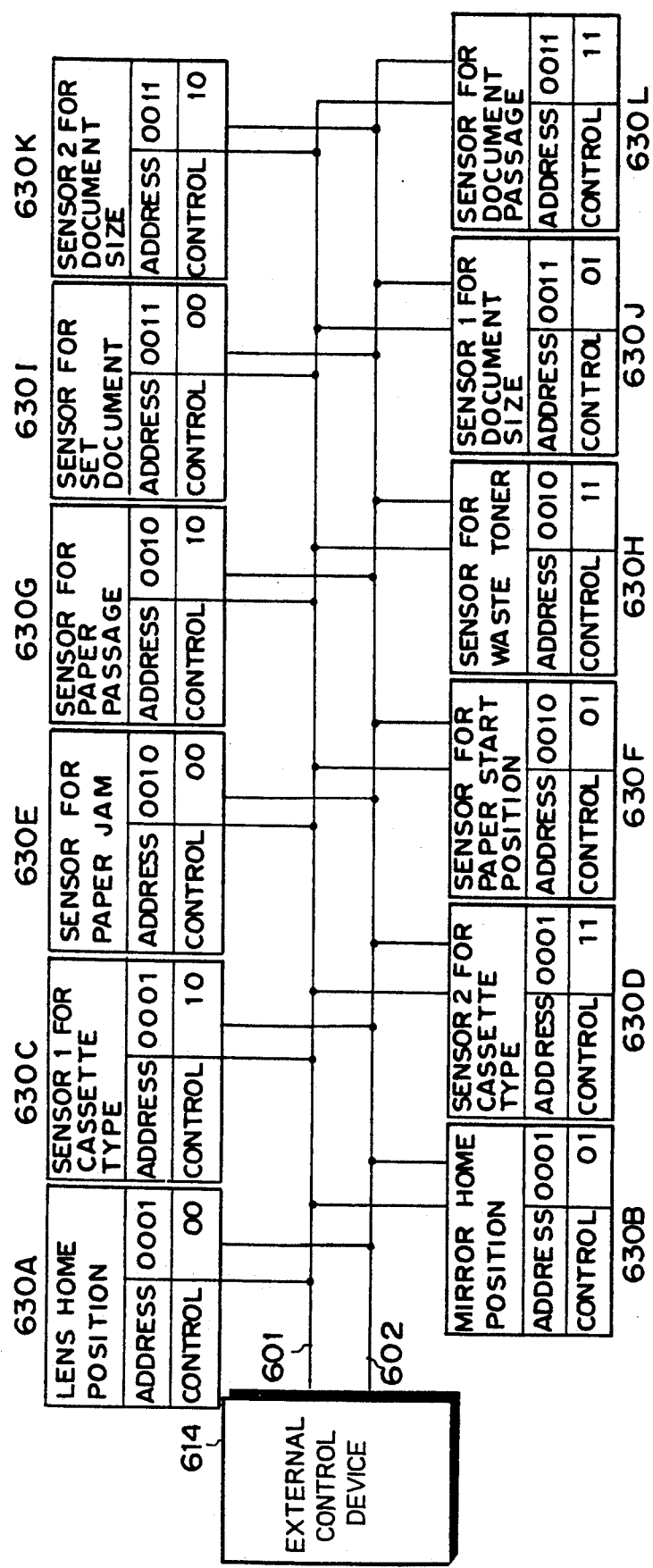
FIG. 52 is a view showing system configuration of a copying machine having the photo-interrupters shown in FIG. 50.

The four address bits are changed in synchronous to the rising edge of the clock signal. For example, in a case that this signal is 0001, four photo-interrupters 630A to 630D whose address of FIG. 52 is 0001 are selected. For example, a lens home position, a mirror home position, and cassette type sensors (1) and (2) are selected. Concretely, the light-receptacle elements of the photo-interrupters 30A to 30D are driven.

In the four photo-interrupters 30A to 30D, the control data bit is divided into four types 00 to 11. The photo-interrupter 630A at the lens home position whose control data bit is 00 serves to output the sensing state of the light-receptacle element onto the signal transmission line 602. Next, the photo-interrupter 630B at the mirror home position whose control bit is 01 serves to output the sensing state of the light-receptacle element to the signal transmission line 602. This operation is repeated from the photo-interrupters 630A to 630D whose control bit is 11.

The control element 613 of the photo-interrupter is arranged to have the first storage unit 606 for storing an identification data bit train, the determining unit 605 for recognizing a kind of data bit train sent from the external control device 614 through the signal transmission line 612 and determining whether or not the data bit train coincides with the identification data bit train stored in the first storage unit 606, the driving circuit 608 for driving the luminous element 609 and the light-receptacle element 610 in a case that the data bit train is determined to coincide with the identification data bit train, the counting unit 611 for counting a clock signal sent from the external control device 614 through the clock signal transmission line 601, the second storage unit 607 for storing a control bit train for controlling a count of the counting unit 611, and the output control circuit 612 for outputting the sensing state of the light-receptacle element 610 to the external control device 614 through the signal transmission line 602 in a case that the count value of the counting unit 611 reaches the count value determined on the control data bit train stored in the second storage unit.

The above-mentioned arrangement makes it possible to connect the plurality of photo-interrupters 630A to 630L to the external control device 614 through two lines 601 and 602, resulting in reducing the wiring materials and thereby reducing the size of the information apparatus.

Since the plurality of photo-interrupters are allowed to be sensed by specifying one address, the high-speed communication is made possible for reducing a data communication time. Further, since the unnecessary luminous and light-receptacle elements of the photo-interrupters are switched off, it results in lowering the overall power consumption.

In addition, the foregoing embodiment has been described with respect to the transmission type photo-interrupter. A reflection type photo-interrupter may be used.

The control element 610 and the light-receptacle element 610 may be mounted on a single chip.

According to this embodiment, the data bit train sent from the control device is composed of the identification data bit train only. An additional signal data bit may be added to the data bit train.

For example, the control device serves to check for a parity of the signal data bit train, add the parity bit after the identification data bit train in transmission, on the photo-interrupter side, check for a parity of the received identification data bit train, compare the transmitted parity bit with the received parity bit, and check for any faulty in the communication between the control device and the photo-interrupter.

In a case that the data bit train received in the photo-interrupter coincides with the stored data bit, the present embodiment serves to send only the signal about the sensing state of the photo-interrupter to the control device. Further, the signal may include a signal for notifying of the coincidence of the data bit train. It makes it possible to check for any faulty in the connected photo-interrupters.

Figure 55:
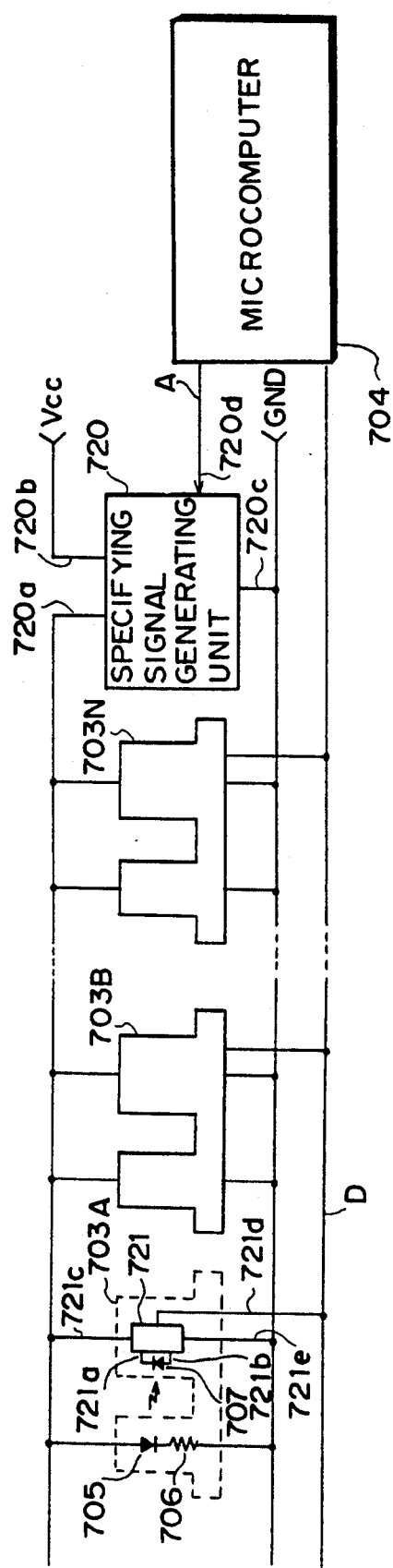
FIG. 55 is a block diagram showing a data transmission system according to a thirteenth embodiment of the present invention.
Figure 56:
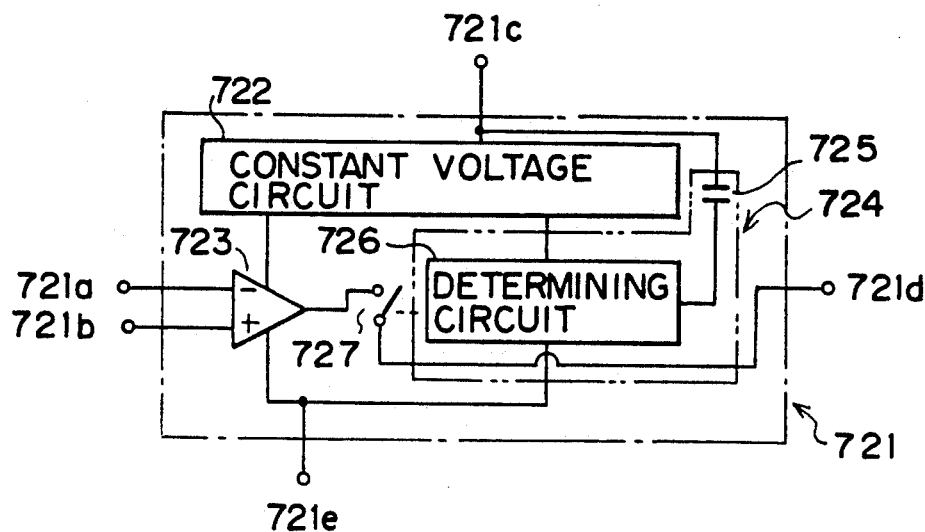
FIG. 56 is a circuit diagram showing arrangement of a signal processing circuit included in the photo-interrupter shown in FIG. 55.
Figure 57:
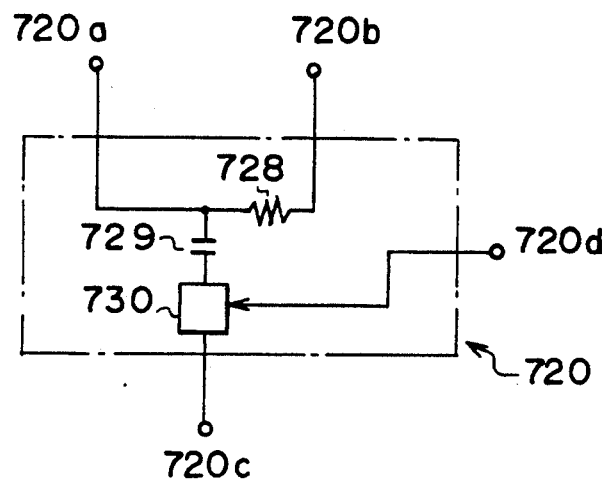
FIG. 57 is a circuit diagram showing arrangement of a specifying signal generating means included in the photo-interrupter shown in FIG. 55.

The description will be directed to the thirteenth embodiment of the invention as referring to FIGS. 55 to 57.

FIG. 55 is a circuit diagram showing arrangement of a data transmission system according to the thirteenth embodiment of the present invention.

As shown, the data transmission system according to the present embodiment is arranged to have a plurality of photo-interrupters 703A, 703B, . . . , 703N served as sensing devices and a specifying signal generating unit 720 for generating frequency signals predetermined according to the photo-interrupters 703A, 703B, . . . , 703N on a power (Vcc) line in an overlapped manner. The output of each of the photo-interrupters 703A, 703B, . . . , 703N is connected to one data line D leading to the control device (microcomputer) 704.

Each of the photo-interrupters 703A, 703B, . . . , 703N is arranged to have a luminous element (light-emitting diode) 705, a current-limiting resistor 706 for the LED 705, a light-receptacle element (photo diode) 707, and a signal processing circuit 721 for processing the output signals of the light-receptacle element (photo diode) 707 and the photo diode 707 as shown in FIG. 55.

The signal processing circuit 722 is, as shown in FIG. 56, arranged to have a constant voltage circuit 722, an amplifier 723, a signal determining unit 724 and an output switching unit 727 as shown in FIG. 56. The determining unit 724 is arranged to have a signal sensing unit (capacitor) 725 and a signal determining circuit 726. The signal determining circuit 726 stores a self specifying frequency signal. The specifying signal generating unit 720 serves to sense only the frequency signal from the overlapped signals sent on the power line with the capacitor 725. The signal determining circuit 726 serves to determine whether the sensed signal coincide with the self specifying signal. The output switching unit 727 is a switch connected to the amplifier 723. In a case that the signal determining unit 724 determines that the sensed signal coincides with the self specifying frequency signal, the output switching unit 727 serves to output an ON signal and transmit an output signal to the microcomputer 704. In a case that it is determined that the sensed signal does not coincide with the self specifying frequency signal, the output switching unit 727 is kept off so that it disables to transmit an output signal to the microcomputer 704.

The specifying signal generating unit 720 is, as shown in FIG. 57, arranged to have a resistor 728, a capacitor 729 and a signal generating circuit 730. When an address signal is output, this signal generating circuit 730 serves to generate a signal of a constant frequency according to the address signal and transmit overlapped frequency signals onto the power (Vcc) line through the capacitor 728 and the resistor 727.

The anode of the LED 705 is connected to a terminal 720a of the specifying signal generating unit 720. The cathode of the LED 705 is connected to the ground through the current-limiting resistor 706. The cathode of the photo-diode 707 is connected to a terminal 721a of the signal processing circuit 721. The anode of the photo-diode 707 is connected to a terminal 721b of the signal processing circuit 721.

As shown in FIG. 57, the terminal 720a of the specifying signal generating unit 720 is connected to the signal generating circuit 730 through the capacitor 729. As shown in FIG. 56, the terminal 721a of the signal processing circuit 721 is connected to a negative logic side input terminal of the amplifier 723. The terminal 721b is connected to a positive logic side input terminal of the amplifier 723.

A terminal 721c of the signal processing circuit 721 is connected to the terminal 720a of the specifying signal generating unit and a terminal 721d of the circuit 721 is connected to a data line D as shown in FIG. 55. The signal processing circuit 721 is connected to the ground at its terminal 721e. A terminal 721c of the signal processing circuit 721 is connected to the constant voltage circuit 722 and the capacitor 725. A terminal 721d of the signal processing circuit 721 is connected to the switching unit 727. A terminal 721e of the signal processing circuit is connected to the amplifier 723 and the signal determining circuit 726.

A terminal 720b of the specifying signal generating unit 720 is connected to the power (Vcc) line. A terminal 720c is connected to the ground, a terminal 720d is connected to an address line A. A terminal 720b of the specifying signal generating unit 720 is connected to the signal generating circuit 730 through the resistor 728 and the capacitor 729 and the terminals 720c, 720d are directly connected to the signal generating circuit 730 as shown in FIG. 57.

When an address signal is input to the terminal 720d of the specifying signal generating unit 720, the signal generating circuit 730 of the specifying signal generating unit 720 serves to generate a predetermined-frequency signal according to an address signal and transmit the frequency signal on the power (Vcc) line in an overlapped manner with the power voltage through the capacitor 729 and the resistor 728.

The power voltage having the frequency signal overlapped thereon in the specifying signal generating unit 720 is output from the terminal 724 of the specifying signal generating unit 720 to the signal processing circuits 721 of the photo-interrupters 703A, 703B, . . . , 703N.

The power voltage having the overlapped frequency signal overlapped thereon, which is entered at the terminal 721c of the signal processing circuit 721, is cut through the effect of the capacitor 725 of the signal determining unit 724, resulting in sensing only the frequency signal and inputting the sensed frequency signal to the signal determining circuit 726.

On the other hand, the power voltage is rectified in the constant voltage circuit 725 and is supplied to the amplifier 723 and the signal determining circuit 726.

In a case that the input signal is determined to coincide with the predetermined self frequency stored in the signal determining circuit 726, the signal determining circuit 726 of the signal determining unit 724 serves to switch on the switch 727 of the output switching unit. It results in supplying an output of the photo-diode 707 to the data line D after the output is amplified in the amplifier 723 for transmitting the output data to the microcomputer 704.

On the other hand, in a case that the input signal coincides with the predetermined self frequency stored in the signal determining circuit 726, the signal determining circuit 726 serves to keep the switch 727 of the output switching unit off. It results in disabling to transmit the output of the photo-diode 707 to the microcomputer 704.

As described above, there is provided a specifying signal generating unit 720 for generating a predetermined signal according to each of the photo-interrupters 703A, 703B, . . . , 703N and transmitting the predetermined signal on a power line in an overlapped manner. The signal processing circuit 721 of each of the photo-interrupters 703A, 703B, . . . , 703N includes the signal determining unit 724 for storing a self specifying signal, sensing the specifying signal from the signal overlapped with the other signals on the power line by the specifying signal generating unit 720 and determining whether or not the sensed signal coincide with the self specifying signal and the output switching unit 7272 for transmitting an output signal to the microcomputer 704 in a case that it is determined that the sensed signal coincides with the self specifying signal. Hence, provided that the specifying signal frequencies are varied according to the photo-interrupters 703A, 703B, . . . , 703N, by specifying an address according to each photo-interrupter, it is possible to supply the outputs of the photo-interrupters 703A, 703B, . . . , 703N on one data line D.

It results in reducing the internal wires and facilitating building of the information apparatus.

In addition, the specifying signal generated in the specifying signal generating unit 720 may be a pulse train signal.

Further, in place of a photo-interrupter, a photo-coupler may be used for temporarily converting an input signal to light in the luminous element and converting the light into an electric signal in the light-receptacle element.

Figure 1:
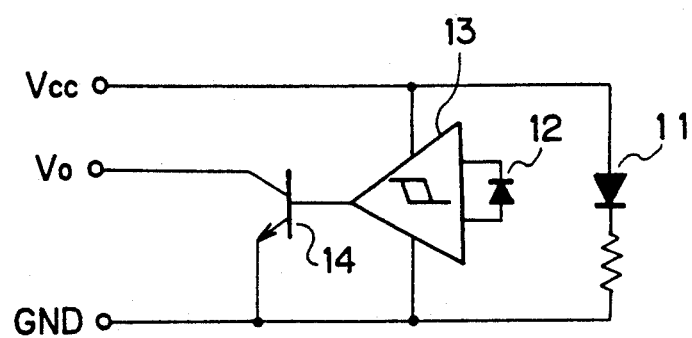
FIG. 1 is a circuit diagram showing a photo-interrupter according to an related art of the present invention.
Figure 2:
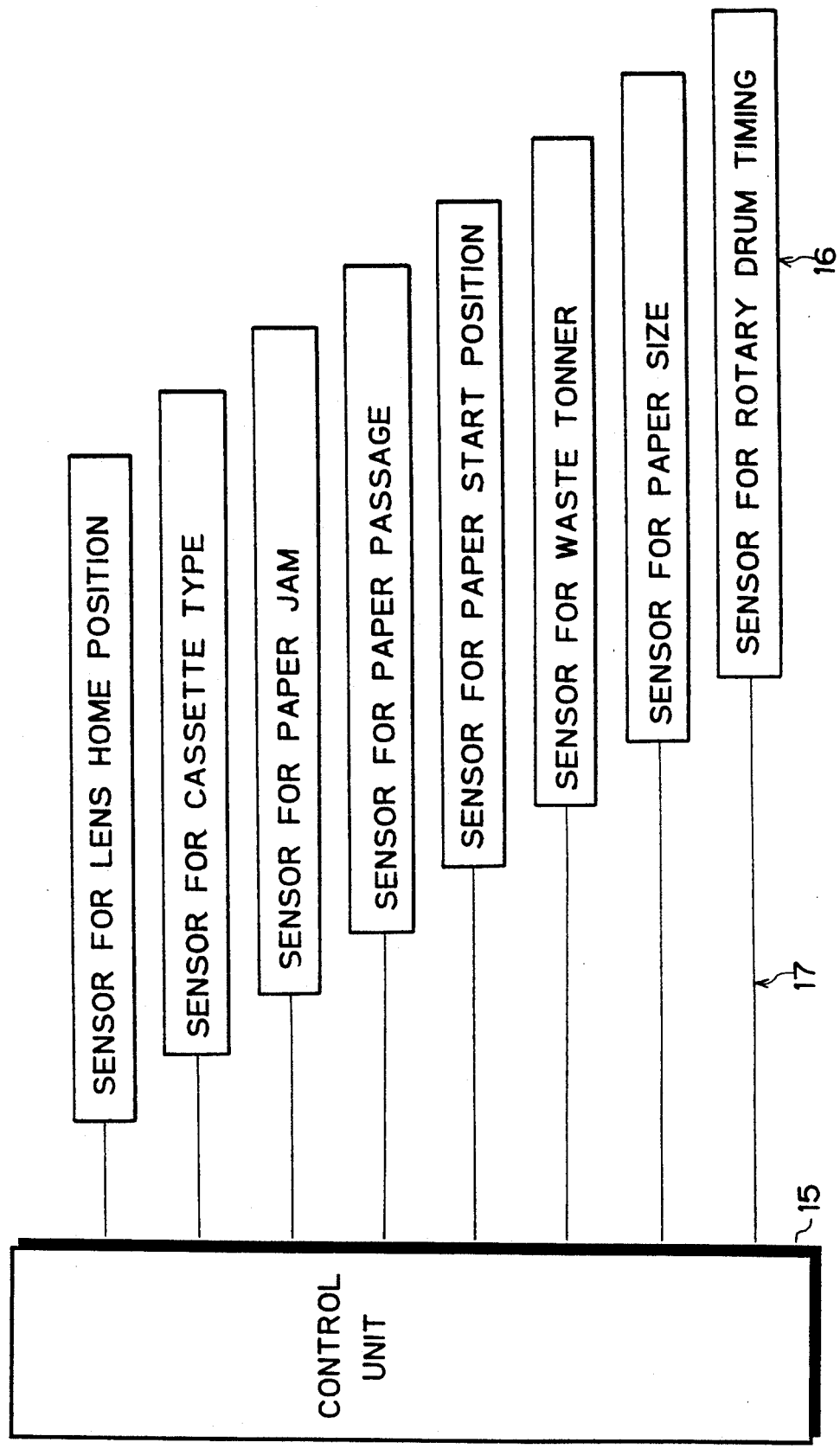
FIG. 2 is a view showing system configuration of an information apparatus having the photo-interrupters according to the related art of the present invention.
Figure 58:
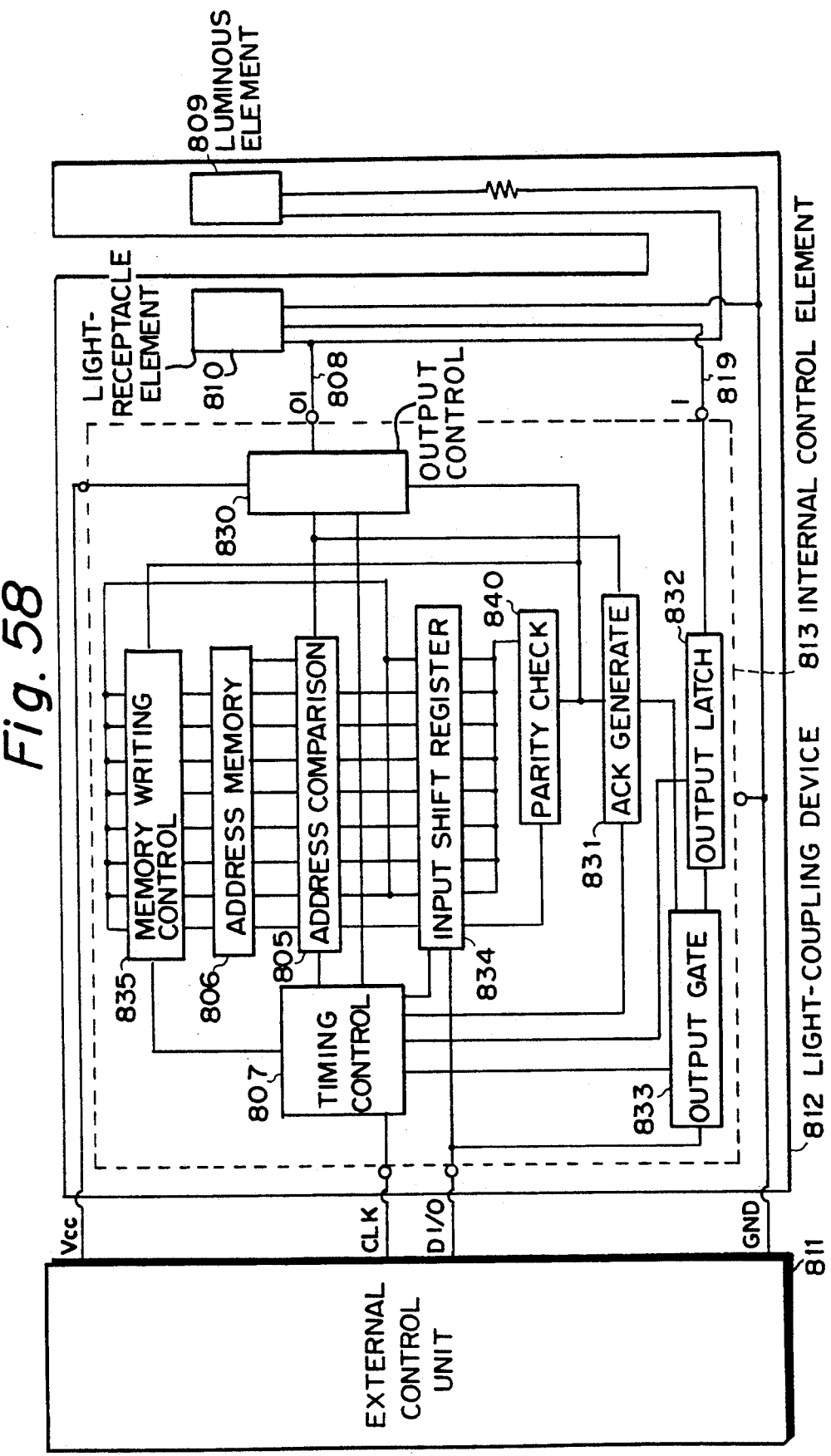
FIG. 58 is a block diagram showing a optoelectronic device according to a fourteenth embodiment of the present invention.
Figure 59:
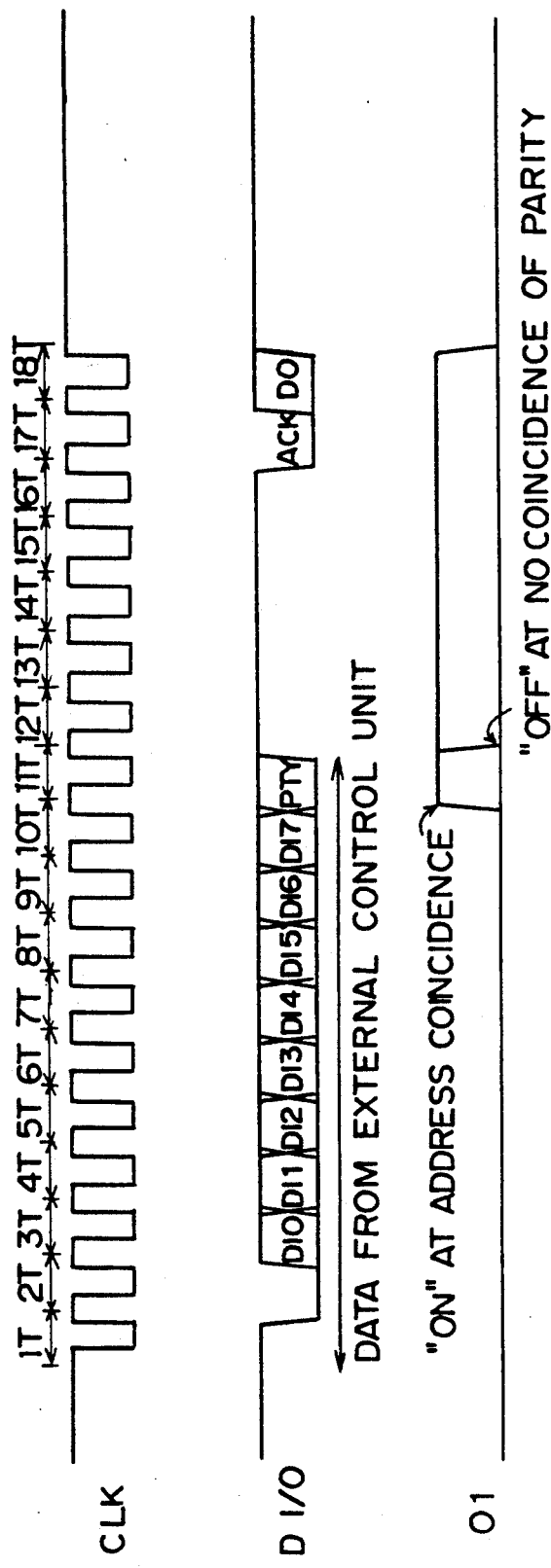
FIG. 59 is a timing chart showing the operation of the optoelectronic device of FIG. 58.
Figure 60:
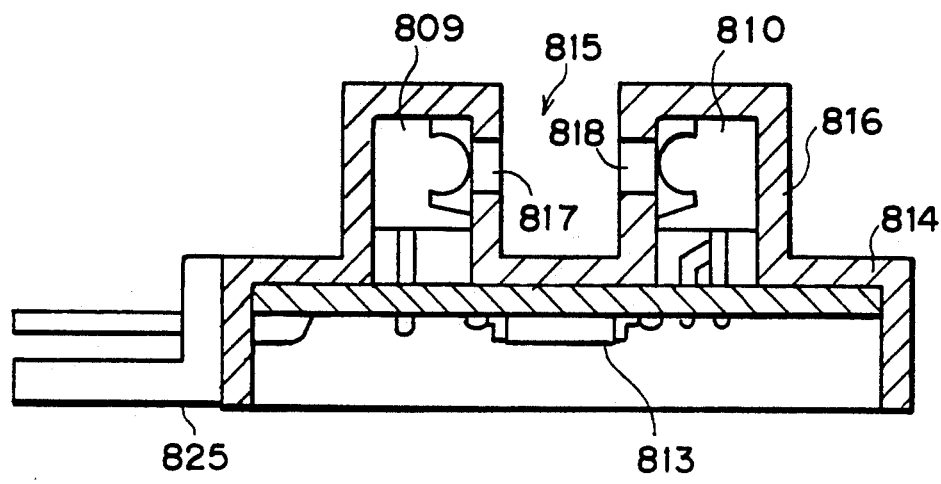
FIG. 60 is a sectional view of the optoelectronic device of FIG. 58.
Figure 61:
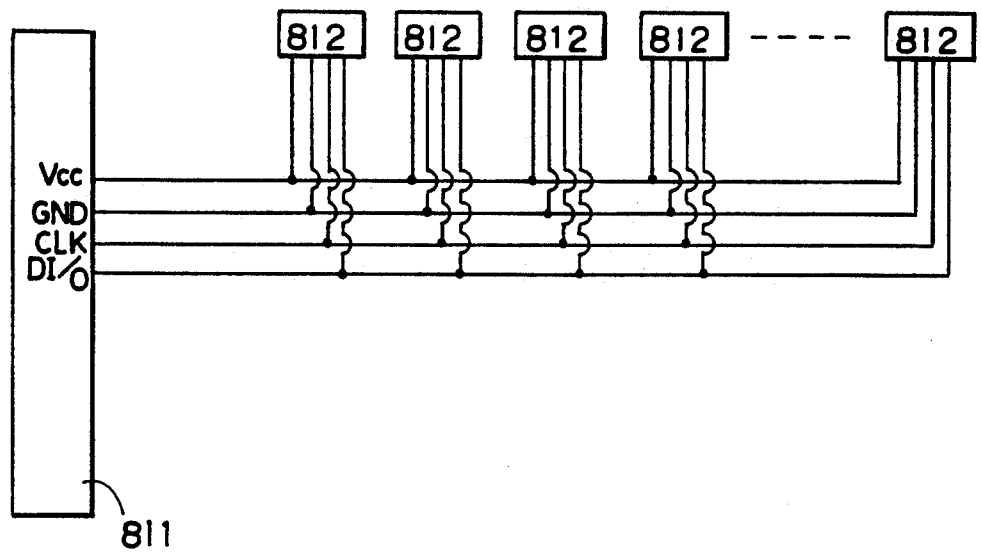
FIG. 61 is a schematic view of wirings inside of a copying machine which uses the optoelectronic device of FIG. 58.
Figure 62:
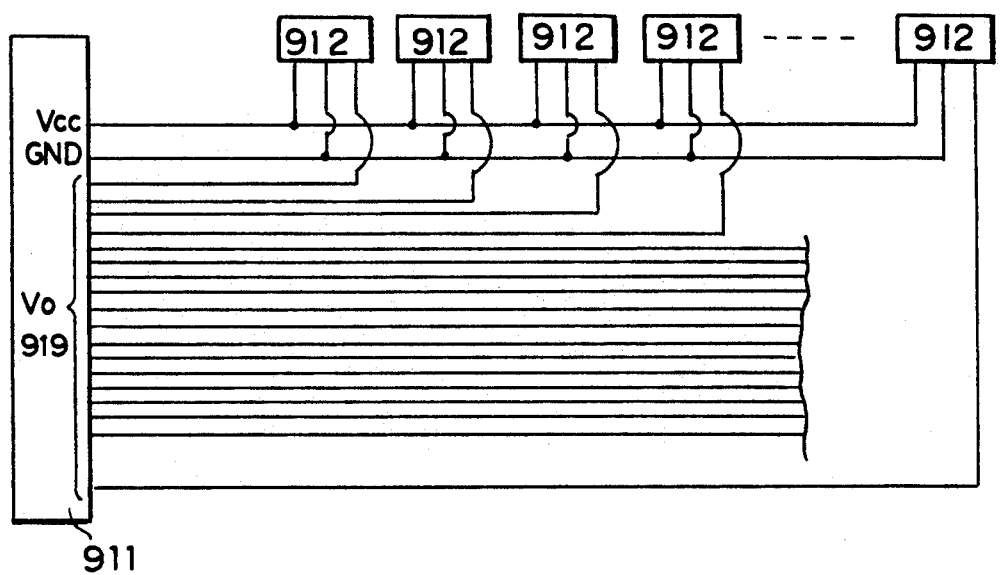
FIG. 62 is a schematic view of wirings inside of a copying machine which uses a known photo-interrupter of FIG. 1.

Hereinafter, a fourteenth embodiment of the present invention will be described as referring to the drawings. FIG. 58 is a block diagram showing a photo-interrupter according to this embodiment of the present invention, FIG. 59 is a timing chart showing the operation of the photo-interrupter shown in FIG. 58 and FIG. 60 is a sectional view of the photo-interrupter shown in FIG. 1.

Figure 3:
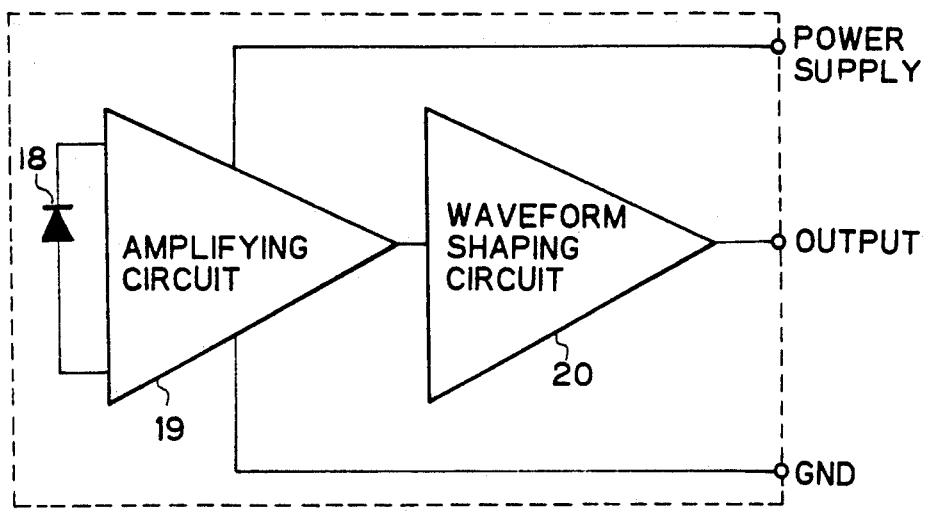
FIG. 3 is a circuit diagram showing a light-receptacle device according to an related art of the present invention.

As shown, the transmission type photo-interrupter is configured to have a luminous element 809, a light-receptacle element 810 incorporating an amplifier and an output transistor therein, and an internal control device 813 for controlling the operation of the luminous element 809 and the light-receptacle element 810. As shown in FIG. 3, the luminous element 809 and the light-receptacle element 810 are mounted on a printed board 814 in a manner that these elements 809 and 810 are opposed to each other with a path 815 for passing an object to be sensed laid between the elements. The internal control device 813 is soldered on the rear side of the printed board 814. All these components are accommodated in an external case 816 having a light-projecting window 817 and a light-entering window 818 formed thereon.

The internal control element 813 includes as I/O lines a power supply line Vcc, a grounding line GND, a clock line CLK and a signal line DI/O. Those lines of the internal control element 813 are connected to an external control device 811 and a power supply through a connector 825 (see FIG. 60).

The internal control device 813 is configured to have a shift register 834, a storage circuit (address memory) 806, a comparison determining circuit (address comparing circuit) 805, an output control circuit 830, a timing control circuit 807, a signal generating circuit (ACK generating circuit) 831, an output latch circuit 832 and an output gate circuit 833. The shift register 834 serves to read a data bit train sent from the external control device 811 through the signal line DI/O, the data bit train being synchronized with a clock signal flowing through the clock line CLK. The storage circuit 806 serves to store a self identification code in advance. The comparison determining circuit serves to determine whether or not the data (identification code) read in the shift register 834 matches to the data (self identification code) stored in the address memory 806. The output control circuit 830 serves to feed power to the luminous element 809 and the light-receptacle element 810. The timing control circuit 807 controls a clock timing. The signal generating circuit 831 serves to receive a sensed result DO from the light-receptacle element 810 based on the timing defined by the timing control circuit 807 and output the sensed result DO preceded by the identification code through the signal line DI/O.

The external control device 811 is arranged to generate a clock signal only when the identification code is communicated through the signal I/O line in order for the photo-interrupter to positively grasp when reading the identification code is started. As shown in FIG. 59, this clock signal stays at High level at any time except the communicating time and contains a Low output input before the identification code. The timing control circuit 807 is arranged to make sure of synchronizing the clock signal with the identification code based on the codes of the identification code matching to the initial two or more codes of the clock signal, the identification code sent from the external control device 811 through the clock signal line DI/O.

The 8-bit identification code data bit train sent from the external control device 811 includes a parity signal PTY at the tail of the train. The internal control device 813 provides a parity check circuit 840 for checking the number of bits contained in the code signal for detecting an error occurring in reading the identification code.

An address is written in the address memory 806 before or after mounting the instrument having the external control device 811. The method for writing an address may employ a RAM, an electric injecting system, a junction breakdown system or a fuse melting system.

Next, the operation of the photo-interrupter will be discussed as referring to a timing chart of FIG. 59.

The clock line CLK and the signal line DI/O connected to the external control device 811 hold High level when the photo-interrupter is inoperative.

To know the sensing state of the photo-interrupter, the external control device 811 serves to supply an identification code synchronized with the clock signal. Only when the timing control circuit 807 holds the DI/O terminal at High level at the leading edge of the first clock and at Low level at the tailing edge of the second clock, the subsequent state of the DI/O line is read in the shift register 834 with DI0 to DI7 (8-bit) signals as identification codes.

That is, the identification code coming from the external control device 811 is synchronized with the clock signal CKL sent from the external control device 811 as shown in FIG. 59. This clock signal is held at High level at any time except when the signal is communicated and contains a Low level signal before the identification code. The timing control circuit 807 serves to make sure that the clock signal is at High level at the leading edge of the first clock and at Low level at the tailing edge of the second clock. If the clock timing is affirmative, the 8-bit DI0 to DI7 signals are read as identification codes.

Hence, the photo-interrupter is capable of checking for slip of synchronization of the clock signal with the code signal on the signal line DI/O, the slip resulting from noises appearing on the signal line DI/O.

According to this embodiment, then, the parity signal PTY is added to the 8-bit DI0 to DI7 codes for forming 9-bit code signals. The number of bits of the code signal is checked in the parity check circuit 840 for detecting a parity error. If any parity error is detected, the 01 output control circuit 830 stops feeding power from the power line 819 to the luminous element 809 and the light-receptacle element 810. Only if no parity error is detected, the output control circuit 830 serves to supply power to the luminous element 809 and the light-receptacle element 810. It results in being able to check for an error resulting from the noise of the code signal, that is, an error appearing when reading the identification code.

The self identification code stored in the address memory 806 is compared with the identification code stored in the shift register 834 read through the signal line DI/O in the address comparing circuit 805. The output control circuit 830 serves to feed power to the luminous element 809 and the light-receptacle element 810 through the 01 power line 808 for driving the luminous element 809 and the light-receptacle element 810 if both of the identification codes are matched.

In using the known photo-interrupter, all the photo-interrupters are normally switched on. The components of this embodiment needing the largest power consumption are the luminous element 809 and the light-receptacle element 810 like the known photo-interrupter. In this embodiment, however, only if the identification code sent from the external control device 811 is matched to the self identification code stored in the address memory, only the photo-interrupter for the self identification code is qualified to operate for a constant time. If it is not matched, the photo-interrupters for mismatched self identification codes is not qualified to operate. It results in making a contribution to greatly lowering power consumption of the overall components.

The output of the light-receptacle element 810 is read in the output latch circuit 832 through the I line 819. Concretely, the High or Low signal is read in the output latch circuit 832 depending on the presence or absence of the sensed object. Next, the ACK generating circuit 831 serves to output the sensed result DO preceded by the identification code receipt signal ACK to the output gate circuit 833 on the timing defined by the timing control circuit 807. The output gate circuit 833 serves to output both of the signals DO and ACK to the external control device 811 through the signal lines DI/O line. In this embodiment, the identification code receipt signal ACK is output in synchronous to the leading edge of the 16th clock and the sensed result DO is output in synchronous to the leading edge of the 17th clock.

Figure 4:
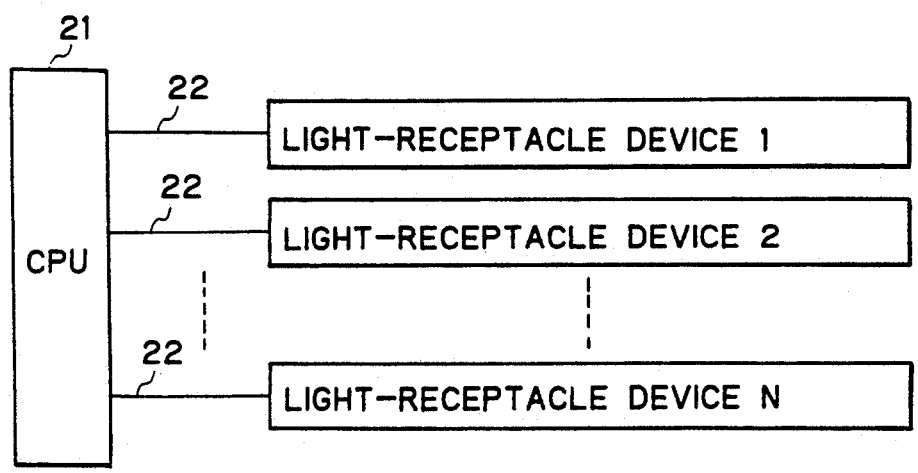
FIG. 4 is a diagram showing system configuration of an information apparatus having the light-receptacle devices according to the related art of the present invention.
Figure 5:
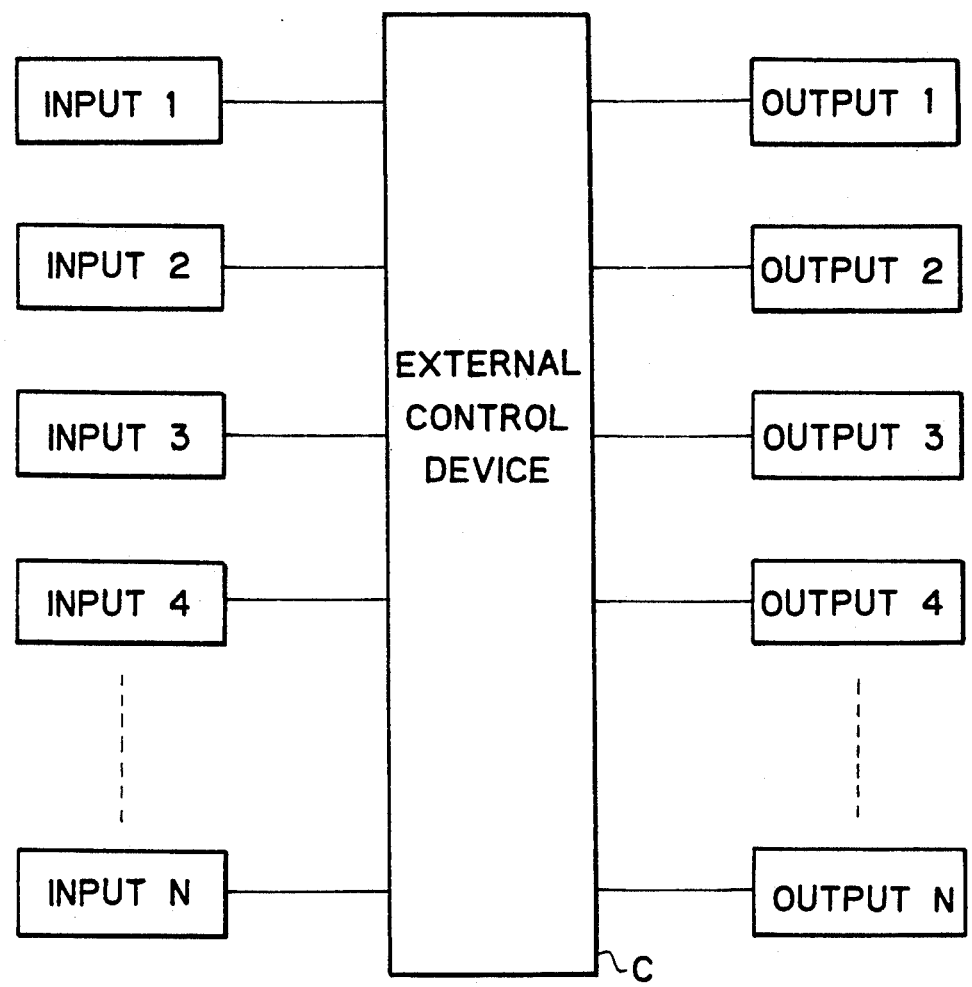
FIG. 5 is a diagram showing system configuration of an information apparatus having photo-couplers according to an related art of the present invention.
Figure 6:
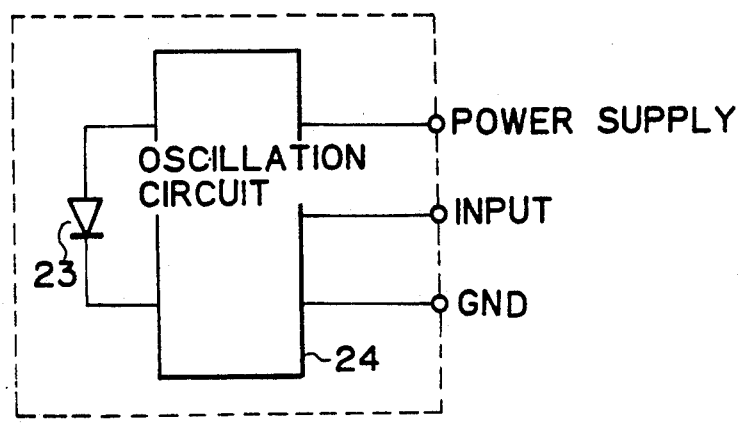
FIG. 6 is a circuit diagram showing a luminous device according to an related art of the present invention.
Figure 7:
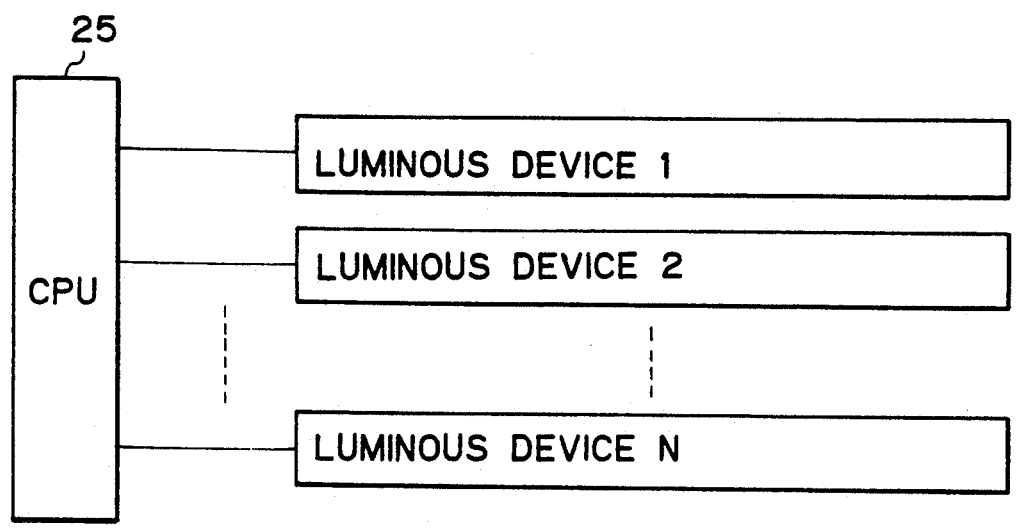
FIG. 7 is a diagram showing system configuration of an information apparatus having the luminous devices according to the related art of the present invention.
Figure 8:
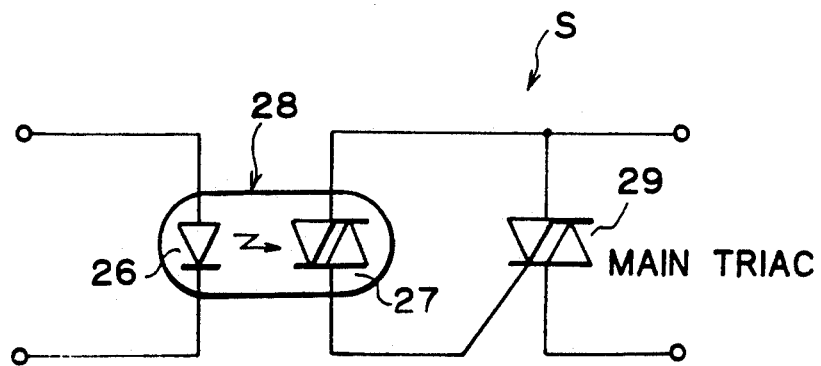
FIG. 8 is a circuit diagram showing part of a solid-state relay according to an related art of the present invention.
Figure 9:
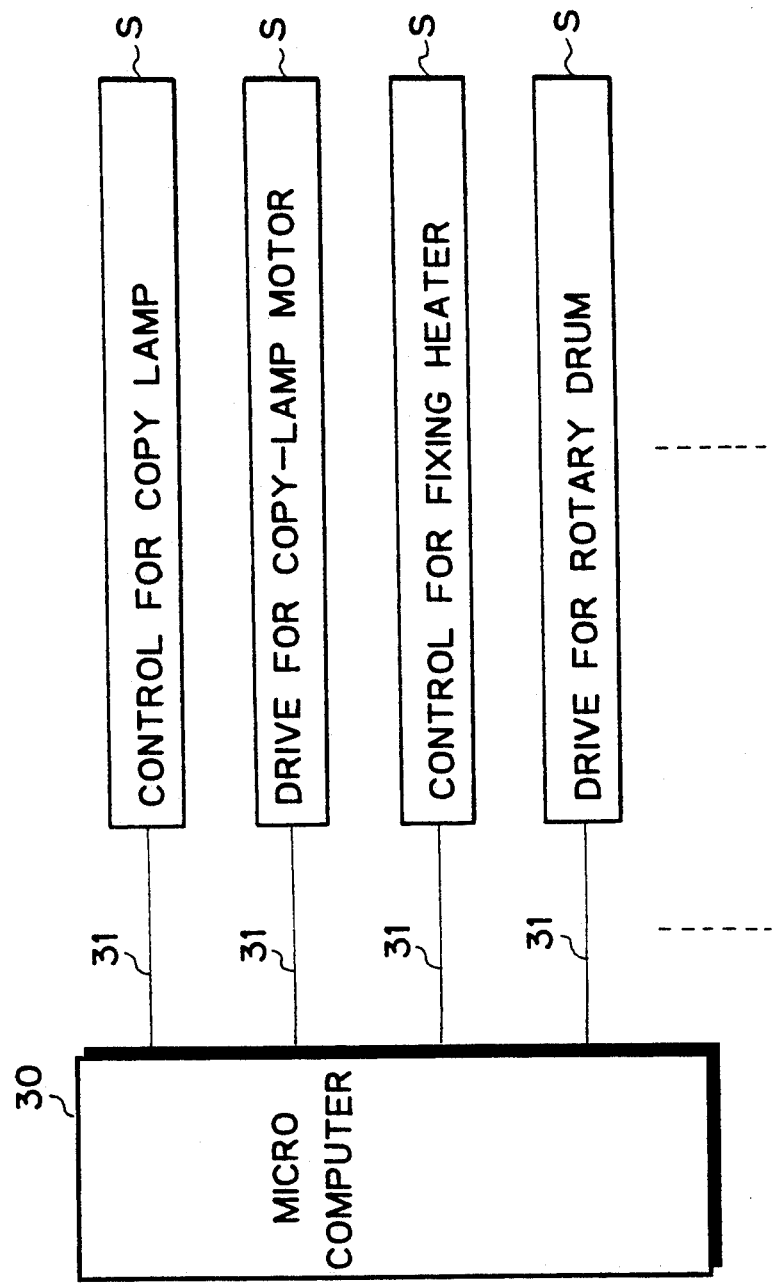
FIG. 9 is a diagram showing system configuration of an information apparatus having the solid-state relays according to the related art of the present invention.
Figure 10:
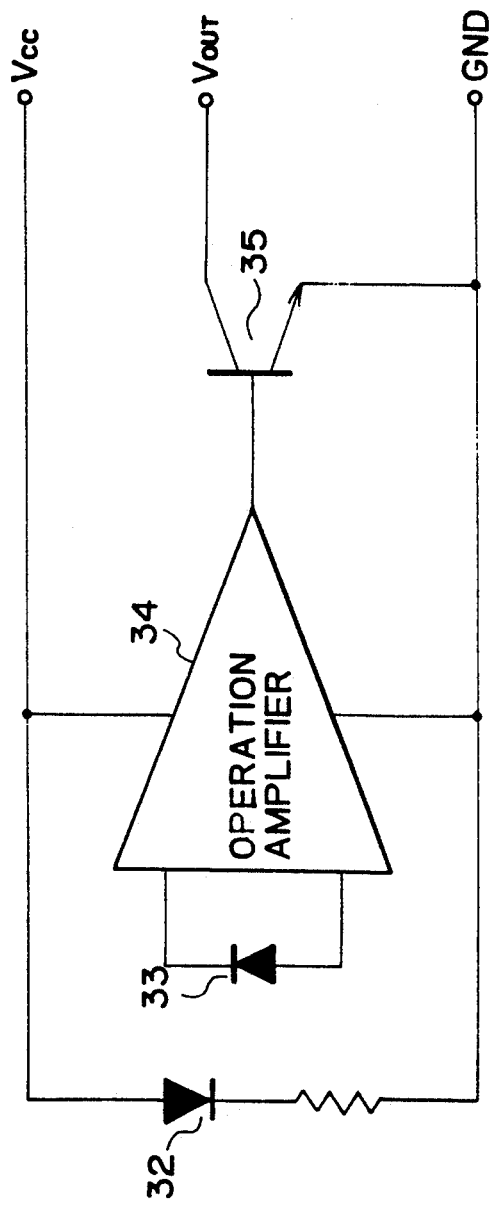
FIG. 10 is a circuit diagram showing a photo-interrupter according to a related art of the present invention.
Figure 11:
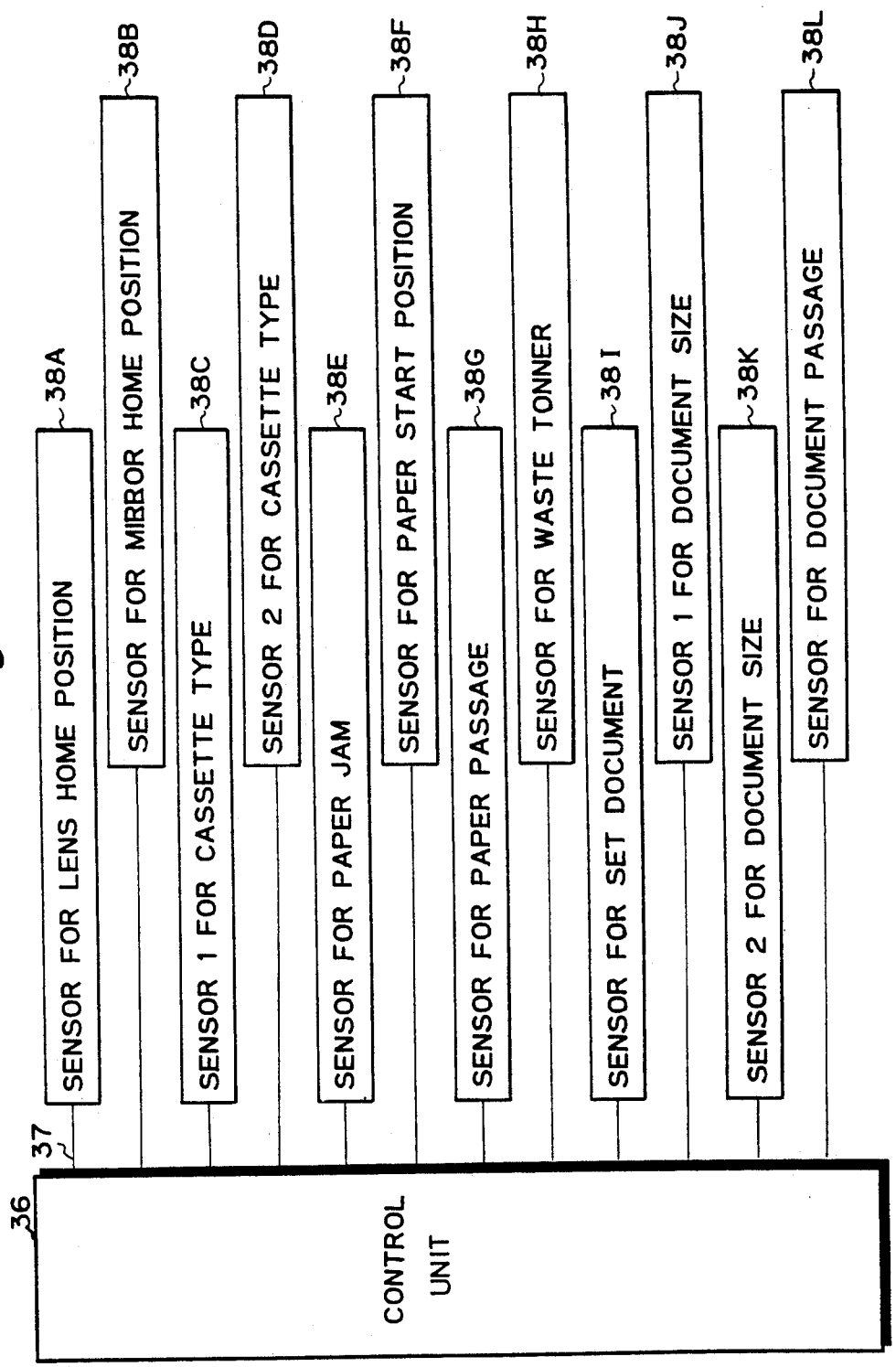
FIG. 11 is a diagram showing system configuration of an information apparatus having the photo-interrupters according to the related art of the present invention.
Figure 12:
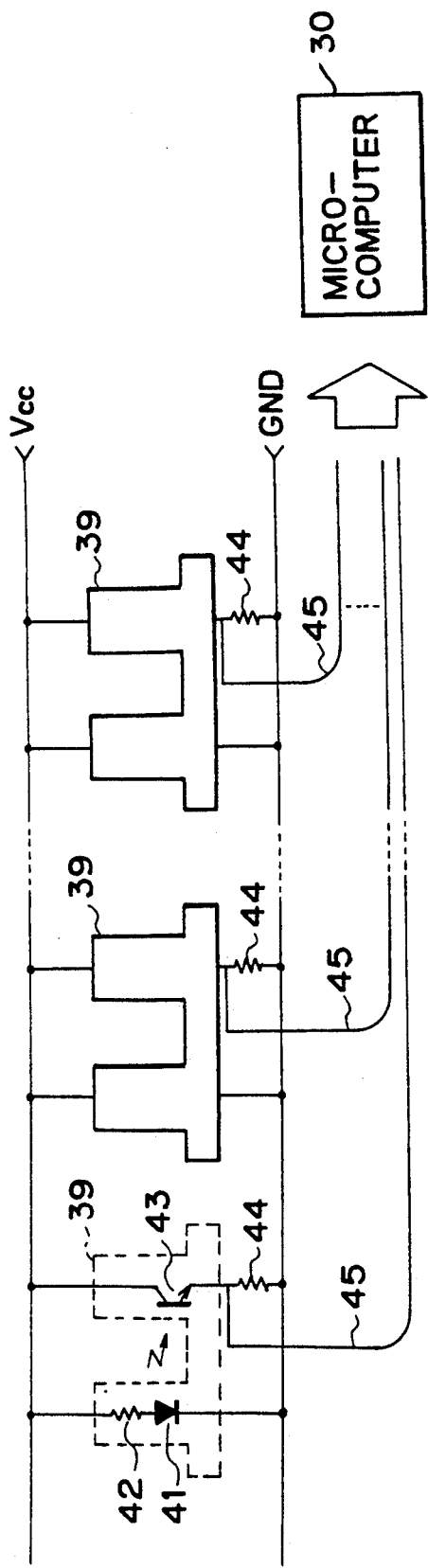
FIG. 12 is a circuit diagram showing a data transmission system according to a related art of the present invention.

Since the identification code receipt signal ACK and then the sensed result DO are output to the external control device 811 through the signal line DO, as mentioned above, by outputting a sensing state result DO following to the identification code reception signal ACK to the external control device 811 through the signal line DO, for example, in case of connecting the plurality of photo-interrupters 812 to the external control device 811 which is used in an information apparatus such as a copying machine, as shown in FIG. 4, it is applicable to use the clock line CLK and the signal line DI/O in common at each interval between photo-interrupters 812 for connecting photo-interrupter 812 to the external control device 811. Thereby, it enables to far more simplify the wiring inside of the device as compared to the known photo-interrupter device. It results in being able to far more simplify the wiring inside of the device as compared to the known photo-interrupter device.

Since the photo-interrupter having the self identification code matched to the identification code sent from the control device serves to send the identification code receipt signal ACK to the external control device 811, by making sure that this identification code receipt signal ACK is sent to all the photo-interrupters, it is possible to grasp that the connection from the external control device 811 to the photo-interrupters is established. Hence, it means that a checking of the connections can be performed when manufacturing the device and when powering on the device.

As mentioned above, this embodiment is arranged to make sure that no parity error takes place in the signal line DI/O, supply power to the luminous element 809 and the light-receptacle element 810 through the OI power line 808 and output the sensed result DO after a little interval. This is because the sensed result DO is allowed to output as the sensing output 819 of the light-receptacle element 810 is made stable.

Having described the transmission type photo-interrupter for describing the present invention, it is possible to use a reflection type photo-interrupter for sensing a density (toner density) or a tilt angle of an object to be sensed. In this case, a command is added to the identification code and the added signal is sent to the external control device in which the command is sensed from the signal. Feeding power to the luminous element or the light-receptacle element is controlled depending on the sensed command.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optoelectronic device adapted to be incorporated in an electronic circuit of an electronic apparatus such as a printer, a copying machine, a facsimile or the like, said device comprising:
at least one of a light emitting element for emitting light and a light receptacle element for receiving light and outputting a signal according to the received light;
means for storing a self identification code of said device;
means, responsive to a control signal applied to said device, connected to said storing means, for determining a coincidence between said self identification code stored in said storing means and an identification code on the control signal; and
means connected to said determining means for driving at least one of said elements when said self identification code coincides with said identification code in accordance with a determined result of said determining means; and
means for outputting a signal associated with at least one of said elements when at least one of said elements is driven by said driving means.

2. A device according to claim 1, wherein said device is detachably mounted in an electronic circuit of said electronic apparatus.

3. A device according to claim 1, wherein said device is soldered in an electronic circuit of said electronic apparatus.

4. A device according to claim 1, further comprising:
an input for receiving a clock signal applied thereto, said determining means determining whether an identification code applied to said device in synchronization with the clock signal coincides with said self identification code stored in said storing means, and said device further comprises means for counting a number of coincidences and means for enabling said outputting means when the number of coincidences is equal to or more than a predetermined number and resetting the number of coincidences to zero.

5. A device according to claim 1, wherein said storing means, said determining means, said driving means and said outputting means are configured as a controller formed in one integrated-circuit assembly.

6. A device according to claim 5, wherein said device further comprises a device case in which physically incorporates at least one of said elements and said assembly.

7. A device according to claim 5, wherein at least one of said elements and said assembly are arranged in a molded resin.

8. A device according to any one of claims 1-7, wherein said light receptacle element is arranged to receive the light emitted by said light emitting element.

9. A device according to claim 8, wherein said device is a photo-coupler.

10. A device according to claim 8, wherein said elements sense an object passing between said elements without contact, and said outputting means delivers the signal representing the sensing of the object when said elements sense the object.

11. A device according to claim 10, wherein said device is a photo-interrupter.

12. A device according to any one of claims 1 to 7, wherein said device includes only said light receptacle element among said light emitting element and said light receptacle element.

13. A device according to any one of claims 1 to 7, wherein said device includes only said light emitting element among said light emitting element and said light receptacle element.

14. A device according to any one of claims 1 to 7, wherein said device includes both said light emitting and light receptacle elements and a driving element connected to said light receptacle element, said light emitting element being turned on or off by said driving means when said self identification code coincides with said identification code, said driving element being driven in accordance with an output of said light receptacle element.

15. A device according to claim 14, wherein said driving element is switched on or off in accordance with the output of said light receptacle element.

16. An apparatus comprising:
a plurality of optoelectronic devices adapted to be incorporated in an electronic circuit of an electronic apparatus such as a printer, a copying machine, a facsimile or the like, each device comprising at least one of a light emitting element for emitting light, and a light receptacle element for receiving light and outputting a signal according to the received light, means for storing a self identification code means, responsive to a control signal applied to said device, connected to said storing means for determining a coincidence between said self identification code and an identification code on the control signal, and means connected to said determining means for driving at least one of said elements when said self identification code coincides with said identification code in accordance with a determined result of said determining means, and means for outputting a signal associated with at least one of said elements when at least one of said elements is driven by said driving means;
a single bus having a line for transmitting a plurality of identification codes each corresponding to each optoelectronic device; and
a controller connected to said optoelectronic device through said single bus for delivering a control signal having an identification code to drive a desired optoelectronic device.

17. An apparatus according to claim 16, wherein said bus includes another line connected to said optoelectronic devices for transmitting a clock signal, and each determining means of each device determines whether an identification code applied to said device via said bus in synchronization with the clock signal coincides with each self identification code stored in each storing means of each device.

18. An apparatus according to claim 16, wherein said single bus line also serves as a power line for supplying power to said optoelectronic devices.

19. An apparatus according to claim 18, wherein each identification code overlaps with the supplied power on said power line and has a corresponding predetermined frequency.

20. An apparatus according to claim 18, wherein each identification code is a pulse train signal overlapping said power line.

21. An apparatus according to any one of claims 16 to 20, wherein each device is either detachably mounted or soldered in an electronic circuit of such an electronic apparatus.

22. An apparatus according to claim 21, wherein in each device, said storing means, said determining means, said driving means and said outputting means are configured as a controller formed in one integrated-circuit assembly.

23. An apparatus according to claim 22, wherein each device further comprises either a device case or a molded resin in which at least one of said elements and said assembly are disposed.

24. An optoelectronic device adapted to be incorporated in an electronic circuit of an electronic apparatus such as a printer, a copying machine, a facsimile or the like and to be connected in series with other of said optoelectronic devices, said device comprising:
   at least one of a light emitting element for emitting light and a light receptacle element for receiving light and outputting a signal according to the received light;
   driving means for driving at least one of said light emitting and light receptacle elements in response to one of a control signal applied to said device and an output signal delivered by another optoelectronic device at a previous stage in the series;
   first output means for outputting a data signal associated with at least one of said elements when at least one of said elements is driven by said driving means; and
   second output means for outputting an output signal for driving another same device at a next stage in the series after at least one of said elements is driven by said driving means.

25. A device according to claim 24, wherein said device is detachably mounted in an electronic circuit of such an electronic apparatus.

26. A device according to claim 24, wherein said device is soldered in an electronic circuit of such an electronic apparatus.

27. A device according to claim 24, wherein said driving means, said first output means and said second output means are configured as a controller formed in one integrated-circuit assembly.

28. A device according to claim 27, wherein said device further comprises a device case in which at least one of said elements and said assembly are accommodated.

29. A device according to claim 27, wherein at least one of said elements and said assembly are arranged in a molded resin.

30. A device according to any one of claims 24 to 29, wherein said device comprises both said light emitting and light receptacle elements, and said light receptacle element is arranged to receive the light emitted by said light emitting element.

31. A device according to claim 30, wherein said optoelectronic device is a photocoupler.

32. A device according to claim 30, wherein said elements cooperatively sense an object passing by between said elements without contact and said first output means delivers a signal representing the sensing of the object when said elements sense the object.

33. A device according to claim 32, wherein said optoelectronic device is a photo-interrupter.

34. A device according to any one of claims 24 to 29, wherein said device comprises only said light receptacle element among said light emitting element and said light receptacle element.

35. A device according to any one of claims 24 to 29, wherein said device comprises only said light emitting element among said light emitting element and said light receptacle element.

36. A device according to any one of claims 24 to 29, wherein said device comprises both said light emitting and light receptacle elements and a driving element connected to said light receptacle element, said driving element being driven in accordance with an output of said light receptacle element, said light emitting element being turned on or off by said driving means when said self identification code coincides with said data.

37. A device according to claim 36, wherein said driving element is switched on or off in accordance with the output of said light receptacle element.

38. An apparatus comprising:
   a plurality of optoelectronic devices each adapted to be incorporated in an electronic circuit of an electronic apparatus such as a printer, a copying machine, a facsimile or the like and to be connected in series with others of the optoelectronic devices, each device comprising at least one of a light emitting element for emitting light and a light receptacle element for receiving light and outputting a signal according to the received light, driving means for driving at least one of said light emitting and light receptacle elements in response to one of a control signal applied to said device and an output signal delivered by another optoelectronic device at a previous stage in the series, first output means for outputting a data signal associated with at least one of said elements when at least one of said elements is driven by said driving means, and second output means for outputting an output signal for driving another same device at a next stage in the series after at least one of said elements is driven by said driving means; and
   a controller connected to at least one optoelectronic device, which is located at one end of the series, for applying said control signal to the devices.

39. An apparatus according to claim 38,, wherein said apparatus comprises a data line connected to said devices for transmitting each data signal output by each device.

40. An apparatus according to claim 38 or 39, wherein each device is detachably mounted or soldered in an electronic circuit of such an electronic apparatus.

41. An apparatus according to claim 40, wherein in each device said driving means, said first output means and said second output means are configured as a controlled formed in one integrated-circuit assembly.

42. An apparatus according to claim 41, wherein each device further comprises either a device case or a molded resin in which at least one of said elements and said assembly are disposed.

43. An optoelectronic device adapted to be incorporated in an electronic circuit of an electronic apparatus such as a printer, a copying machine, a facsimile or the like, said device comprising:
   a light emitting element for emitting a light;
   a light receptacle element for receiving the light emitted by said light emitting element and outputting a signal according to the received light;
   first storage means for storing a self identification code of said device;
   second storage means for storing current data in accordance with the signal;

means for driving said light receptacle element to obtain the current data; and means for outputting both said self identification code and the current data when the current data are changed.

44. A device according to claim 43, wherein said device is detachably mounted in an electronic circuit of such an electronic apparatus.

45. A device according to claim 43, wherein said device is soldered in an electronic circuit of such an electronic apparatus.

46. A device according to claim 43, wherein said first and second storage means, said driving means and said outputting means are configured as a controller formed in one integrated-circuit assembly.

47. A device according to claim 46, wherein said device further comprises a device case in which at least one of said elements and said assembly are accommodated.

48. A device according to claim 46, wherein at least one of said elements and said assembly are arranged in a molded resin.

49. A device according to any one of claims 43 to 48, wherein said elements sense an object passing by between them without any contact and said outputting means delivers the signal representing the sensing of the object when said elements sense the object.

50. A device according to claim 49, wherein said device is a photo-interrupter.

51. A device according to claim 49, wherein at an initial setting time of said device, said first storage means receives said self identification code applied to said device and store said code, and current data at the setting time is stored in said second storage means.

52. An apparatus comprising:

a plurality of optoelectronic devices each adapted to be incorporated in an electronic circuit of an electronic apparatus such as a printer, a copying machine, a facsimile or the like, each device comprising a light emitting element for emitting light, a light receptacle element for receiving the light emitted by said light emitting element and outputting a signal according to the received light, first storage means for storing a self identification code of said device, second storage means for storing current data in accordance with the signal, means for driving said light receptacle element to obtain the current data, and means for outputting both said self identification code and the current data when the current data is changed;

a data line connected to said devices for transmitting each self identification code and each current data output by each device; and a controller connected to said devices through said data line for receiving each self identification code and each current data.

53. An apparatus according to claim 52, wherein at an initial setting time of said apparatus, said controller delivers each self identification code to each device.

54. An apparatus according to claim 52 or 53, wherein each device is detachably mounted or soldered in an electronic circuit of such an electronic apparatus.

55. An apparatus according to claim 54, wherein in each device said first and second storage means, said driving means and said outputting means are configured as a controller formed in one integrated circuit assembly.

56. An apparatus according to claim 54, wherein each optoelectronic device further comprises either a device case or a molded resin in which at least one of said elements and said assembly are disposed.

57. An optoelectronic circuit mechanically and electrically connected to an electronic apparatus having multiple such optoelectronic circuits comprising:

a light generator;

a light detector for detecting light generated by the light generator;

a memory for storing a device code that identifies the optoelectronic device;

a comparator, responsive to a control signal including address information transmitted from the electronic apparatus, for detecting a coincidence between the device code and the address information; and a driver for activating the light generator and the light detector in response to the coincidence detected by the comparator, wherein the light detector generates a status signal that indicates whether light from the light generator is detected.

58. The optoelectronic device according to claim 57, further comprising:

a memory writer for receiving and writing the device code in the memory.

59. The optoelectronic device according to claim 57, wherein the light detector detects whether an object is present between the light generator and light detector based on the amount of light detected.

60. The optoelectronic device according to claim 59, wherein the memory, comparator and driver are formed on a single IC chip.

61. The optoelectronic device according to claim 57, wherein the memory, comparator, driver, and at least one of the light generator and light detector are formed in a molded resin.

62. The optoelectronic device according to claim 57, wherein the driver includes an output control circuit for supplying power to the light generator and the light detector.

63. An apparatus comprising:

plural optoelectronic devices, each device incorporated as a single integrated circuit in the apparatus and including:

a light generator;

a light detector;

a memory for storing an identifying code;

a comparator for determining a correspondence between a received address signal and the identifying code; and a driver for activating at least one of the light generator and light detector in response to the correspondence, wherein the light detector generates a status signal indicating the presence or absence of an object located between the light generator and the light detector based on the amount of light received by the light detector, a single bus connected to the plural optoelectronic devices, and a controller for transmitting address signals to the plural optoelectronic devices and receiving status signals from each addressed optoelectronic device over the single bus.

64. The apparatus according to claim 63, wherein the single bus includes a first bus line for transmitting addresses to the optoelectronic devices and a second bus line for transmitting clock signals to the optoelectronic devices.

65. The apparatus according to claim 64, wherein each optoelectronic device includes a timer connected to the second clock signal line for checking synchronization between the clock signals and addresses transmitted over the single bus.

66. The apparatus according to claim 64, wherein the first bus line also supplies a power signal to the optoelectric devices, the address signal being modulated on the power signal.

67. The apparatus according to claim 65, wherein each modulating address signal is associated with optoelectronic devices and has a corresponding frequency different from other modulating address signals.

68. The apparatus according to claim 63, each optoelectronic device further comprising another memory for storing the status signal generated by its light detector.

69. The apparatus according to claim 63, wherein the driver is deactivated after the light detector transmits the status signal.

70. The apparatus according to claim 63, wherein each of the optoelectronic devices is connected in series with the controller by the single bus and further includes:
   means connected to the driver for providing an activation signal to another succeeding optoelectronic device in the series after the driver has activated the light generator and light detector.

71. A data transmission system with simplified wirings and reduced size, comprising:
   a plurality of optoelectronic devices incorporated as integrated electronic circuits into an electronic apparatus for sensing an object without physically contacting said object, said plurality of optoelectronic devices each having an optoelectronic element; and
   a control device connected to said plurality of optoelectronic devices through a common single signal line for sending identification codes to each of said plurality of optoelectronic devices.

* * * * *